United States Patent
Zhu et al.

(10) Patent No.: US 12,389,295 B2
(45) Date of Patent: Aug. 12, 2025

(54) TRAFFIC STEERING AND CROSS-LAYER AND CROSS-LINK MOBILITY MANAGEMENT TECHNIQUES FOR MULTI-ACCESS MANAGEMENT SERVICES

(71) Applicant: INTEL CORPORATION, Santa Clara, CA (US)

(72) Inventors: Jing Zhu, Portland, OR (US); Menglei Zhang, Portland, OR (US); Juan Fang, Portland, OR (US); Shu-ping Yeh, Campbell, CA (US); Shilpa Talwar, Cupertino, CA (US); Valerie Parker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 682 days.

(21) Appl. No.: 17/561,897

(22) Filed: Dec. 24, 2021

(65) Prior Publication Data

US 2022/0124588 A1 Apr. 21, 2022

(51) Int. Cl.
*H04W 36/22* (2009.01)
*H04W 28/02* (2009.01)
*H04W 36/00* (2009.01)

(52) U.S. Cl.
CPC ....... *H04W 36/22* (2013.01); *H04W 28/0236* (2013.01); *H04W 36/0066* (2013.01)

(58) Field of Classification Search
CPC ............. H04W 36/22; H04W 28/0236; H04W 36/0066; H04W 76/11; H04W 76/16; H04W 84/12

USPC ......................................................... 455/437
See application file for complete search history.

(56) References Cited

U.S. PATENT DOCUMENTS

| | | | |
|---|---|---|---|
| 6,957,212 B2 | 10/2005 | Peng | |
| 8,949,501 B1 | 2/2015 | Akhter et al. | |
| 9,398,121 B1 | 7/2016 | Brandwine | |
| 11,743,759 B2* | 8/2023 | Kim ...................... | H04W 16/28 370/328 |

(Continued)

FOREIGN PATENT DOCUMENTS

| | | |
|---|---|---|
| EP | 3414932 A1 | 12/2018 |
| WO | WO 2015-152787 A1 | 10/2015 |

(Continued)

OTHER PUBLICATIONS

Extended European Search Report mailed Apr. 14, 2023 for European Patent Application No. 22203400.1, 13 pages.

(Continued)

*Primary Examiner* — Mahendra R Patel
(74) *Attorney, Agent, or Firm* — Schwabe, Williamson & Wyatt, P.C.

(57) ABSTRACT

The present disclosure is related to multi-queue management techniques and packet reordering techniques for inter-radio access technology (RAT) and intra-RAT traffic steering. The multi-queue management and packet reordering techniques may be used in Multi-Access Management Services (MAMS) framework, which is a programmable framework that provides mechanisms for the flexible selection of network paths in a multi-access (MX) communication environment, based on an application's needs. Other embodiments may be described and/or claimed.

12 Claims, 21 Drawing Sheets

(56) References Cited

U.S. PATENT DOCUMENTS

| | | | |
|---|---|---|---|
| 11,770,734 B2* | 9/2023 | Huang | H04W 48/16 |
| | | | 370/230 |
| 2003/0091054 A1 | 5/2003 | Futenma | |
| 2006/0168336 A1 | 7/2006 | Koyanagi | |
| 2010/0202323 A1 | 8/2010 | Nishida | |
| 2013/0246672 A1 | 9/2013 | Saputra | |
| 2014/0307593 A1* | 10/2014 | Zhao | H04L 5/1469 |
| | | | 370/278 |
| 2015/0023335 A1* | 1/2015 | Vermani | H04L 27/261 |
| | | | 370/338 |
| 2015/0029879 A1 | 1/2015 | Chou et al. | |
| 2015/0078359 A1 | 3/2015 | Scahill et al. | |
| 2015/0215835 A1 | 7/2015 | Sirotkin | |
| 2016/0112896 A1 | 4/2016 | Karampatsis | |
| 2016/0270145 A1 | 9/2016 | Srinivasa Gopalan et al. | |
| 2016/0381491 A1 | 12/2016 | Watfa et al. | |
| 2017/0019830 A1 | 1/2017 | Lindoff et al. | |
| 2017/0093541 A1 | 3/2017 | Pan et al. | |
| 2018/0027508 A1 | 1/2018 | Tanaka | |
| 2018/0077022 A1 | 3/2018 | Van Oost et al. | |
| 2018/0092085 A1 | 3/2018 | Shaheen et al. | |
| 2018/0018385 A1 | 6/2018 | Sabella et al. | |
| 2018/0270742 A1 | 9/2018 | Bergstrom et al. | |
| 2019/0036841 A1 | 1/2019 | Nolan | |
| 2019/0306749 A1 | 10/2019 | Bergstrom et al. | |
| 2019/0306752 A1 | 10/2019 | Lai | |
| 2019/0394833 A1* | 12/2019 | Talebi Fard | H04W 60/00 |
| 2020/0045612 A1 | 2/2020 | Stauffer et al. | |
| 2020/0053018 A1 | 2/2020 | White et al. | |
| 2020/0178196 A1 | 6/2020 | Wang et al. | |
| 2020/0389469 A1* | 12/2020 | Litichever | H04L 63/145 |
| 2021/0007166 A1* | 1/2021 | Liao | H04W 48/16 |
| 2021/0051104 A1 | 2/2021 | He | |
| 2021/0058936 A1* | 2/2021 | Gordaychik | H04W 72/0453 |
| 2021/0100047 A1 | 4/2021 | Chiba et al. | |
| 2021/0144590 A1 | 5/2021 | Li | |
| 2021/0211914 A1 | 7/2021 | De La Oliva et al. | |
| 2021/0306900 A1 | 9/2021 | Mehta | |
| 2021/0385865 A1* | 12/2021 | Mueck | H04W 80/02 |
| 2021/0400537 A1* | 12/2021 | Zhang | H04L 47/28 |
| 2021/0409335 A1* | 12/2021 | Zhu | H04L 47/24 |
| 2022/0109633 A1* | 4/2022 | Li | H04W 48/08 |
| 2022/0124543 A1* | 4/2022 | Orhan | G06N 3/006 |
| 2022/0191733 A1 | 6/2022 | Ali et al. | |
| 2023/0056442 A1* | 2/2023 | Ly | H04W 24/08 |
| 2023/0189058 A1* | 6/2023 | Yeh | H04W 48/18 |
| | | | 370/329 |
| 2023/0189368 A1 | 6/2023 | Zhou | |
| 2023/0276483 A1 | 8/2023 | Xu et al. | |

FOREIGN PATENT DOCUMENTS

| | | | | |
|---|---|---|---|---|
| WO | WO2017/139699 A1 | 8/2017 | | |
| WO | WO-2017189176 A2* | 11/2017 | | H04W 76/15 |
| WO | WO 2019-076440 A1 | 4/2019 | | |
| WO | WO-2019123447 A1* | 6/2019 | | H04L 12/18 |
| WO | WO 2019-192528 A1 | 10/2019 | | |
| WO | WO 2020/232404 A1 | 11/2020 | | |
| WO | WO-2021097253 A1* | 5/2021 | | G06F 21/78 |
| WO | WO2021/257974 A1 | 12/2021 | | |
| WO | WO-2022005917 A1* | 1/2022 | | H04W 28/0804 |
| WO | WO2022005918 A1 | 1/2022 | | |

OTHER PUBLICATIONS

International Preliminary Report on Patentability mailed Oct. 13, 2022 for International Patent Application PCT/US2020/066969, 8 pages.

International Search Report and Written Opinion mailed Aug. 31, 2020 for International Patent Application No. PCT/US2020/033261, 14 pages.

International Preliminary Report on Patentability mailed Nov. 25, 2021 for International Patent Application No. PCT/US2020/033261, 10 pages.

"3rd Generation Partnership Project; Technical Specification Group Services and System Aspects; Study on access traffic steering, switch and splitting support in the 5G system architecture (Release 16)", 3GPP TR 23.793 v16.0.0, 115 pages (Dec. 19, 2018).

S. Kanugovi et al., "Multiple Access Management Services", draft-kanugovi-intarea-mams-framework-03, Internet Engineering Task Force (IETF), 156 pages (Feb. 28, 2019), https://tools.ietf.org/search/draft-kanugovi-intarea-mams-framework-03.

S. Kanugovi et al., Multiple Access Management Services, draft-kanugovi-intarea-mams-framework-04, Internet Engineering Task Force (IETF), 122 pages (May 31, 2019), https://datatracker.ietf.org/doc/html/draft-kanugovi-intarea-mams-framework-04.

J. Zhu et al., "User-Plane Protocols for Multiple Access Management Service", draft-zhu-intarea-mams-user-protocol-07, Internet Engineering Task Force (IETF), 14 pages (Apr. 3, 2019), https://datatracker.ietf.org/doc/html/draft-zhu-intarea-mams-user-protocol-07.

"3rd Generation Partnership Project; Technical Specification Group Services and System Aspects; System Architecture for the 5G System; Stage 2 (Release 16)", 3GPP TS 23.501 v16.1.0, 368 pages (Jun. 11, 2019).

"3rd Generation Partnership Project; Technical Specification Group Core Network and Terminals; 5G System; Access and Mobility Management Services; Stage 3 (Release 16)", 3GPP TS 29.518 V16.0.0, 199 pages (Jun. 13, 2019).

"Multi-access Edge Computing (MEC); Framework and Reference Architecture", ETSI GS MEC 003 V2.1.1, 21 pages (Jan. 2019).

"Multi-access Edge Computing (MEC); Phase 2: Use Cases and Requirements", ETSI GS MEC 002 V2.1.1, 66 pages (Oct. 2018).

"Mobile Edge Computing(MEC); Bandwidth Management Api", ETSI GS MEC 015 V1.1.1, 20 pages (Oct. 2017).

"3rd Generation Partnership Project; Technical Specification Group Core Network and Terminals; 5G System; Network Exposure Function Northbound APIs; Stage 3 (Release 16)", 3GPP TS 29.522 V16.0.0, 43 pages (Jun. 18, 2019).

"Multi-access Edge Computing (MEC); General principles for MEC Service APIs Disclaimer", ETSI GS MEC 009 V2.1.1, 64 pages (Jan. 2019).

"3rd Generation Partnership Project; Technical Specification Group Services and System Aspects; System Architecture for the 5G System; Stage 2 (Release 16)" 3GPP TS 23.501 v16.0.2, 317 pages (Apr. 1, 2019).

"3rd Generation Partnership Project; Technical Specification Group Core Network and Terminals; 5G System; Access and Mobility Management Services; Stage 3 (Release 15)", 3GPP TS 29.518 V15.3.0, 195 pages (Mar. 24, 2019).

"Mobile Edge Computing (MEC); Radio Network Information API", ETSI GS MEC 012 V1.1.1, 57 pages (Jul. 2017).

Extended European Search Report mailed May 10, 2023 for European Patent Application No. 20806061.6, 11 pages.

S. Kanugovi Nokia e al., "Multiple Access Management Services; Draft-Kanugovi-intarea-mams-fraaework-03", (Feb. 28, 2019), 141 pages.

3GPP, "3rd Generation Partnership Project; Technical Specification Group Services and System Aspects; Study on access traffic steering, switch and splitting support in the 5G system architecture (Release 16)", 3GPP TR 23.793 V16.0.0 (Dec. 2018), 114 pages.

International Preliminary Report on Patentability mailed Dec. 29, 2022 for International Patent Application PCT/US2021/038063, 10 pages.

Nádas et al., "Per Packet Value: A Practical Concept for Network Resource Sharing", 2016 IEEE Global Communications Conference (Globecom), pp. 1-7 (Dec. 4, 2016).

Laki et al., "Take your own share of the Pie", Proceedings of the Applied Networking Research Workshop, pp. 27-32 (Jul. 15, 2017).

Nádas et al., "Towards a congestion control-independent core-stateless AQM", Proceedings of the Applied Networking Research Workshop, pp. 84-90 (Jul. 16, 2018).

Laki et al., "Scalable Per Subscriber QoS with Core-Stateless Scheduling", ACM SIGCOMM Industrial Demos, 2 pages (2018).

(56) References Cited

OTHER PUBLICATIONS

Nádas et al., "Stateless resource sharing in networks with multi-layer virtualization", 2019 IEEE International Conference on Communications (ICC), pp. 1-7 (May 20, 2019).
Nádas et al., "Towards core-stateless fairness on multiple timescales", Proceedings of the Applied Networking Research Workshop, pp. 30-36 (Jul. 22, 2019).
Fejes et al., "Decoupling delay and resource sharing targets with efficient core-stateless AQM", Proceedings of the ACM SIGCOMM 2019 Conference Posters and Demos, pp. 128-130 (Aug. 19, 2019).
Fejes et al., "Who will Save the Internet from the Congestion Control Revolution?", Proceedings of the 2019 Workshop on Buffer Sizing, Stanford University, 6 pages (2019), http://ppv.elte.hu/buffer-sizing/.
Fejes et al., "On the Incompatibility of Scalable Congestion Controls over the Internet", 2020 IFIP Networking Conference (Networking), IEEE, pp. 749-754 (Jun. 22, 2020), http://ppv.elte.hu/scalable-cc-comp/.
Nádas et al., A congestion control independent L4S scheduler. InProceedings of the Applied Networking Research Workshop, pp. 45-51 (Jul. 27, 2020).
Laki et al., "Core-Stateless Forwarding With QoS Revisited: Decoupling Delay and Bandwidth Requirements", IEEE/ACM Transactions on Networking 29, No. 2, pp. 503-516 (Dec. 9, 2020).
Fejes et al., "A Core-Stateless L4S Scheduler for P4-enabled hardware switches with emulated HQoS", IEEE Infocom 2021 Demo (Virtual), 2 pages (2021), http://ppv.elte.hu/ic21/.
Bemten et al., "Network Calculus: A Comprehensive Guide", Technical Report No. 201603, 57 pages (Oct. 8, 2016).
Charny et al., "Delay Bounds in a Network with Aggregate Scheduling", International Workshop on Quality of Future Internet Services 2000 (QoFIS'2000), Springer Berlin, Heidelberg, pp. 1-13 (Sep. 25, 2000).
Zhu et al., "Generic Multi-Access (GMA) Encapsulation Protocol", draft-zhu-intarea-gma-07, 13 pages (May 14, 2020).
Feng et al., "The Blue active queue management algorithms", 19 pages, (Sep. 2002), http://www.researchgate.net/publication/3334841.
Mustafa Maad Hamdi et al., "A review on Queue Management Algorithms in Large Networks", IOP Conference Series: Materials Science and Engineering, vol. 1076, No. 1, p. 012034, 13 pages (Feb. 1, 2021), https://iopscience.iop.org/article/10.1088/1757-899X/1076/1/012034/pdf.
Nichols et al., "Definition of the Differentiated Services Field (DS Field) in the IPv4 and IPv6 Headers", IETF RFC 2474, 20 pages (Dec. 1998).
Ramakrishnan et al., "The Addition of Explicit Congestion Notification (ECN) to IP", IETF RFC 3168, 63 pages (Sep. 2001).
Amante et al., "IPv6 Flow Label Specification", IETF RFC 6437, 15 pages (Nov. 2011).
D. Black, "Relaxing Restrictions on Explicit Congestion Notification (ECN) Experimentation", IETF RFC 8311, 20 pages (Jan. 2018).
G. Fairhurst, "Update to IANA Registration Procedures for Pool 3 Values in the Differentiated Services Field Codepoints (DSCP) Registry", IETF RFC 8436, 7 pages (Aug. 2018).
Zhu et al., "Improving QoE for Skype Video Call in Mobile Broadband Network", 2012 IEEE Global Communications Conference (Globecom), pp. 1938-1943 (Dec. 3, 2012).
Kanugovi et al., "Control Plane Protocols and Procedures for Multiple Access Management Services", IETF, draft-zhu-intarea-mams-control-protocol-02 (Jul. 3, 2017), 31 pages.
Li et al., "Multipath Transmission for Internet: A Survey", 39 pages, IEEE Communications Surveys & Tutorials, vol. 18, No. 4, Fourth Quarter 2016, pp. 2887-2925 (Jun. 29, 2016).
"TCP Keep-Alives" in Braden, "Requirements for Internet Hosts—Communication Layers", IETF RFC 1122, section 4.2.3.6, pp. 101-102 (Oct. 1, 1989), 2 pages.
Sangeetha Bangolae et al., "Performance Study of Fast BSS Transition using IEEE 802.11r", Proceedings of the 2006 Int'l Conference on Wireless Comm. and Mobile Computing (IWCMC '06), pp. 737-742 (Jul. 3, 2006), https://dl.acm.org/doi/pdf/10.1145/1143549.1143696.
"Wi-Fi Roaming Aggressiveness Setting", Intel Corporation, Article ID 000005546, 2 pages (Oct. 28, 2021).
Yordan, "Oppo and vivo announce Dual Wi-Fi for their flagships", GSMArena.com, 3 pages (Jul. 18, 2019), https://www.gsmarena.com/oppo_vivo_dual_wifi-news-38203.php.
Q. De Coninck et al., "Multipath Extensions for Quic (MP-QUIC)", IETF, draft-deconinck-quic-multipath-07, 36 pages (May 3, 2021), https://datatracker.ietf.org/doc/html/draft-deconinck-quic-multipath-07.
J. Zhu et al., "Generic Multi-Access (GMA) Encapsulation Protocol", IETF, draft-zhu-intarea-gma-14, 17 pages (Nov. 24, 2021), https://datatracker.ietf.org/doc/html/draft-zhu-intarea-gma-14.
J. Zhu et al., "User-Plane Protocols for Multiple Access Management Service", IETF, draft-zhu-intarea-mams-user-protocol-09, 8 pages (Mar. 4, 2020).
"3rd Generation Partnership Project; Technical Specification Group Core Network and Terminals; 5G System; Access Traffic Steering, Switching and Splitting (ATSSS); Stage 3 (Release 17)", 3GPP TS 24.193 v17.2.0 (Sep. 24, 2021), 71 pages.
"3rd Generation Partnership Project; Technical Specification Group Core Network and Terminals; Access Network Discovery and Selection Function (ANDSF) Management Object (MO) (Release 16)", 3GPP TS 24.312 v16.0.0 (Jul. 9, 2020), 394 pages.
"3rd Generation Partnership Project; Technical Specification Group Radio Access Network; Evolved Universal Terrestrial Radio Access (E-UTRA); LTE/WLAN Radio Level Integration Using IPsec Tunnel (LWIP) encapsulation; Protocol specification (Release 16)", 3GPP TS 36.361 v16.0.0 (Jul. 24, 2020), 10 pages.
G. Dommety, "Key and Sequence Number Extensions to GRE", Internet Engineering Task Force (IETF) RFC 2890, 7 pages (Sep. 2000).
A. Huttunen et al., "UDP Encapsulation of IPsec ESP Packets", Internet Engineering Task Force (IETF) RFC 3984, 15 pages (Jan. 2005).
A. Ford et al., "TCP Extensions for Multipath Operation with Multiple Addresses", Internet Engineering Task Force (IETF) RFC 6824, 64 pages (Jan. 2013).
N. Leymann et al., "Huawei's GRE Tunnel Bonding Protocol", Internet Engineering Task Force (IETF) RFC 81557, 44 pages (May 2017).
S. Kanugovi et al., "Multi-Access Management Services (MAMS)", Internet Engineering Task Force (IETF) RFC 8743, 143 pages (Mar. 2020).
J. Zhu et al., "Generic Multi-Access (GMA) Encapsulation Protocol", Internet Engineering Task Force (IETF) RFC 9188, 15 pages (Feb. 2022).
Boyd et al., "Convex Optimization", Cambridge University Press, Cambridge, UK, ISBN: 978-0-521-83378-3, 730 pages (Mar. 2004).
"Multi-access Edge Computing (MEC); Radio Network Information API", ETSI GS MEC 012 V2.1.1, 66 pages (Dec. 2019).
Ford et al., "TCP Extensions for Multipath Operation with Multiple Addresses", Internet Engineering Task Force (IETF), Internet Draft, draft-ietf-mptcp-multiaddressed-09, 62 pages (Jun. 6, 2012), https://datatracker.ietf.org/doc/html/draft-ietf-mptcp-multiaddressed-09.
"Intel® Network Edge Virtualization (NEV) Software Development Kit", Intel Corp., Intel® Network Edge Virtualization Product Brief, 3 pages (Aug. 16, 2015), https://networkbuilders.intel.com/docs/Intel_Wireless_Product_Brief_for_IDF_v8.pdf.
"Simplify Application Development for the Network Edge", Intel Corp., Service Provider NFV, White Paper, 5 pages (Sep. 26, 2018), https://www.intel.com/content/dam/www/public/us/en/documents/white-papers/nev-sdk-white-paper.pdf.
"O-RAN Architecture Description", O-RAN Alliance, O-RAN-WG1-O-RAN Architecture Description, v01.00.00, 24 pages (Feb. 2020).
"O-RAN Working Group 2, AI/ML workflow description and requirements", O-RAN Alliance, ORAN-WG2.AIML, v01.00, 34 pages (Dec. 2019).

(56) References Cited

OTHER PUBLICATIONS

Singh et al., "Optimal Traffic Aggregation in Multi-RAT Heterogeneous Wireless Networks", IEEE ICC2016-Workshops: W09-Workshop on 5G RAN Design, 6 pages (Mar. 7, 2016).
Zhu et al., "Generic Multi-Access (GMA) Convergence Encapsulation Protocols", INTAREA/Network Working Group, Internet Draft, draft-zhu-intarea-gma-04, 10 pages (Sep. 30, 2019), https://datatracker.ietf.org/doc/pdf/draft-zhu-intarea-gma-04.
Zhu et al., "Generic Multi-Access (GMA) Convergence Encapsulation Protocols", INTAREA/Network Working Group, Internet Draft, draft-zhu-intarea-gma-05, 12 pages (Dec. 16, 2019), https://datatracker.ietf.org/doc/pdf/draft-zhu-intarea-gma-05.
International Search Report and Written Opinion mailed Apr. 15, 2021 for International Patent Application PCT/US2020/066969, 13 pages.
Office Action mailed Mar. 6, 2024 for U.S. Appl. No. 17/469,331, 96 pages.
Nikc McKeown et al., "Tiny Tera: A Packet Switch Core", IEEE Micro, IEEE Service Center, Los Alamitos, CA, US deel 17, nr.1, (Jan. 1, 1997), 8 pages.
S. Kanugovi et al., "Multi-Access Management Services (MAMS)", rtc8743.txt, Multi-Access Management Services (MAMS); RFC8743.TXT, Internet Engineering Task Force, IETF; Standard, Internei Society (Isoc) 4, Rue Des Falaises CH-1205 Geneva, Switzerland, (Mar. 25, 2020), 73 pages.
International Search Report and Written Opinion mailed Oct. 8, 2021 for International Patent Application No. PCT/US2021/039253, 12 pages.
"3rd Generation Partnership Project; Technical Specification Group Services and System Aspects; Study on access traffic steering, switch and splitting support in the 5G system architecture (Release 16)", 3GPP TR 23.793 V16.0.0 (Dec. 19, 2018), 114 pages.
"3rd Generation Partnership Project; Technical Specification Group Services and System Aspects; Study on Access Traffic Steering, Switch and Splitting support in the 5G system architecture Phase 2 (Release 17)", 3GPP TR 23.700-93 V0.1.1 (Jun. 23, 2020), 43 pages.
International Preliminary Report on Patentability mailed Jan. 12, 2023 for International Patent Application No. PCT/US2021/039253, 7 pages.
International Search Report and Written Opinion mailed Nov. 19, 2021 for International Patent Application No. PCT/US2021/039252, 13 pages.
International Preliminary Report on Patentability mailed Jan. 12, 2023 for International Patent Application No. PCT/US2021/039252, 8 pages.
U.S. Appl. No. 63/025,086 "Dynamic Traffic Management in Next Generation Multi-Access Management Service Frameworks", filed May 14, 2020, 78 pages.
U.S. Appl. No. 17/922,947 "RAN-Aware Traffic Distribution Rules and Ran Measurements for Enhanced Access Traffic Steering Switching and Splitting", filed Nov. 2, 2022, 92 pages.
U.S. Appl. No. 17/925,430 "Wireless Local Area Network Enhancements for Access Traffic Steering Switching Splitting", filed Nov. 15, 2022, 64 pages.
"3rd Generation Partnership Project; Technical Specification Group Services and System Aspects; System architecture for the 5G System (5GS); Stage 2 (Release 15)", 3GPP TS 23.501 V15.9.0 (Mar. 27, 2020), 248 pages.
A. Ford et al., "RFC 8684 TCP Extensions for Multipath Operation with Multiple Addresses": http://tools.ietf.org/html/draft-ietf-mptcp-multiaddressed-09, 6 pages (Mar. 2020).
"3rd Generation Partnership Project; Technical Specification Group Services and System Aspects; Management and orchestration; 5G performance measurements (Release 16)", 3GPP TS 28.552 V16.5.0 (Mar. 27, 2020), 173 pages.
"3rd Generation Partnership Project; Technical Specification Group Radio Access Network; Evolved Universal Terrestrial Radio Access (E-UTRA); Layer 2—Measurements (Release 15)", 3GPP TS 36.314 V15.2.0 (Jan. 11, 2019), 28 pages.
"IEEE Standard for Information technology—Telecommunications and information exchange between systems Local and metropolitan area networks—Specific requirements—Part 11: Wireless LAN Medium Access Control (MAC) and Physical Layer (PHY) Specifications," IEEE Std 802.11-2016, 3534 pages (Dec. 14, 2016).
Wi-Fi Alliance, "Wi-Fi Agile Multiband Technical Specification", Version 1.5, 32 pages (2020).
Wi-Fi Alliance, "Optimized Connectivity Specification", Version 1.1.6, 26 pages (2020).
Extended European Search Report issued Jun. 14, 2024 for EP Application No. 21825017.3, 4 pages.
Deutsche Bahn AG, "Exemplary Mapping of 3GPP Building Blocks to FRMCS Logical Architecture Draft," ETSI Draft RT(19)075028r3, ETSI, Dec. 12, 2019, 13 pages.
Office Action mailed Jun. 21, 2024 for U.S. Appl. No. 17/437,711, 96 pages.
Notice of Allowance mailed Aug. 20, 2024 for U.S. Appl. No. 17/469,331, 21 pages.
Notice of Allowance mailed Aug. 2, 2024 for U.S. Appl. No. 17/923,170, 71 pages.
Office Action mailed Sep. 18, 2024 for U.S. Appl. No. 17/797,661, 72 pages.
J. Zhu et al., "Generic Multi-Access (GMA) Encapsulation Protocol draft-zhu-intarea-gma-07", INTAREA/Network Working Group Draft, 13 pages (May 14, 2020), https://datatracker.ietf.org/doc/html/draft-zhu-intarea-gma-07.
S. Kanugovi et al., "Multi-Access Management Services (MAMS)", IETF RFC 8743, 143 pages (Mar. 2020), https://www.rfc-editor.org/rfc/rfc8743.html.
International Search Report and Written Opinion mailed Oct. 6, 2021 for Int'l App. No. PCT/US2021/038063, 14 pages.
"3GPP; TSG SA; Study on enhanced support of Industrial Internet of Things (IIoT) in 5G System (Release 17)", 3GPP TR 23.700-20 V0.3.0 (Jan. 28, 2020).
Han-Chuan Hsieh et al., "5G Virtualized Multi-access Edge Computing Platform for IoT Applications", Journal of Network and Computer Applications, vol. 115, pp. 94-102 (May 10, 2018).

* cited by examiner

TRAFFIC STEERING AND CROSS-LAYER AND CROSS-LINK MOBILITY MANAGEMENT TECHNIQUES FOR MULTI-ACCESS MANAGEMENT SERVICES

TECHNICAL FIELD

The present application is generally related to Edge computing, network communication, and communication system implementations, and in particular, to Multiple Access Management Services (MAMS) systems/networks and Generic Multi-Access (GMA) frameworks.

BACKGROUND

Multiple Access Management Services (MAMS) is a programmable framework that provides mechanisms for flexible selection of network paths in a multi-connection (access) communication environment based on application needs and/or requirements. The MAMS framework can be supported by an Edge computing system/network, such as ETSI MEC or the like. Additionally, the Third Generation Partnership Project (3GPP) Fifth Generation (5G) system architecture has been extended to support functionality similar to MAMS, which is referred to as Access Traffic Switching, Steering, and Splitting (ATSSS).

BRIEF DESCRIPTION OF THE DRAWINGS

In the drawings, which are not necessarily drawn to scale, like numerals may describe similar components in different views. Like numerals having different letter suffixes may represent different instances of similar components. Some implementations are illustrated by way of example, and not limitation, in the figures of the accompanying drawings in which.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the present disclosure. However, it will be apparent to those skilled in the art having the benefit of the present disclosure that the various aspects of the present disclosure may be practiced in other ways that depart from the specific details discussed herein. In certain instances, descriptions of well-known devices, circuits, and methods are omitted so as not to obscure the description with unnecessary detail.

1. Mobility Management for Multi-Access Management Services (MAMS)

1.1. Hierarchical Traffic Steering Techniques

Figure 10:
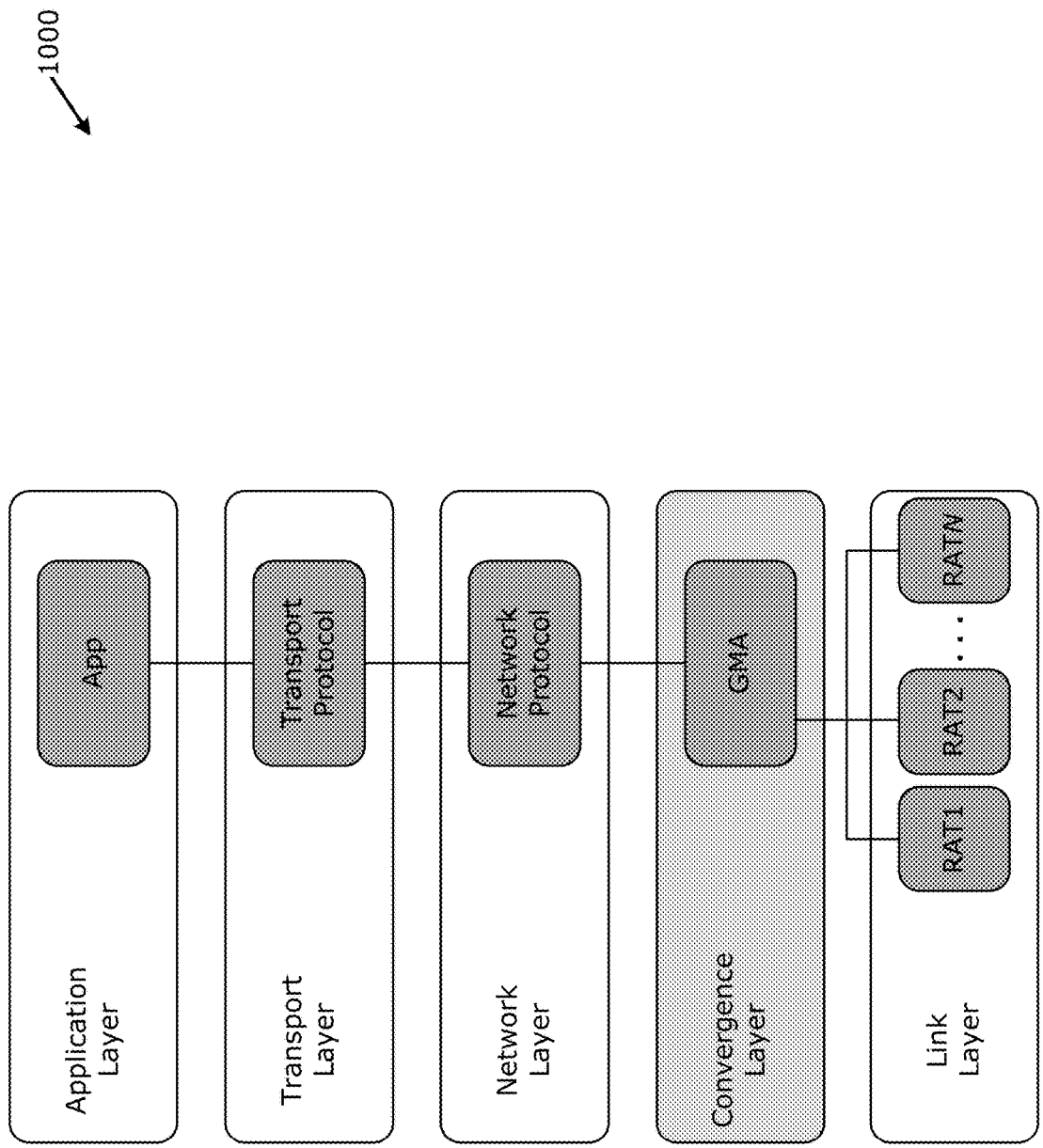
FIG. 10 depicts a Network model with convergence layer.

As discussed in more detail infra, a network device (or MX node) may simultaneously connect to multiple networks using individual links of the same or different RATs (e.g., LTE, WiFi, 5G, etc.). A new convergence protocol (e.g., [GMA14]) can be used to provide improved Quality of Service (QoS) and/or Quality of Experience (QoE) to MX nodes. As shown by FIG. 10, the convergence protocol/layer operates between the network layer and the link layer. The convergence layer includes a transmitter (Tx) entity (e.g., a GMA Tx or the like) and receiver (Rx) entity (e.g., a GMA Rx or the like). The convergence layer Tx entity can perform one or more of the following operations to provide improved QoS and/or QoE: steering (e.g., moving data traffic from one connection to another), splitting (e.g., splitting data traffic and send them over multiple connections), and duplication (e.g., sending duplicated copies of user data traffic over multiple connections). The convergence layer Rx entity performs end-to-end (e2e) QoS measurements (e.g., loss, delay, throughput, and/or any other like measurements (or combinations thereof) such as any of those discussed herein) based on received data and/or control packets. The convergence layer Rx entity also reorders out-of-order packets arriving from (over) different connections/links, and eliminates redundant packets.

The present disclosure provides techniques for traffic steering operations, including techniques to support inter-RAT (e.g., traffic steering between two connections using different RATs such as a connection using a WLAN RAT such as WiFi and another connection using a cellular RAT such as 5G/NR or LTE) and intra-RAT traffic steering (e.g., traffic steering between two connections using the same RAT such as two different connections/links using a WLAN RAT such as WiFi).

In MAMS and/or GMA, a virtualized layer (called the "convergence layer") is created as an abstraction layer that hides the number of, and types of, physical links between two MX nodes. Today, applications run on the physical network individually and there can be multiple networks that are available at the network edge. The convergence layer handles link management for MX nodes so that, from the perspective of individual applications in the applications layer, there is only a single virtual link or virtual network even when there are multiple networks (and multiple physical links) may be underneath the convergence layer. In the context of MAMS, this virtual link or virtual network is referred to as an "anchor connection." One anchor connection and multiple delivery connections can be provided for an individual application (or application instance). However, it is difficult to manage these multiple delivery connections, especially when attempting to switch between using different delivery connections.

In embodiments, the convergence layer is subdivided into two layers including logical delivery connections and physical delivery connections. In some implementations, under a logical delivery connection there can be multiple physical delivery connections. Additionally, each logical delivery connection can correspond to a particular RAT (or sub-RAT). For example, one logical delivery connection can correspond to a WiFi RAT (which includes one or more physical WiFi links) and another logical delivery connection can correspond to a cellular RAT (which includes one or more physical cellular RAT links). At any particular time, only one physical delivery connection within a logical connection can be used at a time. The selection of the physical connection within a logical group is the MX node's decision.

In embodiments, traffic steering messages (TSMs) are used to switch between different logical delivery connections and/or between different physical delivery connections within a logical delivery connection. Examples of the TSMs include MX traffic steering request/response messages (TSRs), traffic splitting update messages (TSUs), and probe messages as specified by [RFC8743], [GMA14], [UPMAMS]. In current multi-access frameworks, there is no separation between logical and physical delivery connections, and therefore, there is no mechanism for steering between multiple physical delivery connections. In some implementations, TSRs or TSUs are used to select a logical delivery connection among a set of logical delivery connections, where each logical delivery connection in the set of logical delivery connections have a set of physical delivery connections. Additionally or alternatively, probe messages can be used to select a desired physical delivery connection within a set of physical delivery connections of a logical delivery connection.

Furthermore, in some implementations, some or all of the logical delivery connections may belong to (or operate according to) a same RAT, or may belong to (or operate according to) different RATs. Additionally or alternatively, some or all of the logical delivery connections may belong to (or operate according to) different sub-RATs. Here, a "sub-RAT" may refer to a RAT configured to operate with a particular set of parameters. For example, a first sub-RAT may be a 3GPP LTE RAT operating in a first frequency band/spectrum and a second sub-RAT may be a 3GPP LTE RAT operating in a second frequency band/spectrum different than the first frequency band/spectrum. In another example, a first sub-RAT may be a 3GPP LTE RAT operating according to Frequency Division Multiplexing (FDM) and a second sub-RAT may be a 3GPP LTE RAT operating according to Time Division Multiplexing (TDM). For purposes of the present disclosure, any enumeration of a set of physical RATs can be used.

At least some of the inter-RAT and intra-RAT traffic steering techniques discussed herein are based on the GMA protocol (see e.g., [GMA14] and [UPMAMS]). These implementations operate above the link layer of a communication protocol stack, which provides a unified framework to support mobility at the convergence layer across heterogeneous communication environments (e.g., inter-RAT environments or those including more than one RAT in a given region or area), as well as within the homogenous communication environments (e.g., intra-RAT environments or those including a single RAT in a given region or area). Unlike existing link-layer handover (HO) methods such as those discussed in Bangolae et al., "Performance Study of Fast BSS Transition using IEEE 802.11r", Proceedings of the 2006 Int'l Conference on Wireless Comm and Mobile Computing (IWCMC '06), pp. 737-742 (3 Jul. 2006) https://doi.org/10.1145/1143549.1143696 ("[Bangolae]"), the traffic steering techniques discussed herein are based on multi-access (or multi-radio) architectures. Devices having a multi-access architecture are equipped with multiple access technology interfaces (multiple network interface controllers (NICs) and/or multiple radios), some of which may be used for communications using different access technologies and/or RATs. Multi-access compute nodes can achieve "make-before-break" HOs to avoid HO-related impacts on user experience.

Moreover, the traffic steering techniques discussed herein are more scalable than existing approaches. In some implementations, the traffic steering techniques discussed herein may use existing multi-access (MX) traffic steering messages (see e.g., [RFC8743]) and/or existing traffic steering update messages (TSU) and traffic steering acknowledgement messages (TSA) (see e.g., [UPMAMS]) for inter-RAT traffic steering, in which each RAT is uniquely identified by a connection identifier (ID) parameter, and all the connections/links with the same RAT type share the same connection ID (CID). In other words, all connections of the same RAT are treated as one logical connection at the convergence layer in the MAMS protocol stack (see e.g., [RFC8743] and FIGS. 7-17 discussed infra). This allows the traffic steering capabilities to scale easily with the number of connections of the same RAT an MX device may have. For example, the traffic steering techniques will work the same for a first MX device (e.g., a client device 701 of FIG. 7) equipped with three WLAN transceivers (TRx)/radios and three cellular TRx/radios and a second MX device (e.g., a client device 701 of FIG. 7) equipped with one WLAN TRx/radios and one cellular TRx/radios. Additionally or alternatively, a probe message (see e.g., [RFC8743] and/or [UPMAMS]), which was originally designed for path quality measurement, is used to support intra-RAT traffic steering. The traffic steering techniques discussed herein provide seamless mobility regardless of the type of access technology used.

In the following discussion, a multi-access (MX) compute node (or MX node) may refer to any compute device and/or network device discussed herein such as, for example, any one of clients 401, 701, 801, 1811, 1821; access network(s)/NAN(s) 431, 433, 710A-B, 831, 1831-1833; server(s) 740; GMA Tx entity 1110, GMA Rx entity 1111; network functions (NFs) in CN 750A, 841, CN 1842; GWs 750B, 1220A, 1220B, 1250, MAMS system 835, network elements and/or devices in DN 770 and/or DN 775; edge compute node(s) 1836; cloud 1844, compute nodes 1950, 436; software distribution platform 2005; processor platform(s) 2000; and/or any other software (SW) element/entity and/or a hardware element/entity device as any of those discussed herein. Additionally, a "link" in the following discussion may refer to a wired or wireless communication link, connection, or channel of any type of RAT used to convey information, or may refer to a specific type of RAT (e.g., WiFi, 3GPP LTE, 3GPP 5G/NR, Bluetooth®, and/or the like) used to convey information. Additionally or alternatively, the term a "link" in the following discussion may refer to a particular service used to convey information (e.g., a type of communication service such as email, instant messaging, short message service (SMS), social media network, etc., or a specific service or application such as Skype® provided by Microsoft®, Gmail® provided by Google®, and so forth). Additionally or alternatively, any of the links, connections, channels, etc. in the following discussion may correspond to any of links/connections 705, 706, 707, 811, 821, 823, 1803, 1805, 1807 of FIGS. 7, 8, and 18.

1.1.1. Inter-RAT Traffic Steering Techniques

Figure 1:
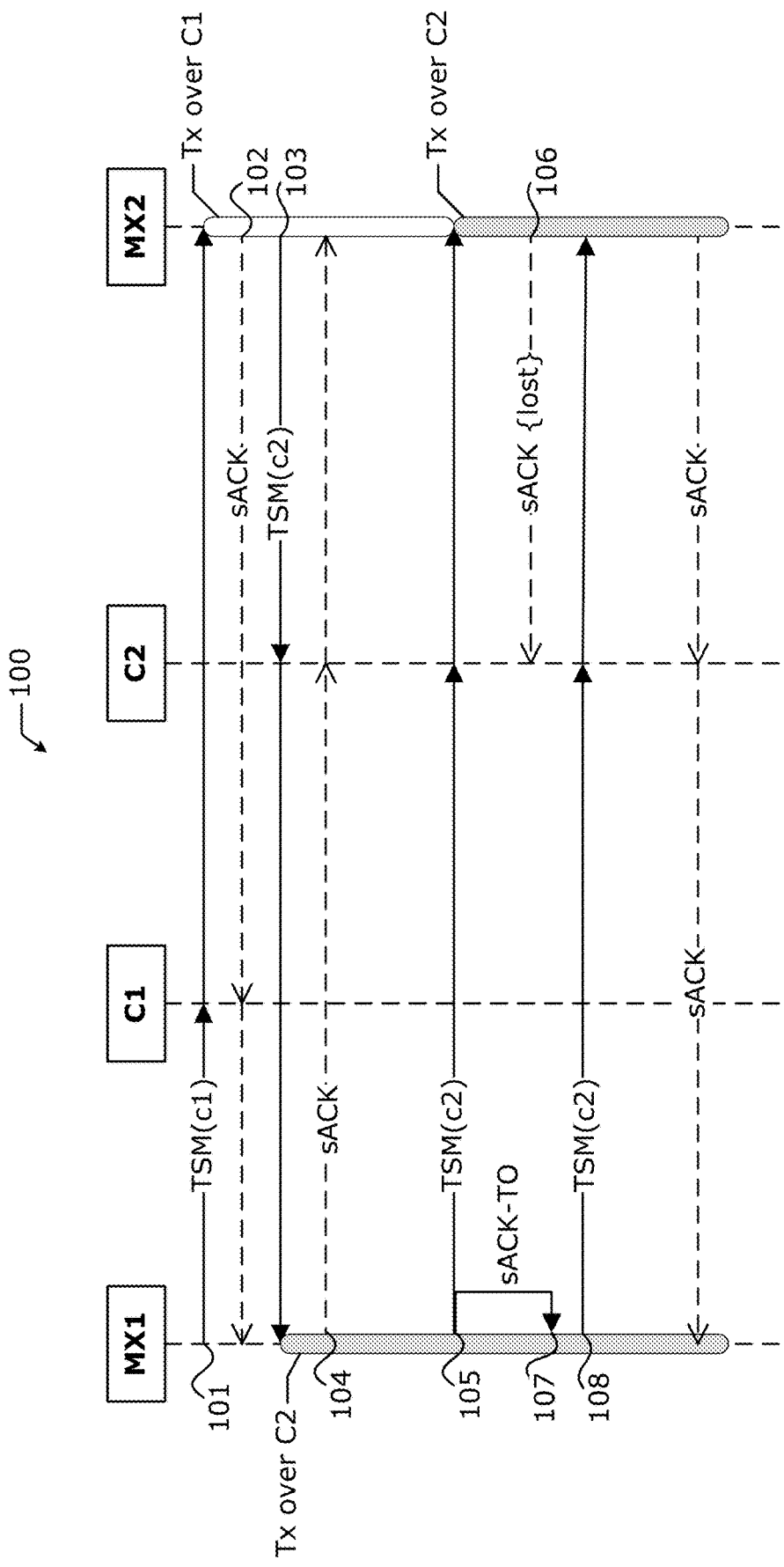
FIGS. 1 and 2 depict example inter-radio access technology (RAT) traffic steering procedures.

FIG. 1 depicts an example inter-RAT unidirectional traffic steering procedure 100 according to various embodiments. The procedure 100 is performed among a first MX compute node ("MX1") and a second MX compute node ("MX2") over two connections including a first connection (C1) and a second connection (C2). The connections C1 and C2 may be connections/links of the same RAT or connections/links of different RATs.

For Rx-based one-direction traffic steering, a receiver entity (Rx) selects the connection for data transfer based on, for example, quality of service (QoS)-related measurements (e.g., delay measurements, loss measurements, signal strength measurements, and/or any other like measurements (or combinations thereof) such as any of those discussed herein), which may be measured or otherwise obtained as discussed in ['994]. At any time, a client (e.g., MX client 701 of FIG. 7) may request traffic steering for downlink (DL) traffic, and a server (e.g., MX server 740 of FIG. 7) may request traffic steering for uplink (UL) traffic.

For example, the MX1 sends a traffic steering message (TSM) requesting traffic steering towards C1 ("TSM(c1)") to MX2 over C1 (101), and MX2 sends a steering acknowledgement (sACK) over C1 to acknowledge receipt of the TSM(c1) (102). In this example, MX1 is the Rx requesting that MX2 send data over C1 because, from MX1's perspective, QoS measurements for C1 are more favorable than QoS measurements for C2. If MX1 detects a better link than C1 based on QoS-related measurements, MX1 will send another TSM to steer downlink (DL) traffic (e.g., where MX1 is an MX client 701) or uplink (e.g., where MX1 is an MX server 740) accordingly.

Before, during, or after operations 101 and 102, MX2 sends a TSM to MX1 over C2 ("TSM(c2)") requesting transmissions to take place over C2 (103), and MX1 sends an sACK over C2 to acknowledge receipt of the TSM(c2) (104). In this example, MX2 is the Rx requesting that MX1 send data over C2 because, from MX2's perspective, QoS measurements for C2 are more favorable than QoS measurements for C1. If MX2 detects a better link based on QoS-related measurements, MX2 will send another TSM to steer downlink (DL) traffic (e.g., where MX2 is an MX client 701) or uplink (e.g., where MX2 is an MX server 740) accordingly.

Additionally, if a TSM or an sACK is lost, the sender will detect the loss through a timeout and trigger retransmission. For example, MX1 can send a TSM(c2) to MX2 (105), and in response, MX2 sends an sACK to MX1 which is lost (106). This results in an sACK timeout (TO) to occur at MX1 (107), which triggers retransmission of the TSM(c2) (108).

Figure 2:
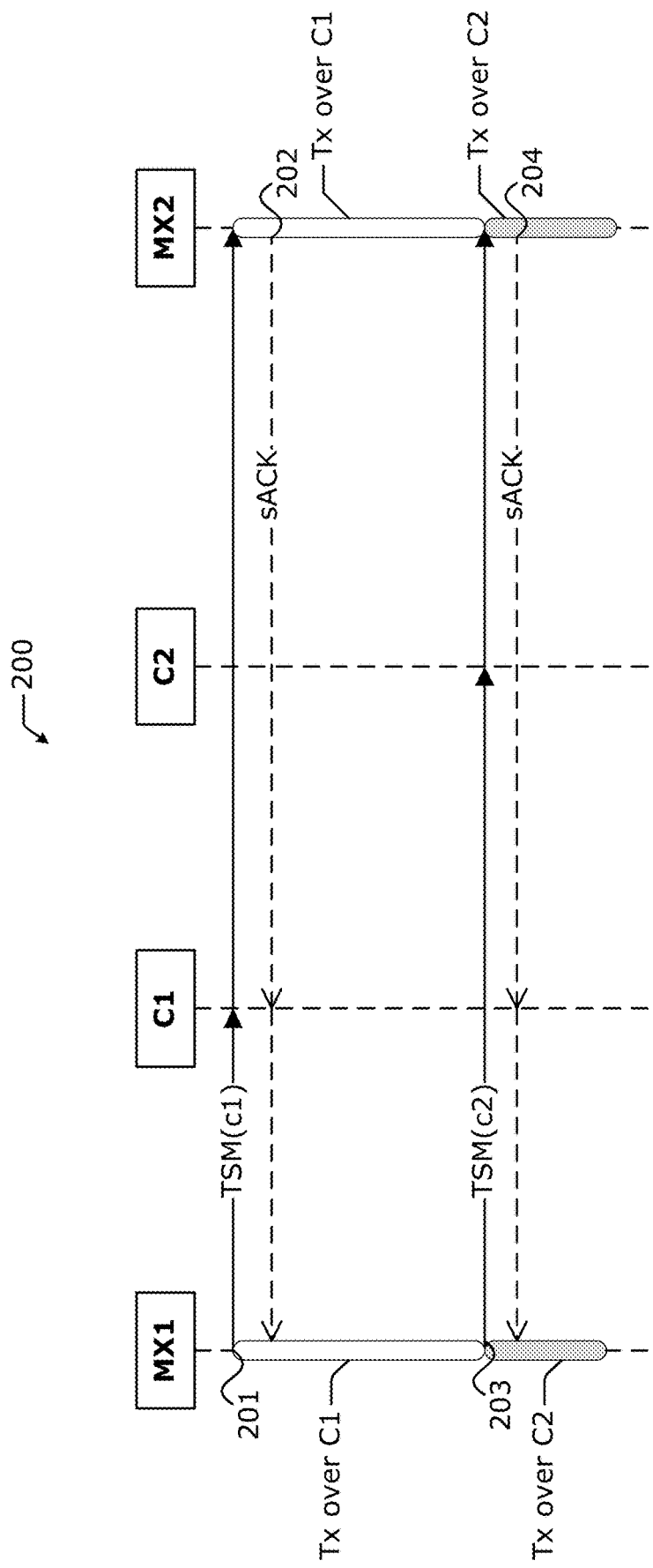

FIG. 2 depicts an example MX node-based inter-RAT bi-direction traffic steering procedure 200 according to various embodiments. In MX node-based inter-RAT bi-direction traffic steering, either MX1 or MX2, selects a connection for both DL and UL traffic. For example, in FIG. 2 MX1 initially steers data traffic toward C1 and sends a TSM ("TSM(c1)") over C1 to steer downlink traffic towards C1 (201). When MX2 receives the TSM(c1), MX2 responds with an sACK (202) and starts sending data traffic to MX1 over C1. At any time, MX1 can steer UL/DL traffic to another connection (203, 204). In some implementations, connections that traffic is steered away from (e.g., C1 for the example involving operations 203 and 204) are kept alive by periodic probe messages as discussed in U.S. Provisional App. No. 63/243, 865 filed on 14 Sep. 2021 ("['865]"), which is hereby incorporated by reference in its entirety. This allows the MX1 (or MX2) to trigger UL/DL traffic steering by sending an appropriate TSM. If a TSM or sACK is lost, the transmitting MX node will detect the loss through timeout timer and trigger retransmission as discussed previously.

In some implementations, a traffic steering entity/element in an MX node (e.g., a convergence layer or GMA layer as discussed herein) may operate in one of a unidirectional traffic steering mode (e.g., to perform operations discussed previously with respect to FIG. 1) or a bidirectional traffic steering mode (e.g., to perform operations discussed previously with respect to FIG. 2). Additionally or alternatively, a traffic steering entity/element in an MX node (e.g., a convergence layer or GMA layer as discussed herein) may dynamically switch between the unidirectional and the bidirectional modes. In one example, a traffic steering configuration can be negotiated through control messages, and such control messages may be used to negotiate or otherwise specify the unidirectional mode or the bidirectional mode.

1.1.2. Intra-RAT Traffic Steering Techniques

For intra-RAT traffic steering, the MX nodes may be equipped with multiple interfaces for accessing the same access technology (or RAT) such as, for example, multiple WLAN (e.g., WiFi) interfaces for accessing two or more WLAN (e.g., WiFi) links/connections. An MX node may connect to multiple network access nodes (NANs) (e.g., multiple WiFi access points via respective WiFi links, multiple cellular base stations via respective cellular links, multiple peer devices using multiple Bluetooth® connections, etc.) simultaneously, but in most cases only uses one of the connections/links for data transfer, leaving others in a standby mode (e.g., a "hot standby"). In various embodiments, multiple connections of the same RAT may share the same CID. In these embodiments, from the perspective of a first MX node, a second MX node has only one logical connection per RAT, no matter how many physical or logical connections the second MX node has using the same RAT. In these embodiments, the first MX node may be an MX server 740, a GMA server (Gs) 1240, and/or any other device or entity discussed herein, and the second MX node may be an MX client 701, GMA client (Gc) 1201, and/or any other device or entity discussed herein.

Figure 3:
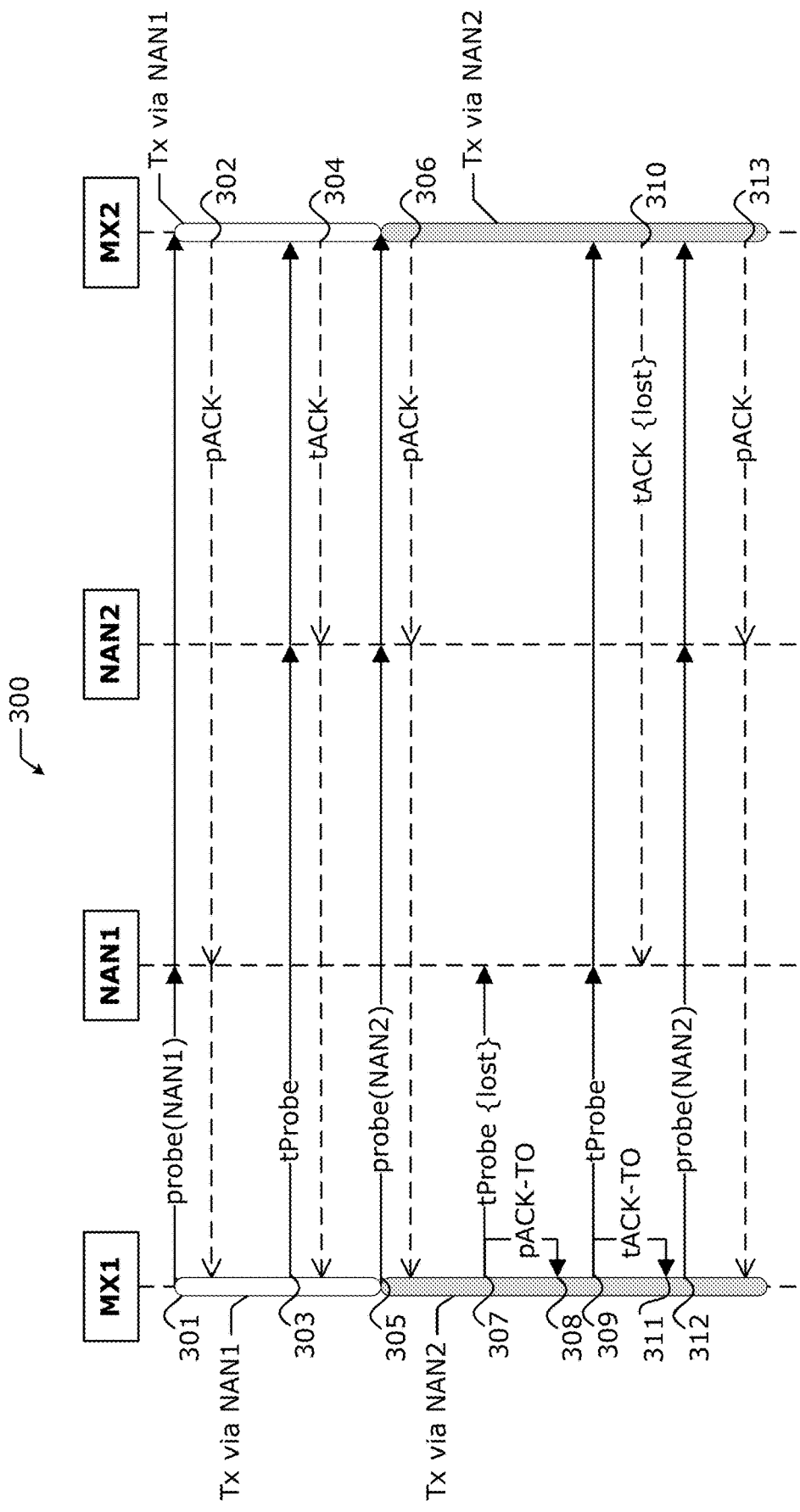
FIG. 3 depicts an example intra-RAT traffic steering procedure.

FIG. 3 shows an example intra-RAT traffic steering procedure 300 according to various embodiments. In this example, MX1 is acting as a Tx MX node and MX2 is acting as an Rx MX node, and are both capable of accessing at least two connections, including a first connection with a first NAN (NAN1) and a second connection with a second NAN (NAN2) using the same RAT. In embodiments, the Tx MX node (e.g., a client 701, 1201, etc.) selects a connection for both DL and UL traffic (i.e., steers traffic towards a target connection). In an example, NAN1 and NAN2 are both WiFi APs, and MX1 and MX2 are equipped with at least two WiFi RAT TRx/radios, and connected to NAN1 and NAN2 simultaneously. Like the inter-RAT traffic steering techniques discussed previously, the intra-RAT traffic steering can also be based on QoS-related measurements (e.g., delay, loss, signal strength, and/or any other like measurements (or combinations thereof) such as any of those discussed herein).

The TSMs discussed herein include an identifier (e.g., a CID and/or some suitable network address or variant thereof) to identify a target connection that data traffic will be steered to, which cannot be used for intra-RAT traffic steering. Accordingly, in various embodiments a probe message is used for intra-RAT traffic steering, and an Rx MX node (e.g., server 740, 1240, etc.) updates connection information based on a last (or most recently) received probe message. Additionally or alternatively, the Rx MX node (e.g., server 740, 1240, etc.) also updates the destination network address (e.g., IP address, or the like) and destination port number (e.g., UDP port number, or the like) of outgoing packets according to the source network address (e.g., IP address, or the like) and source port number (e.g., UDP port number, or the like) of the probe (or indicated by the most recently received probe message). For example, in FIG. 3 NAN1 is initially used for data transfer based on a probe message being sent by MX1 to MX2 via NAN1 (301), and MX2 sends a probe acknowledgement (pACK) to MX1 via NAN1 (302) to acknowledge receipt of the probe message. Before or after sending the pACK, MX2 updates connection information based on a last (or most recently) received probe message (e.g., the probe message received at 301).

For intra-RAT traffic steering, the data plane for a standby NAN may not be configured due to, for example, address resolution protocol timeout. In embodiments, before steering traffic to a standby NAN, a test probe message (tProbe) is sent over the target connection to test whether the data plane has been set up successfully. Additionally or alternatively, a tProbe is transmitted over the target connection when intra-RAT traffic steering is triggered. Here, the "target connection" is the connection to which the MX node wishes to steer traffic. For example, in FIG. 3 after operations 301 and 302, the connection with NAN1 is the current (active) connection, and MX1 sends a tProbe to MX2 via NAN2 (303), and MX2 sends an acknowledgement (ACK) for test probe ("tACK") to MX1 via NAN2 (304) to acknowledge receipt of the tProbe. In this example, the connection with NAN2 is the target connection. After successful receipt of the tACK by MX1 (304), MX1 sends a probe message over the target connection (e.g., via NAN2) to MX2 (305), and MX2 sends a pACK to MX1 via NAN2 (306)

If a tACK is not received after a predefined or configured number of attempts (e.g., $N_{attempts}=2$) and/or a predefined or configured amount of time, indicating that the intra-RAT traffic steering operation has failed, an MX node (e.g., client 701, 1201, etc.) sends another probe over the current (active) connection (e.g., connection with NAN2 in FIG. 3). Otherwise, an MX node will send a probe over the target connection to complete the intra-RAT traffic steering operation. For example, in FIG. 3 after operations 305 and 306, the connection with NAN2 is the current (active) connection. In this example, MX1 sends a tProbe to MX2 via NAN2 which is lost or otherwise not delivered to MX2 (307). This causes a pACK timeout (TO) to occur (308), which triggers a tProbe transmission over the NAN1 connection (309). However, the tACK sent by MX2 is not received at MX1 (310), which results in tACK-TO at MX1 (311). The tACK-TO at MX1 (311) triggers a traffic steering probe to be sent over the target connection, which in this case is the connection with NAN1 (312). This probe is successfully received at MX2, and MX2 sends a pACK to MX1 via NAN2 (313).

In the embodiments discussed supra, the tProbe works in a similar way as the other probe messages. However, in some embodiments, the Rx MX node (e.g., server 740, 1240, etc.) does not update the connection information when receiving a tProbe. In some implementations, an tProbe indicator is added to the probe message (e.g., as a data element or field in the probe message) to indicate whether the probe message is a normal probe or a tProbe. In one example, the tProbe indicator is a one-bit flag in the probe message where a first value (e.g., "1") indicates that the message is a tProbe, and a second value (e.g., "0") indicates that the message is not a tProbe. After receiving the tACK, the Tx MX node (e.g., client 701, 1201, etc.) will then send a (normal) probe message to steer traffic towards the new (target) NAN.

1.1.3. Traffic Steering Requests and Acknowledgement Messages

In some implementations, the TSMs discussed previously are MX Traffic Steering Request messages (REQs) and/or MX Traffic Steering Response messages (RSPs) as discussed in [RFC8743] and [GMA14]. Additionally or alternatively, the aforementioned TSMs are MX Traffic Steering REQs and the aforementioned sACKs are MX Traffic Steering RSPs. The MX Traffic Steering REQ is used to steer data traffic over a particular connection. The MX Traffic Steering Request can also be used to steer data traffic over multiple connections simultaneously (e.g., aggregation). The MX Traffic Steering Request message includes the following information: Anchor Connection ID (connection ID of the anchor connection); MX Configuration ID (if an MX Configuration ID is specified in an MX UP Setup Configuration Request); downlink (DL) Connection ID List (list of DL delivery connections, provided as Connection IDs); uplink (UL) Connection ID (connection ID of the default UL delivery connection); for a number of specific UL traffic templates, the message includes the following: a Traffic Flow Template for identifying the UL traffic, and a UL Connection ID List: List of UL delivery connections, provided as Connection IDs, to be used for sending the UL traffic; and an MX Feature Activation List. Each parameter indicates whether the corresponding feature is enabled or not: lossless switching, fragmentation, concatenation, uplink aggregation, downlink aggregation, measurement, probing. The MX Traffic Steering RSP includes the following information: Unique Session ID (session identifier provided to the client in an MX Capability Response), and MX Feature Activation List, where each parameter indicates whether the corresponding feature is enabled or not: lossless switching, fragmentation, concatenation, uplink aggregation, downlink aggregation, measurement, probing.

Additionally or alternatively, the TSMs can be probe messages (e.g., an MX probe request (REQ) or MX probe ACK message) as discussed in [RFC8743], [UPMAMS], and [GMA14]. Additionally or alternatively, the MX probe-REQ/ACK messages may be used as the probes and/or tProbes for intra-RAT traffic steering as discussed previously with regard to FIG. 3. These probe messages are mainly used for path quality measurements (e.g. round trip time (RTT) and/or other like measurements). The probe-REQ/ACK is conveyed using an MX control PDU (e.g., MX Control PDU Payload 913 of FIG. 9) where the "Type" field is set to "1". The Probe-REQ message includes the following fields: Probing Sequence Number (2 bytes) (the sequence number of the Probe REQ message); Probing Flag (1 byte) where Bit 0 is a Probe-ACK flag to indicate whether the Probe-ACK message is expected (1) or not (0), Bit 1 is a Probe Type flag to indicate whether the Probe-REQ/ACK message was sent during the Initialization phase (0) when the network path is not included for transmission of user data, or during the Active phase (1) when the network path is included for transmission of user data, Bit 2 is a bit flag to indicate the presence of the Reverse CID (R-CID) field, and Bits 3-7 are reserved; a Reverse R-CID (1 byte) (the CID of the delivery connection for sending the Probe-ACK message on the reverse path); and Padding (variable). The "R-CID" field is only present if both Bit 0 and Bit 2 of the "Probing Flag" field are set to "1". Moreover, Bit 2 of the "Probing Flag" field is set to "0" if Bit 0 is "0", indicating that the Probe-ACK message is not expected. If the "R-CID" field is not present, but Bit 0 of the "Probing Flag" field is set to "1", the Probe-ACK message is sent over the same delivery connection as the Probe-REQ message. The "Padding" field is used to control the length of the Probe-REQ message. A Probe-ACK message is 3 bytes long and consists of the following field: Probing Acknowledgment Number (2 bytes): The sequence number of the corresponding Probe-REQ message. Additionally or alternatively, the probe messages discussed previously may be WiFi Probe Request frames, Probe Response frames, Beacon request frames, Beacon report frames, and/or any other suitable frames discussed in [IEEE80211]. Other probe-like messages may be used for the various embodiments discussed herein.

Additionally or alternatively, the steering request message is a Traffic Splitting Update message (TSU) as discussed in [RFC8743], [UPMAMS], and [GMA14]. The TSU carries traffic splitting/steering configuration parameters (e.g., split ratio, and the like) and is used to configure traffic splitting/steering for one or multiple flows. In an example, a GMA entity (e.g., MX1 or MX2 in FIGS. 1-3) may steer traffic to link x by setting the split ratio of link x to be 1 and the split ratio of other links to be 0. The TSU is conveyed using an MX control PDU (e.g., MX Control PDU Payload 913 of FIG. 9 discussed infra), where the "Type" field in the MX control PDU may be set to "7" for TSU messages. A TSU may include the following parameters: a Sequence Number (2 Bytes) (the sequence number (SN) of the TSU message); a flow ID (a data element (e.g., an unsigned integer) to identify the flow); N (1 Byte)(number of delivery connections); and Traffic Splitting Parameters (N Bytes) (the traffic splitting threshold K(i) of the i-th delivery connection, where connections are ordered according to their CID, where i=1, . . . , N, and N is the number of delivery connections. Additionally or alternatively, K[i] is the number of packets to be sent over the i-th link per traffic splitting cycle, where N is the number of delivery connections. Additionally or alternatively, a TSU may include a parameter L, which is the total number of packets per traffic splitting cycle. The TSU may include an individual field for each link (e.g., K[1] for a first link, K[2] for a second link, and so forth). In some implementations, a traffic splitting function is used to map MX service data unit (SDU) SNs to corresponding delivery connections, as shown by equation (1).

$$f(x) = i \qquad (1)$$

if $K[i-1] \cdot ((x - StartSN)\% \, k[N]) < K[i]$

In equation (1), $f(x)$ is the traffic splitting function that maps an MX SDU Sequence Number "x" to the i-th delivery connection, i=1, 2, . . . , N, K[0]=0, and "StartSN" is the sequence number of the first MX SDU using the traffic splitting configuration provided by the corresponding TSU message.

In some implementations, the ACKs and/or sACKs mentioned previously may be Traffic Splitting ACKs (TSAs), which are acknowledgement messages used to confirm the successful reception of TSUs. The TSA is conveyed using an MX control PDU (e.g., MX Control PDU Payload 913 of FIG. 9 discussed infra), where the "Type" field in the MX control PDU may be set to "8" for TSA messages. The N-MADP or C-MADP sends out a TSA message in response to a received TSU message. TSA messages include the following fields: SN Number (2 Bytes) (the sequence number of the corresponding TSU message); and StartSN (4 Bytes) (the sequence number of the first MX SDU using the traffic splitting configuration provided by the corresponding TSU message). In some implementations, a TSA carries a timestamp for OWD measurement, and also carries a "StartSN" parameter per-flow. The StartSN is a sequence number of the first packet using the traffic splitting configuration provided by a corresponding TSU. Additionally or alternatively, the aforementioned ACKs may be MX traffic steering responses messages, MX probe ACK messages, and/or the like.

In some implementations, two different TSMs may be used. For example, the aforementioned MX Traffic Steering REQ/RSP messages ("TSRs") and/or the TSUs can be used for steering between different logical links (logical delivery connections) and/or between different RATs (or sub-RATs). In these implementations, the CID contained in the TSRs or TSUs are used to switch between different logical links (logical delivery connections). Additionally or alternatively, another message not including a CID may be used to switch between different physical links (physical delivery connections) since the physical links all have a same CID. As examples, any of the probe messages mentioned herein may be used as the other message for switching between different physical links (physical delivery connections).

Additionally or alternatively, intermediate nodes that receive any of the aforementioned TSMs and/or TSAs can piggyback or otherwise add any additional information into the TSMs so that the MX nodes can obtain additional data about the MX computing environment and/or about specific NANs or MX nodes. This additional data/information may include, for example, connection status about a particular connection, hardware state information about a particular node, telemetry data, and/or the like.

1.2. Cross-Layer and Cross-Link Mobility Management and Handover Techniques

As discussed previously and in more detail infra, a network device (or MX node) may simultaneously connect to multiple networks using individual links of the same or different RATs (e.g., LTE, WiFi, 5G, etc.). A new convergence protocol (e.g., [GMA14]) can be used to provide improved Quality of Service (QoS) and/or Quality of Experience (QoE) to MX nodes. As shown by FIG. 10, the convergence protocol/layer operates between the network layer and the link layer. The convergence layer includes a transmitter (Tx) entity (e.g., a GMA Tx or the like) and receiver (Rx) entity (e.g., a GMA Rx or the like). FIG. 10 also shows that the link layer includes RAT-specific link/access layers/protocols.

The convergence layer Tx entity splits and/or duplicates traffic over multiple connections/links and retransmits packets over a different connections/links link based on e2e and/or QoS measurements such as any of those discussed herein. The convergence layer Tx entity also performs traffic steering and/or traffic splitting to provide improved QoS and/or QoE. The convergence layer Rx entity performs end-to-end (e2e) QoS measurements (e.g., loss, delay, throughput, and/or any other like measurements (or combinations thereof) such as any of those discussed herein) based on received data and/or control packets. The convergence layer Rx entity reorders out-of-order packets arriving from (over) different connections/links and forwards the reordered packets up to higher layers, in sequence. The convergence layer Rx entity also eliminates redundant packets.

['994] discusses various cross-layer information and mechanisms for exchanging cross-layer information between the link layer and the convergence layer to improve responsiveness of MX traffic splitting and retransmission. Cross-layer information includes information, data, and/or messages generated by the link layer, and used by the convergence layer (e.g., GMA). Examples of such cross-layer information include handover notifications (e.g., H( )) and link quality indicators (e.g., r( )). Additionally, cross-layer information includes information, data, and/or messages generated by the convergence layer, and used by the link layer. Examples of such cross-layer information includes roaming (scanning) aggressiveness messages, traffic splitting configurations (e.g., traffic splitting ratio information), and the like.

The present disclosure explores cross-layer and cross-link information exchange to enable lossless HO, which may not be supported by individual RATs and/or individual links (see e.g., [Bangolae]). In particular, cross-layer information and/or HO information is exchanged between the convergence layer and the link layer (or individual RAT layer/protocol entities in the link layer), and used to steer user data away from a link that is about to steered away from (or handed-over from) to avoid any packet loss caused by the HO and/or traffic steering procedure. Moreover, if an MX node (e.g., client 701) is equipped with two or more RAT TRx/radios (e.g., WiFi TRx/radios), then the roaming (scanning) aggressiveness of the RAT TRx/radios is/are adaptively controlled based on its current usage at the convergence layer. For example, the roaming (scanning) aggressiveness can be reduced if the RAT TRx/radios is/are used for data transfer by the convergence layer, and increase aggressiveness otherwise. These cross-layer embodiments avoid packet loss and/or other service-related degradation during HO and/or traffic steering, and improves QoS and/or QoE.

Figure 4:
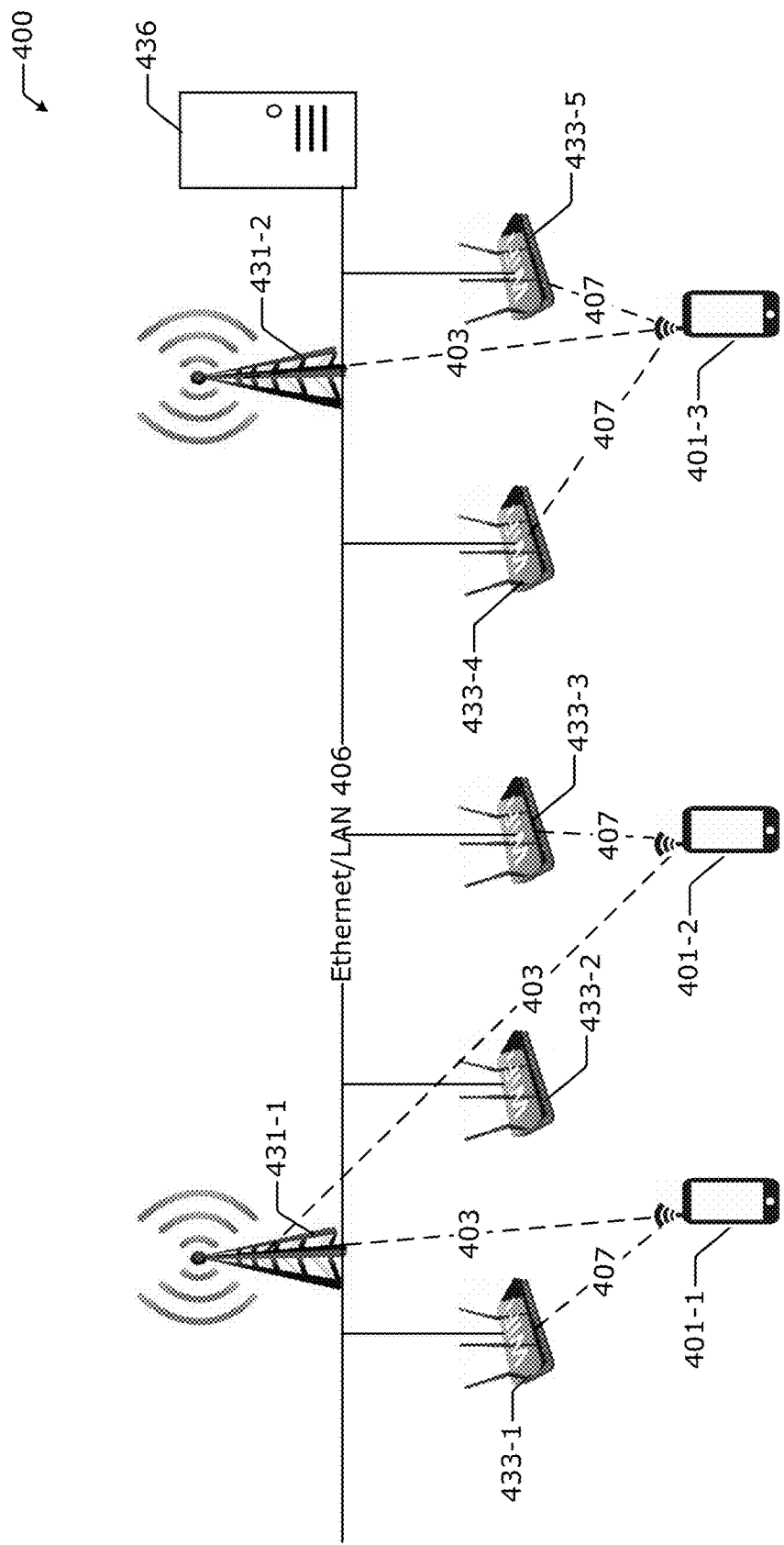
FIG. 4 depicts example handover (HO) scenarios in multi-access (MX) communication environments.

FIG. 4 depicts example HO scenarios that may take place in a computing network 400. The computing network 400 includes one or more compute nodes 436 (which may be the same or similar as the server 740, CN 750A, and/or GW 750B in FIG. 7, and/or edge compute node(s) 1836, CN 1842, cloud 1844, one or more remote application (app) servers 1850 in FIG. 18), NANs 431 and NANs 433 (including NANs 431-1, 431-2, and NANs 433-1, 433-2, 433-3, 433-4, 433-5, which may be the same or similar as NANs 711A, 711B in FIG. 7 and/or NANs 1831-1833 in FIG. 18), and UEs 401 (including UEs 401-1, 401-2, 401-3, which may be the same or similar to client 701 in FIG. 7 and/or UEs 1811, 1821 in FIG. 18). The NANs 431 and NANs 433 are communicatively coupled with one another via one or more backhaul links 406, which may be wired or wireless connections (e.g., Ethernet, fiber optics, DSL, LAN/WLAN, etc.) and may be the same or similar to backhaul links 706 and 707 discussed infra with respect to FIG. 7. Additionally, the UEs 401 may connect with, or attach to, the NANs 431 via connections/links 403, and may connect with, or attach to, the NANs 433 via connections/links 407. The connections/links 403 and 407 may be the same or similar as the connections/links 1803 and 1807 in FIG. 18.

In the example of FIG. 4, NANs 431 implement a first RAT (RAT1) to provide network connectivity to a first access network and NANs 433 implement a second RAT (RAT2) to provide network connectivity to a second access network. In one example, RAT1 is a cellular RAT such as 3GPP LTE or 5G/NR where each NAN 431 is a cellular base station (BS) (e.g., LTE eNBs, 5G/NR gNBs, etc.), and RAT2 is a WLAN RAT such as WiFi where each NAN 433 is a WLAN access point (AP) (e.g., WiFi APs, etc.). FIG. 4 shows the following three handover scenarios:

Scenario 1: client 401-1 is connected to NAN 431-1 (e.g., BS1) while performing handover between NAN 433-1 (e.g., AP1) and NAN 433-2 (e.g., AP2).

Scenario 2: client 401-2 is connected to NAN 433-3 (e.g., AP3) while performing a handover between NAN 431-1 (e.g., BS1) and NAN 431-2 (e.g., BS2).

Scenario 3: client 401-3 is equipped with two WLAN RAT radios (see e.g., Yordan, "Oppo and vivo announce Dual Wi-Fi for their flagships", GSMArena.com (18 Jul. 2019), available at: https://www.gsmarena.com/oppo_vivo_dual_wifi-news-38203.php. In scenario 3, when one WLAN RAT radio is used for active data transfer, the other WLAN RAT radio is able to scan and discover another AP with better parameters than the current (active) AP (e.g., stronger signal quality, etc.).

The computing network 400 may utilize the cross-layer and cross-link traffic steering and/or HO techniques discussed herein. In some implementations, a precondition for the cross-layer and cross-link techniques is that the MX node (e.g., client 701 and/or server 740) includes one or more TRx/radios of a given RAT, and is capable of simultaneously connecting to an access network (e.g., (R)AN 710A, 710B in FIG. 7) and/or NAN 431, 433 using more than one connection/link 403, 407. The MX node also includes a convergence layer or convergence layer controller (CLC), which may be a GMA entity (see e.g., FIGS. 7-10) or some other suitable entity/element. In embodiments, the CLC at the MX node maintains the following parameters: S(i) (the data transfer state of the i-th TRx/radio (e.g., a value of "0" indicates active for data transfer, and a value of "1" indicates inactive)), and r(i) (the link quality indicator of the i-th TRx/radio (e.g., RSRP, RSRQ, RSSI, SNR, SINR, latency performance, and/or any other suitable measurements (or combinations thereof) such as those discussed herein)). Here, r(i) may be provided or determined by the MX node itself or a network controller or link layer controller (LLC). The link quality indicator r(i) can be determined or otherwise obtained using any suitable measurement technique and/or metric collection technique including any of those discussed herein.

The LLC at the MX node maintains the following parameters: H(i) (the handover state of the i-th TRx/radio (e.g., a value of "0" indicates inactive, and a value of "1" indicates active), and R(i) (the roaming (scanning) aggressiveness of the i-th TRx/radio (e.g., a value of "1" is a lowest roaming (scanning) aggressiveness value ~ a value of "5" being the highest roaming (scanning) aggressiveness value).

When a particular RAT TRx/radio (e.g., WiFi, LTE, etc.) is about to start an HO, the corresponding LLC sends a cross-layer signal "H(i)=1" to the CLC. In response, the CLC steers ongoing data traffic away from the link using MAMS protocols (see e.g., [RFC8743]) or using some other mechanism(s), and updates S(i)=0. When the RAT TRx/radio completes HO, the LLC sends the cross-layer signal "H(i)=0" to the CLC. In response, the CLC may update S(i)=1 to indicate that the link is now available for data transfer. The traffic steering may be performed as discussed in [RFC8743], [GMA14], and/or 3GPP TS 24.193 v17.2.0 (2021 Sep. 24) ("[TS24193]").

If the MX node is equipped with multiple TRx/radios (e.g., two or more), the CLC may configure one TRx/radio to be active for data transfer (e.g., S(k)=1), and the other TRx/radio to be inactive (e.g., S(j)=0). Moreover, the CLC may signal the LLC to increase the roaming (scanning) aggressiveness of the inactive TRx/radio (e.g., R(j)=5 or R(j)←R(j)+1), so that it can scan more frequently to find better NAN 431, 433 quickly. In the meantime, the CLC may signal the LLC to reduce the roaming (scanning) aggressiveness of the active TRx/radio (e.g., R(k)=1 or R(k)←R(k)−1) to avoid the impact of RAT scanning on data transfer (e.g., WiFi scanning on data transfer (see e.g., [Bangolae])).

Moreover, the LLC may periodically report link quality indicators of each TRx/radio to the convergence layer (or CLC) so that the convergence layer (or CLC) can decide which TRx/radio will be used for data transfer and update S(i) accordingly. The convergence layer (or CLC) can also signal guidance for the roaming (scanning) aggressiveness parameter to the link layer (or LLC) based on the link quality indicator(s) and/or other information, such as traffic load estimate based on collected telemetry.

Figure 5:
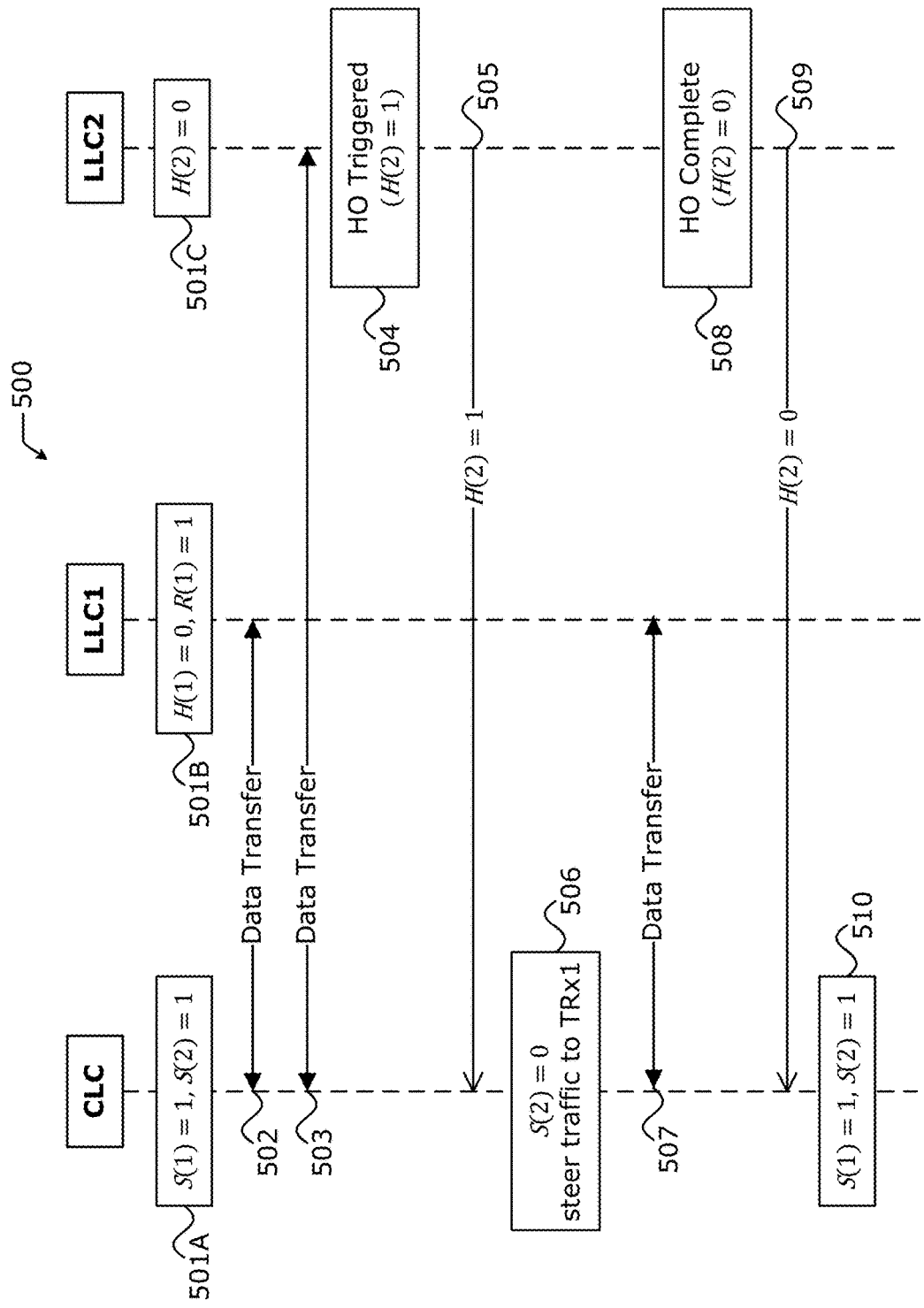
FIGS. 5 and 6 depict an example cross-layer MX HO procedures based on the various HO scenarios of FIG. 4.
Figure 6:
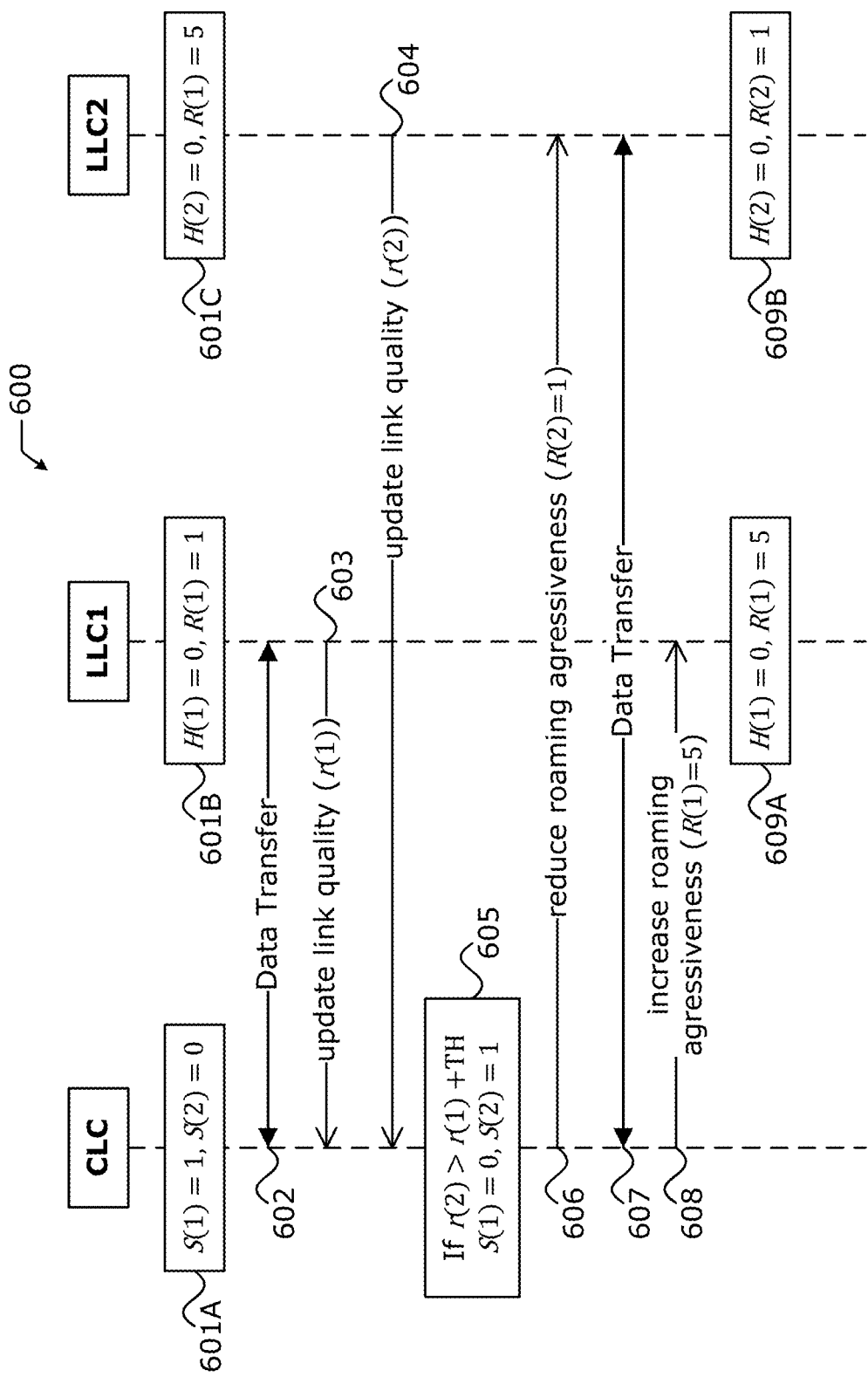

FIGS. 5 and 6 illustrate example HO procedures 500 and 600 for clients 401-1, 401-2, and 401-3 in FIG. 4. In particular, FIG. 5 shows an example cross-layer MX HO procedure for scenarios involving clients 401-1 and 401-2 (e.g., scenarios 1 and 2 in FIG. 4), and FIG. 6 shows an example cross-layer MX HO procedure for scenarios involving client 401-3 (e.g., scenario 3 in FIG. 4). The procedures 500 and 600 are performed by an MX node and involve a CLC interacting with two LLC entities (LLC1 and LLC2) that control or otherwise interact with respective TRx/radios (TRx1 and TRx2), which are communication circuitry implementing the same RAT (e.g., WiFi, or the like).

Referring to FIG. 5, procedure 500 begins with the data transfer state of the TRx1 and TRx2 being inactive at the CLC (e.g., S(1)=1, S(2)=1) (501A), the HO state at TRx1 being inactive (e.g., H(1)=0) and the roaming (scanning) aggressiveness at TRx1 being at a lowest level (e.g., R(1)=1) (501B), and the HO state at TRx2 being inactive (e.g., H(1)=0) (501C). Data transfers take place over a connection via TRx1 ("link1") (502) and over a connection via TRx2 ("link2") (503).

At some point, an HO or traffic steering process is triggered to steer traffic from link2 to link1, which causes the HO state at TRx2 to become active (e.g., H(2)=1) (504). Based on the HO state activation, LLC2 sends a cross-layer signal indicating the activated HO state (e.g., H(2)=1) to the CLC (505). In response to receipt of the cross-layer signal, the CLC steers ongoing data traffic away from link2 and updates the data transfer state for TRx2 accordingly (e.g., S(2)=0) (506). Then, the CLC initiates or begins data transfers via link1 (507).

The TRx2 completes the HO according to the underlying RAT/protocol that it operates and sets its HO state accordingly (e.g., H(2)=0) (508). When the TRx2 completes the HO, LLC2 sends a cross-layer signal indicating the deactivated HO state (e.g., H(2)=0) to the CLC (509). In response to receipt of the cross-layer signal, the CLC may update the data transfer states for TRx2 to indicate that the link is now available for data transfer (e.g., S(i)=1) (510).

Referring to FIG. 6, procedure 600 begins with the data transfer state of TRx1 at the CLC being inactive (e.g., S(1)=1) and the data transfer state of TRx2 at the CLC being active (e.g., S(2)=0) (601A), the HO state at TRx1 being inactive (e.g., H(1)=0) and the roaming (scanning) aggressiveness at TRx1 being at a lowest level (e.g., R(1)=1) (601B), and the HO state at TRx2 being inactive (e.g., H(1)=0) and the roaming (scanning) aggressiveness at TRx2 being at a highest level (e.g., R(1)=5) (601C). Data transfers take place over a connection via TRx1 ("link1") (602) but not over a connection via TRx2 ("link2").

At some point, LLC1 sends a cross-layer signal including an updated link quality indicator for TRx1 and/or link1 (e.g., r(1)) (603), and LLC2 sends a cross-layer signal including an updated link quality indicator for TRx2 and/or link2 (e.g., r(2)) (604). The CLC then determines which link (or TRx) has better link quality based on the received link quality indicators (605). In particular, if the link quality of link2 is better or greater than the link quality of link1 (e.g., if r(2)>r(1)+TH, where TH is a predetermined or configurable threshold or scaling factor), then the CLC activates TRx1 (e.g., S(1)=0) and deactivates TRx2 (e.g., S(2)=1) (605).

The CLC also sends a cross-layer signal to LLC2 to reduces its roaming (scanning) aggressiveness (e.g., R(2)=1) (606) and/or sends a cross-layer signal to LLC1 to its roaming (scanning) aggressiveness (e.g., R(1)=5) (608). LLC1 increases its roaming (scanning) aggressiveness level based on the cross-layer signaling 608 (e.g., setting R(1)=5) (609A) and LLC2 reduces its roaming (scanning) aggressiveness level based on the cross-layer signaling 606 (e.g., setting R(2)=1) (609B). Additionally, data transfers may take place via the activated TRx2 and/or over link2 (607) before, during, or after sending the cross-layer signal to increase the roaming (scanning) aggressiveness of the inactive TRx1.

The CLC may increase the roaming (scanning) aggressiveness of the inactive TRx (e.g., TRx1 in this example) so that the inactive TRx (e.g., TRx1) can scan more frequently to find better NAN and/or new link quickly. Additionally or alternatively, the CLC may decrease the roaming (scanning) aggressiveness of the active TRx (e.g., TRx2 in this example) to avoid impacts on the data transfer (607) from the scanning (e.g., energy detection, etc.) operations. It should be noted that operations 606, 607, and 608 may be performed in any order.

As shown by FIG. 5, the CLC steers data traffic dynamically based on the HO state of individual connections/links to avoid data loss due to HO and/or traffic steering. On the other hand, as shown by FIG. 6, if an MX node is equipped with multiple TRx/radios, the CLC may dynamically adjust the roaming aggressiveness setting of the TRx based on its current usage. FIG. 5, provides the example logic, r(2)>r(1)+TH, to trigger the actions to steer traffic from link1 to link2 and update the roaming aggressiveness levels. In other implementations, the CLC may implement more additional or alternative algorithms to trigger traffic steering based on link quality indicators and/or other measurements available or accessible by the CLC.

2. Multi-Access Management Services (MAMS) and Generic Multi-Access (GMA)

Today, a device (e.g., mobile stations, user equipment (UEs), etc.) can be simultaneously connected to multiple communication networks based on different technology implementations (including different Radio Access Technologies (RATs)) and network architectures. In such multi-connectivity scenarios, it may be desirable to combine multiple access networks or select the best one to improve quality of experience (QoE) for a user and improve overall network utilization and efficiency. An access network is the segment in a network that delivers user data packets to a client via an access link such as a WiFi airlink, an cellular airlink, or DSL. The overall QoE perceived by the end users as well as utilization of the resources can be optimized with smart selection and combination of the paths used for the user plane (UP). In an advanced solution, the network paths can be dynamically selected based on knowledge of current conditions in the relevant access networks. The Multiple Access Management Services (MAMS) framework enables the smart selection and flexible combination of access and core network paths based on defined policies. By use of up-to-date information from available access networks, the best possible network efficiency and end user QoE perception based on application needs can be guaranteed. The MAMS framework can be used to flexibly select the combination of uplink (UL) and downlink (DL) access and core network paths having an optimal performance, and UP treatment for improving network utilization and efficiency and enhanced QoE for user applications (apps). With the MAMS framework, the optimal network paths can selected on UP level without any impact on the control plane signaling of the underlying access networks. Additional aspects of the MAMS framework are discussed in Kanugovi et al., "Multi-Access Management Services (MAMS)", Internet Engineering Task Force (IETF), Request for Comments (RFC) 8743 (March 2020) ("[RFC8743]"), the contents of which are hereby incorporated by reference in its entirety.

Figure 7:
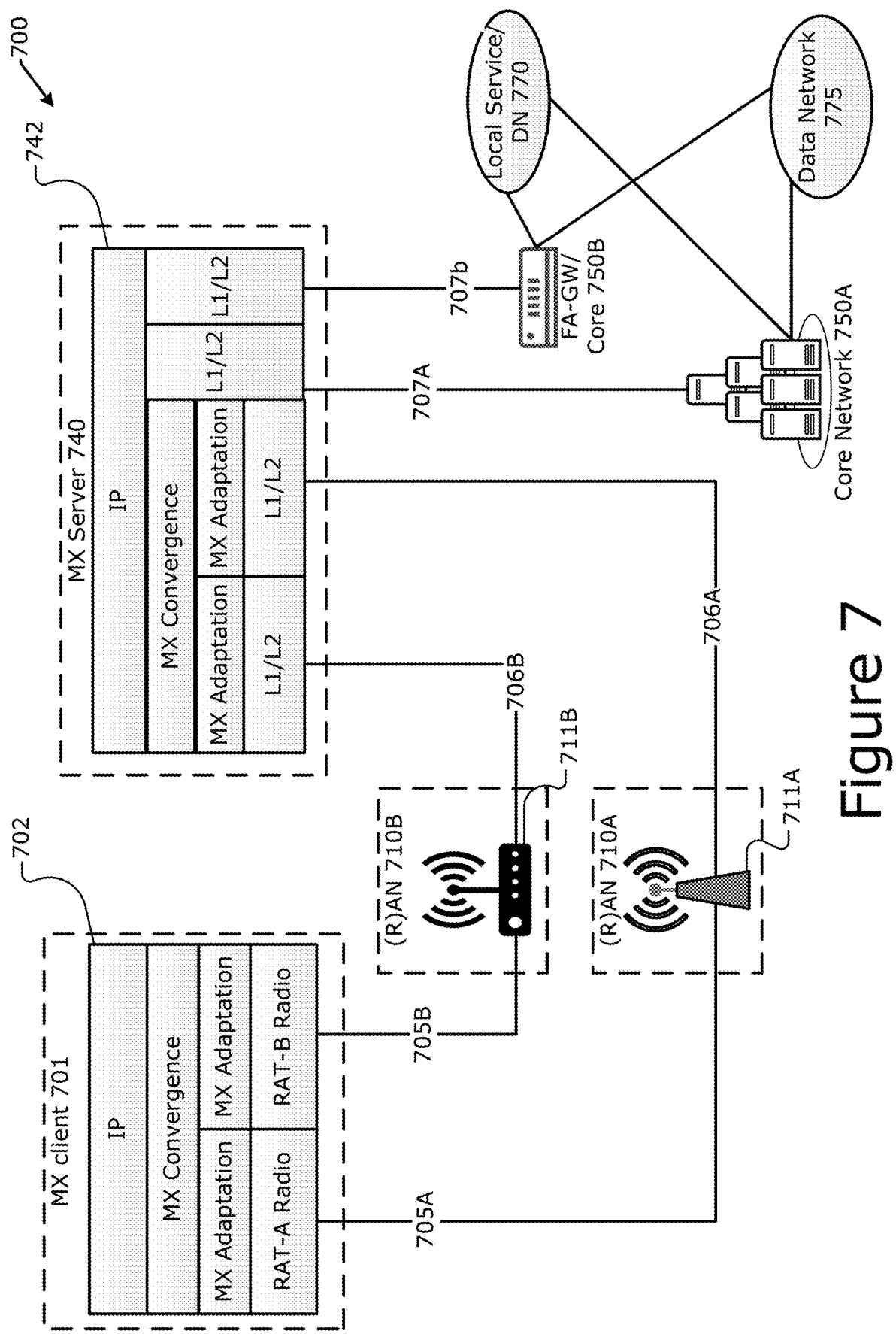
FIG. 7 depicts an example multi-access network utilizing Multiple Access Management Services (MAMS).

FIG. 7 depicts an example multi-access ("MX" or "MA") network 700 utilizing MAMS technology. In particular, FIG. 7B shows a MAMS e2e UP protocol stack in the MX network 700, which includes both WiFi and 3GPP-based access. In this example, an MX client 701 includes a UP protocol stack 702 and a server 740 includes a UP protocol stack 742.

The MX client 701 is an end-user device that supports connections with one or more access nodes, possibly over different access technologies (or RATs), and is also referred to as a user station, user device, user equipment (UE), or multi-radio UE 701. The client 701 may be a multiconnectivity client 701 that has, or supports, multiple network connections.

The MX server 740 (or "MAMS server 740") provides MAMS-related user-plane (UP) functionalities and/or optimizations in the network 700. The MX server 740 handles aggregation of multiple network paths 705, 706, 707, and/or the forwarding of user data traffic across multiple network paths 705, 706, 707. The MX server 740 may also be referred to as an MX gateway and/or a Network Multi Access Data Proxy (N-MADP) (see e.g., N-MADP 837 in FIG. 8). Throughout the present disclosure, the MX server 740 may be referred to as server 740, a MAMS server 740, MA server 740, edge node 740, MEC host 740, MAMS-MEC system 740, or similar. When the client 701 transmits packets to the server 740, the client 701 may be referred to as a "MAMS transmitter," "MX transmitter," or the like, and the server 740 may be referred to as a "MAMS receiver," "MX receiver," or the like. When the client 701 receives packets from the server 740, the client 701 may be referred to as a "MAMS receiver," "MX receiver," or the like, and the server 740 may be referred to as a "MAMS transmitter," "MX transmitter," or the like.

In some implementations, the MAMS server 740 runs in an edge compute node of a suitable edge computing framework. For example, the edge compute node may be one or more edge servers, edge platforms, edge hosts, etc. Additionally or alternatively, the MX server 740 may be one or more edge applications (apps) operated by one or more edge compute nodes. Examples of suitable edge computing frameworks include [MEC], [SA6Edge], [O-RAN], [ISEO], and the like. Additionally or alternatively, the MX server 740 can be operated by a cloud computing system, service, or platform, and/or as a distributed app operated by a cloud service.

The MX UE 701 (or "multi-radio UE 701") accesses or otherwise communicates with a data network (DN) 775 or local service 770 (also referred to as a local DN 770) via one or more (radio) access networks ("(R)ANs") 710 and the server 740. Each (R)AN 710 is a segment in a network that delivers user data packets to the client 701 and/or server 740 via access link(s) 705, which may be a wired connection (e.g., Ethernet, DSL, Coax, USB, and/or the like) or a wireless (radio) connection (e.g., WiFi airlink, 5G/NR airlink, LTE airlink, and/or the like). Each of the (R)ANs 710 implement an access technology ("AT"), which is the underlying mechanism(s) used to access a corresponding network.

In some implementations, the AT is a fixed access (wired) technology such as Ethernet, digital subscriber line technologies (DSL or xDSL); G.hn; coaxial cable access ("coax") such as Multimedia over Coax Alliance (MoCA), Data Over Cable Service Interface Specification (DOCSIS), and/or the like; powerline communication ("PLC" or "powerline") such as high definition (HD)-PLC and/or the like; Fiber to the x (FTTX; also referred to as "fiber in the loop"); Passive Optical Network (PON); and/or the like. Here, (R)AN node 711 may be a broadband modem (e.g., cable modem, DSL modem, an Optical Network Terminal (ONT) or an Optical Network Unit (ONU), G.hn semiconductor device, etc.), which may be used in combination with customer premises equipment (e.g., home/enterprise router(s), residential/enterprise gateway(s), mesh network device(s), WiFi access point(s), etc.). The fixed AN node 711 connects the client 701 to the access network 710 via an access connection 705 that operates according to an access protocol (e.g., Ethernet, V.35, Universal Serial Bus (USB) and/or Ethernet over USB, Point-to-Point Protocol over Ethernet (PPPoE), Internet Protocol over Ethernet (IPoE), G.hn, DOCSIS, and/or the like). Here, the access connection 705 may include one or more wires (e.g., telephone wiring, coax, power lines, plastic and/or glass optical fibers, and/or the like), and the particular wires used may depend on the underlying AT and/or infrastructure.

In other implementations, the AT may be a radio access technology (RAT) such as 3GPP Long Term Evolution (LTE), 3GPP Fifth Generation (5G)/New Radio (NR), MulteFire, ETSI Global System for Mobile Communications (GSM), WiFi®, Worldwide Interoperability for Microwave Access (WiMAX) (sometimes referred to as "wireless broadband" or "WiBro"), and/or the like. (R)ANs 710 could also encompass personal area network technologies such as Bluetooth® or Bluetooth Low Energy (BLE), IEEE 802.15.4 based protocols (e.g., 6LoWPAN, WirelessHART, MiWi, Thread, etc.), WiFi-direct, and/or the like. Each (R)AN 710 includes one or more (R)AN nodes 711, which may be macro cell base stations, remote radio heads (RRHs), small and/or micro cell base stations, access points (APs), home gateways (HGs), and/or other like network elements. A collection of (R)AN nodes 711 may also be referred to as an "access level edge network" or "access level edge." The (R)AN nodes 711 are configurable or operable to perform setup of transport resources, (e.g., for CDN services and/or other application level services) as well as scheduling signaling resources for providing network service of the underlying access network/RAT. Here, the access connection 705 may include wireless or air interfaces based on the underlying RAT (e.g., Uu-interface for LTE or 5G/NR RATs, PC5 interface for LTE or 5G/NR RATs, WiFi air interface for WLAN RATs, millimeter wave (mmWave) interface, Visible Light Communication (VLC) interface, and/or the like).

Each (R)AN 710*a*, 710*b* includes one or more respective network access nodes (NANs) 711*a*, 711*b*, which is/are communicatively coupled with/to a respective back-end network. One way to implement this service model is to use a multi-path Layer-4 (transport) solution such as Multi-Path TCP (see e.g., IETF RFC 6824 (January 2013) ("[RFC6824]")) or MultiPath QUIC (MPQUIC) (see e.g., De Coninck et al., "Multipath Extensions for QUIC (MP-QUIC)," *draft-deconinck-quic-multipath*-07, IETA, QUIC Working Group (3 May 2021) ("[MPQUIC]")). Such solution is usually OS dependent and only applicable to specific application/traffic. Moreover, it operates at the individual flow level and offer suffers from high complexity & low efficiency. In some implementations, the Layer-3 multi-path management mechanisms discussed in Zhu et al., "User-Plane Protocols for Multiple Access Management Service," *draft-zhu-intarea-mams-user-protocol*-09, IETA, INTAREA (4 Mar. 2020) ("[UPMAMS]")) can be used to avoid such limitations and drawbacks. In these implementations, the control information for multi-path management (e.g., sequence number, etc.) is appended as a trailer at the end of a suitable network packet (e.g., IP packet).

In the example of FIG. 7, the (R)AN 710A is a 3GPP-based access network such as an LTE E-UTRAN where the one or more (R)AN nodes 711A are evolved NodeBs (eNBs) or a next generation RAN (NG-RAN) where the one or more (R)AN nodes 711 are Next Generation NodeBs (gNBs) and/or NG Evolved Node-Bs (NG-eNBs). Additionally, in the example of FIG. 7, the (R)AN 710A is a WiFi-based access network where the (R)AN nodes 711B are WiFi Access Points (APs). The APs may be, for example, wireless routers, roadside ITS stations or roadside units, gateway appliances, central hubs, or the like. The multi-radio UE 701 is capable of establishing a 3GPP access link 705A with the eNB/gNB 711A (e.g., Uu interface or the like), and capable of establishing a WiFi access link 705B with the AP 711B. The eNB/gNB 711A communicates with the server 740 via a 3GPP backhaul link 706A and the AP 711B communicates with the server 740 via a WiFi backhaul link 706B. The 3GPP backhaul link 706A and the WiFi backhaul link 706B may be a suitable wired connection such as Ethernet, USB, Data Highway Plus (DH+), PROFINET, and/or the like. Furthermore, the MX server 740 is also communicatively coupled with a core network 750A via backhaul interface 707A and communicatively coupled with a Fixed Access (FA) gateway (GW) and/or FA-Core network 750B via the backhaul link 707B. The backhaul links 707 may use the same or similar access technologies as backhaul links 706. In this example, the core network 750A may be a 3GPP core network such as a 5G core network (5GC) or an LTE Evolved Packet Core (EPC). Additionally or alternatively, the FA-GW may be a broadband network gateway (BNG) and/or the FA-Core may be broadband core that provides transport, and various resources provide content (provider data center, video head end, and so on). Additionally or alternatively, the FA-GW/Core may be a residential gateway (RG), a 5G-RG, a Fixed Network (FN) RG (FN-RG), an FN Broadband RG (FN-BRG), an FN Cable RG (FN-CRG), a Wireline 5G Access Network (W-5GAN), a Wireline 5G Cable Access Network (W-5GCAN), a Wireline Access Gateway Function (W-AGF), and/or some other suitable element/entity.

For purposes of the present disclosure, individual links 705, 706, or 707 or combinations thereof may be referred to as "links", "connections", "access network connections" (ANCs) or "access network paths". For example, a link, connection, access network connections (ANC), or access network paths (ANP) may comprise a radio link 705 between client 701 and (R)AN node 711 in one or both directions. Additionally or alternatively, a link, connection, ANC, or ANP may refer to a combination of a link 705 and link 706 between client 701 and MX server 740 in one or both directions. Additionally or alternatively, a link, connection, ANC, or ANP may refer to a combination of a of links/paths 705, 706 and 707 between client 701 and local service 770 or data network 775 in one or both directions. Unless stated otherwise, the terms ANC, ANP, "link," "channel," "path," "connection," and the like may be used interchangeably throughout the present disclosure.

Additionally, the client 701 is configured provide radio information to one or more NANs 711 and/or one or more other entities/elements (e.g., edge server(s), (R)AN(s) 710, core network function(s) (NF(s)), application function(s) (AF(s)), app server(s), cloud service(s), and/or the like). The radio information may be in the form of one or more measurement reports, and/or may include, for example, signal strength measurements, signal quality measurements, and/or the like. Each measurement report is tagged with a timestamp and the location of the measurement (e.g., the current location of the client 701). As examples, the measurements collected by the client 701 and/or included in the measurement reports may include any of those discussed herein (see e.g., discussion of FIG. 18 infra). Additionally or alternatively, any of the aforementioned measurements (or combination of measurements) may be collected by one or more NANs 711 and provided to a suitable entity/element (e.g., Edge server(s), (R)AN(s) 710, NF(s), AF(s), app server(s), cloud service(s), and/or the like). The radio information may be reported either at a low periodicity or a high periodicity depending on a data transfer that is to take place, and/or other information about the data transfer. Additionally or alternatively, the element/entity may request the measurements from the NANs 711 at low or high periodicity, or the NANs 711 may provide the measurements to the element/entity at low or high periodicity. Additionally or alternatively, the element/entity may obtain other relevant data (e.g., Key Performance Indicators (KPIs), Key Quality Indicators, (KQIs), and/or the like) from other same or similar elements/entities with the measurement reports or separately from the measurement reports.

MAMS is a programmable framework that provides mechanisms for the flexible selection of network paths in an MX communication environment 700, based on the application needs and/or requirements, as well as adapt to dynamic network conditions when multiple network connections serve a client device 701. The MAMS framework leverages network intelligence and policies to dynamically adapt traffic distribution across selected paths and UP treatments (e.g., encryption needed for transport over WiFi, or tunneling needed to overcome a network address translation (NAT) between client 701 and a multi-path proxy) to changing network/link conditions. Network path selection and configuration messages are carried as UP data between the functional elements in the MX network 700B and the client 701, and thus, with little or no impact on the control plane (CP) signaling schemes of the underlying access networks (e.g., WiFi and 3GPP access networks in FIGS. 7A-7B). For example, in MX network 700B with 3GPP and WiFi technologies existing LTE and WiFi signaling procedures will be used to set up the LTE and WiFi connections, respectively, and MAMS-specific CP messages are carried as LTE or WiFi UP data. The MAMS framework defined in this document provides the capability to make a smart selection of a flexible combination of access paths and core network paths, as well as to choose the UP treatment when the traffic is distributed across the selected paths. Thus, it is a broad programmable framework that provides functions beyond the simple sharing of network policies such as those provided by the Access Network Discovery and Selection Function (ANDSF) discussed in 3GPP TS 24.312 v15.0.0 (2018 Jun. 21) ("[TS24312]"), which offers policies and rules for assisting 3GPP clients to discover and select available access networks. Further, it allows the choice and configuration of UP treatment for the traffic over the paths, depending on the application's needs The MAMS framework mechanisms are not dependent on any specific access network types or UP protocols (e.g., TCP, UDP, Generic Routing Encapsulation (GRE), QUIC, Multipath TCP (MPTCP), SCTP, MultiPath QUIC (MPQUIC), etc.). The MAMS framework coexists and complements the existing protocols by providing a way to negotiate and configure those protocols to match their use to a given MA scenario based on client and network capabilities, and the specific needs of each access network path. Further, the MAMS framework allows load balancing of the traffic flows across the selected access network paths, and the exchange of network state information to be used for network intelligence to optimize the performance of such protocols.

The MAMS framework is based on principles of UP interworking, which can be deployed as an overlay without impacting the underlying networks. MAMS co-exists and complements existing communication protocols by providing a way to negotiate and configure the protocols based on client and network capabilities. Further it allows exchange of network state information and leveraging network intelligence to optimize the performance of such communication protocols. MAMS has minimal or no dependency on the actual access technology of the participating links, which allows MAMS to be scalable for addition of newer access technologies and for independent evolution of the existing access technologies.

FIG. 7 also depicts a MAMS Data Plane Protocol Stack (DPPS) for transporting user payloads, for example, an IP Protocol Data Unit (PDU) carried via the IP layer and/or the like. The DPPS 702 and 742 includes the client-side MAMS DPPS 702 implemented by the client 701 and the server-side MAMS DPPS 742 implemented by the server 740. For devices equipped with multiple radio link technologies (or multiple RAT circuitries), such as 5G/NR, LTE, WiFi, etc., MAMS [RFC8743] provides a programmable framework to dynamically select and transmit data simultaneously over multiple radio links for high throughput, low latency, and improved reliability. The MAMS DPPS 702, 742 includes the following two (sub)layers: the convergence (sub)layer and the adaptation (sub)layer. The MX adaptation (sub)layer is added to (or on top of) each RAT circuitry, and the MX convergence (sub)layer connects the IP and MX adaptation (sub)layers.

Figure 12:
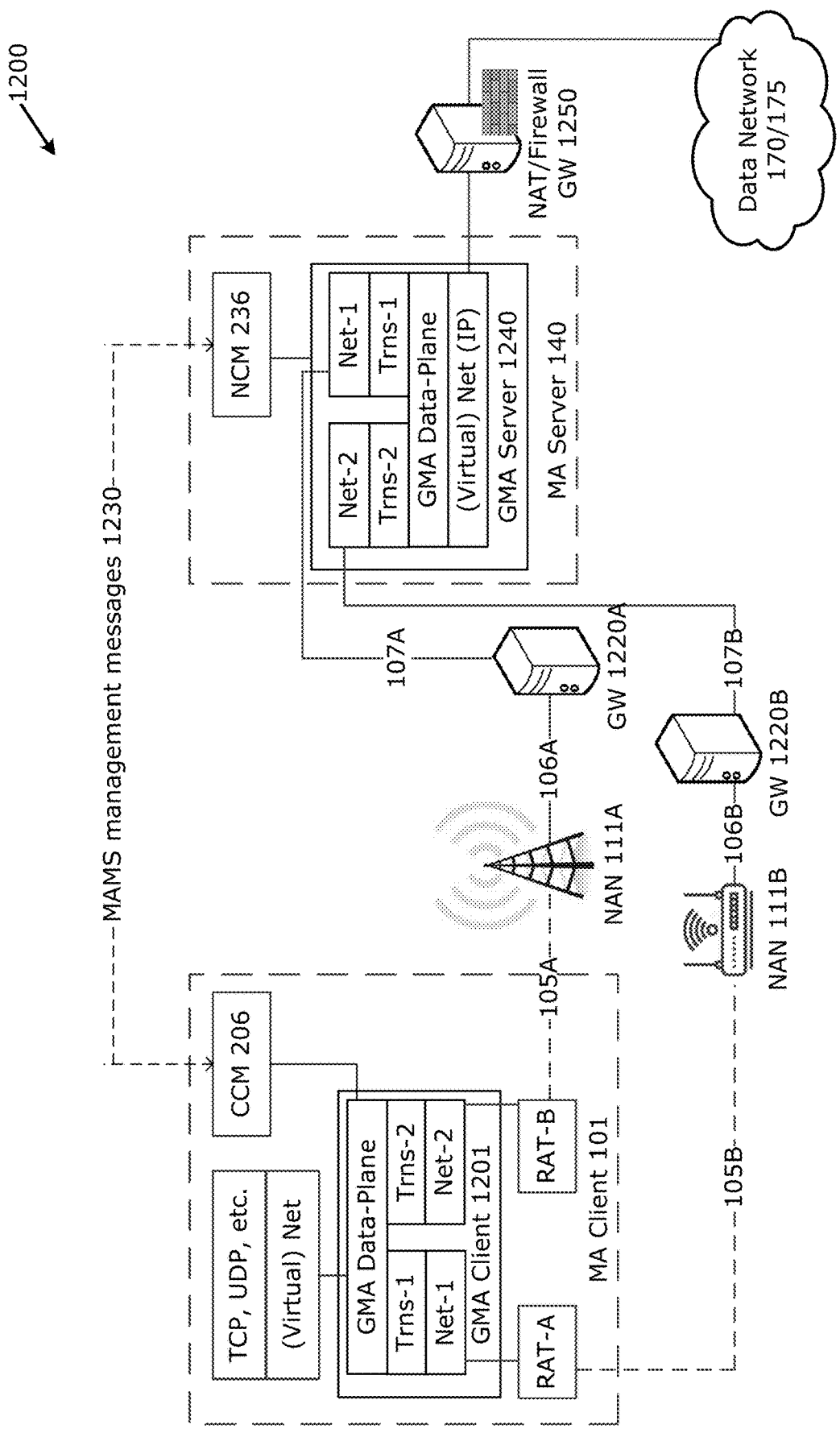
FIG. 12 depicts an OTT Generic Multi-Access (GMA) end-to-end (e2e) Network Reference Architecture.

The MX convergence (sub)layer operates on top of the MX adaptation (sub)layer in the protocol stacks 702 and 742. From the Transmitter (Tx) perspective, a User Payload (e.g. IP PDU) is processed by the convergence sublayer first, and then by the adaptation sublayer before being transported over a delivery access connection (e.g., connection 705A or connection 705B). From the Receiver (Rx) perspective, a packet (e.g., IP packet) received over a delivery connection is processed by the MX adaptation sublayer first, and then by the MX convergence sublayer (this is also shown by FIG. 12, which is discussed in more detail infra).

The MX convergence layer is configurable or operable to perform MX-specific tasks in the UP. The MX convergence layer performs multi-access specific tasks/functions such as, for example, access (path) selection, multi-link (path) aggregation, splitting/reordering, lossless switching, keep-alive, probing, fragmentation, and/or concatenation. The MX convergence layer can be implemented by using existing UP protocols such MPTCP, Multipath QUIC (MPQUIC), or by adapting encapsulating header/trailer schemes such as GRE or Generic Multi-Access (GMA). In some implementations, the MX convergence supports GMA, MPTCP Proxy, GRE Aggregation Proxy, and MPQUIC. As discussed in more detail infra, the GMA protocol may be used to encode additional control information (e.g., Key, Sequence Number, Timestamp, etc.) at this (sub)layer.

The MX adaptation layer is configurable or operable to address and/or handle transport-network-related aspects such as, for example, tunneling, network-layer reachability and/or security, and NAT. The MX Adaptation Layer can be implemented using existing protocols (e.g. TCP, UDP, IPSec, QUIC, etc.). Additionally or alternatively, the MX Adaptation Layer can be implemented using UDP tunneling, IPsec, DTLS (see e.g., Rescorla et al., "Datagram Transport Layer Security Version 1.2", IETF, RFC 6347 (January 2012) and/or Moriarty et al., "Deprecating TLS 1.0 and TLS 1.1", IETF, RFC 8996 (March 2021) (collectively "[DTLS]"), or a Client NAT (e.g., a source NAT at the client with inverse mapping at the server 740 and/or Network Multi Access Data Proxy (N-MADP) 837 of FIG. 8). Additionally or alternatively, the adaptation method of the MX Adaptation Layer is UDP without DTLS, UDP with DTLS, IPsec (see e.g., Huttunen et al., "UDP Encapsulation of IPsec ESP Packets", IETF, Network Working Group, RFC 3948 (January 2005) ("[RFC3948]")), or Client NAT.

The MX Adaptation Layer can be independently configured for each of the access links 705A and 705B. In particular, UP packets of the anchor connection can be encapsulated in a UDP tunnel of a delivery connection between the N-MADP and C-MADP (see e.g., N-MADP 837 and C-MADP 807 in FIG. 8), an IPsec tunnel can be established between the N-MADP and C-MADP (see e.g., N-MADP 837 and C-MADP 807 in FIG. 8) on the network path that is considered untrusted, and/or DTLS can be used if UDP tunneling is used on the network path that is considered "untrusted". For example, in FIG. 7 including 3GPP (R)AN 710A (assumed secure) and WiFi (R)AN 710B (assumed to not be secure), the MX adaptation layer can be omitted for the 3GPP link 705A, but is configured with IPsec to secure the WiFi link 705B.

The MX convergence layer operates on top of the MX adaptation sublayer in the protocol stack. From the transmitter (Tx) perspective, a user payload (e.g., IP PDU) is processed by the MX convergence layer first, and then by the MX adaptation layer before being transported over a delivery access connection, From the receiver (Rx) perspective, an IP packet received over a delivery connection is processed by the MX adaptation sublayer first, and then by the MX convergence sublayer.

Where GMA is used, the MX convergence layer may be replaced with a "GMA convergence layer" or "GMA convergence sublayer." Here, multiple access networks 710 are combined into a single IP connection. If the NCM (see e.g., NCM 836 of FIG. 8) determines that N-MADP (see e.g., N-MADP 837 of FIG. 8) is to be instantiated with GMA as the MX Convergence Protocol, it exchanges the support of GMA convergence capability in the discovery and capability exchange procedures.

Where MPTCP is used, the MX convergence layer may be replaced with an MPTCP layer on top of individual TCP layers, where each TCP layer is onto of a respective MX adaption layer. Here, MPTCP is reused as the "MX Convergence Sublayer" protocol, and multiple access networks are combined into a single MPTCP connection. Hence, no new UP protocol or PDU format is needed in this case. If the NCM 836 determines that the N-MADP is to be instantiated with MPTCP as the MX Convergence Protocol, it exchanges the support of MPTCP capability during discovery and capability exchange procedures. MPTCP proxy protocols may be used to manage traffic steering and aggregation over multiple delivery connection.

Where GRE is used, the MX convergence layer may be replaced with a GRE layer on top of a GRE Delivery Protocol (e.g., IP) layer. Here, GRE is reused as the "MX Convergence sub-layer" protocol, and multiple access networks are combined into a single GRE connection. Hence, no new UP protocol or PDU format is needed in this case. If the NCM 836 determines that N-MADP is to be instantiated with GRE as the MX Convergence Protocol, it exchanges the support of GRE capability in the discovery and capability exchange procedures.

Figure 8:
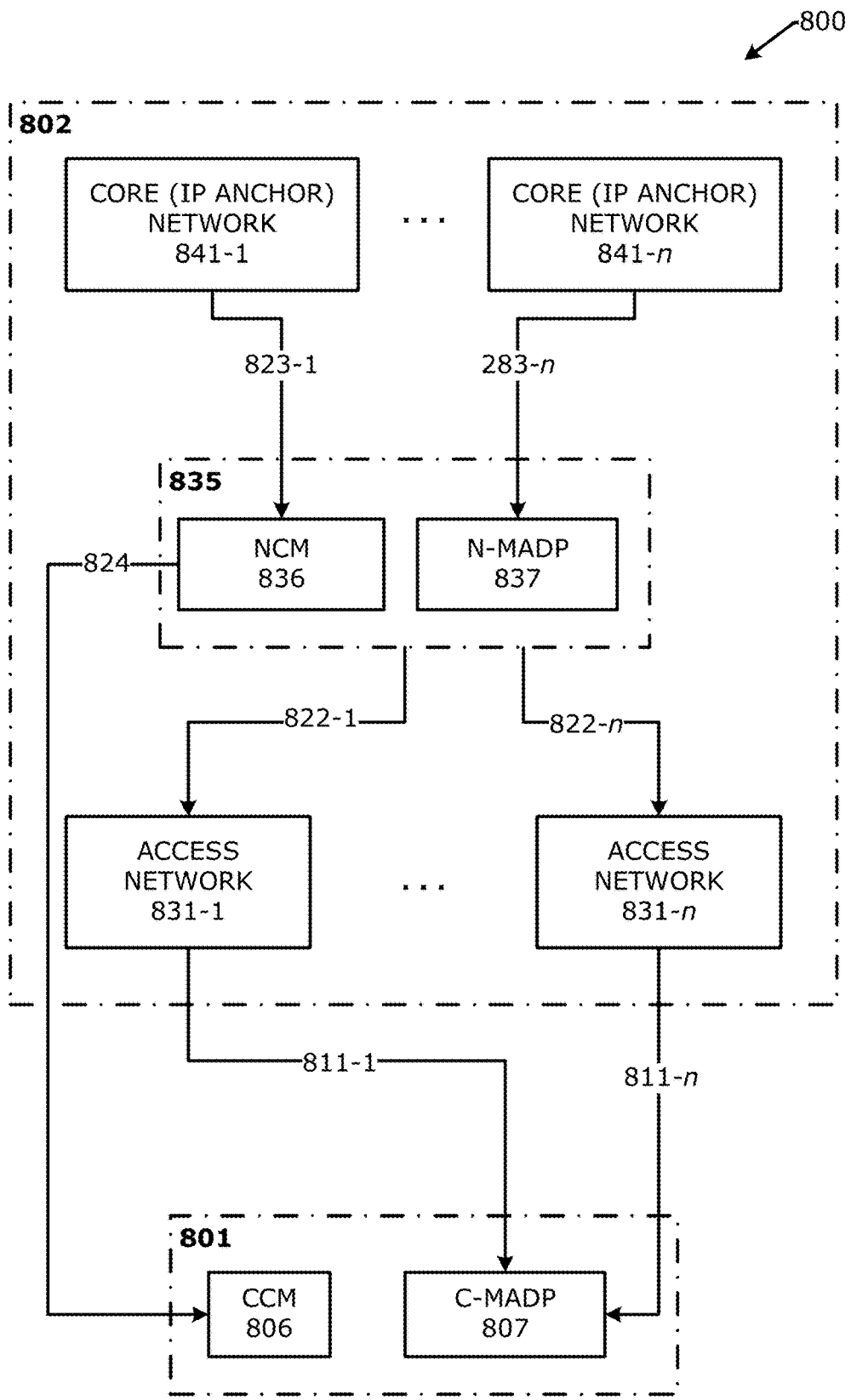
FIG. 8 illustrates a MAMS reference architecture.

FIG. 8 illustrates an example MAMS reference architecture 800 for a scenario of a client served by n networks (where n is a number). The MAMS framework allows for dynamic selection and flexible combination of access and core network paths as UL and DL for a device connected to multiple communication networks. The multiple communication networks interwork at the UP. The architecture is extendable to combine any number of networks, as well as any choice of participating network/access types (e.g., LTE, WLAN, MuLTEfire, DSL, 5G/NR, etc.) and deployment architectures (e.g., with UP gateway function at the access Edge, and/or the like).

FIG. 8 illustrates a scenario of a client 801 served by multiple (1 to n) core networks 841-1 to 841-n (where n is a number). The MAMS architecture 800 includes the following functional elements: a client 801 including a Client Connection Manager (CCM) 806 and a Client Multi Access Data Proxy (C-MADP) 807; multiple (1 to n) access networks (ANs) 831 (including AN 831-1 to AN 831-n); a MAMS system 835 including a Network Connection Manager (NCM) 836 and a Network Multi Access Data Proxy (N-MADP) 837; and the multiple (1 to n) core networks 841-1 to 841-n. The CCM 806 and NCM 836 handle CP aspects, and the C-MADP 807 and N-MADP 837 handle UP aspects. The core networks (or simply "cores") 841-1 to 841-n are elements that anchor the client's 801 network address (e.g., IP address or the like) used for communication with applications via the network. One or more of the cores 841-1 to 841-n may correspond to cloud computing service(s), 5G core network(s) (5GCs), LTE core network(s) (e.g., evolved packet core (EPC)), a DSL/FIXED core, WLAN core, data center(s), and/or other like back-end system.

The client 801 is an end-user device supporting connections with multiple access networks 831-1 to 831-n (which may be the same or similar to (R)ANs 710 and/or (R)AN nodes 711 in FIG. 7), possibly over different access technologies. When the client 801 is capable of handling multiple network connections, the client 801 may be referred to as a "multiconnectivity client" or the like. The client 801 may be the same or similar as client 701 depicted by FIG. 7.

The ANs 831 are network elements in the network that deliver user data packets to the client 801 via respective point-to-point access links 811-1 to 811-n, which may include, for example, WiFi links, LTE cellular links, 5G/NR cellular links, DSL (fixed access) connections, and/or the like. In some implementations, the point-to-point access links 811-1 to 811-n may additionally or alternatively include short-range radio links such as, for example, Bluetooth® or BLE, IEEE 802.15.4 based protocols (e.g., 6LoWPAN, WirelessHART, MiWi, Thread, etc.), WiFi-direct, and/or the like. The ANs 831 may correspond to (R)ANs 710 and/or (R)AN nodes 711 of FIG. 7.

A server manager (e.g., NCM 836) is a functional entity in a network 802 (e.g., network element, network appliance, gateway, Edge node(s), cloud node(s), etc.) that handles control messages from a client manager (e.g., CCM 806) and configures multi-access operations on the server side 802. Additionally or alternatively, the NCM 836 is a functional element in the network that handles MAMS control messages from the client 801 and configures the distribution of data packets over the available access and core network paths, and manages the UP treatment (e.g., tunneling, encryption, etc.) of the traffic flows. Additionally or alternatively, the NCM 836 provides the intelligence in the network to configure network paths and UP protocols based on client negotiation. The NCM 836 also acts as a common MA gateway for network policy input and interface to application platforms. One or more NCM 836 instances can be hosted at the access Edge (e.g., in one or more access networks 710, at individual access network nodes 711, and/or in one or more Edge compute nodes) and/or core network gateways.

The NCM 836 configures the network (N-MADP 837) and client (C-MADP 807) UP functions, such as negotiating with the client 801 for the use of available AN paths 821-1 to 821-n, protocols, and rules for processing the UP traffic, as well as link-monitoring procedures. The CP messages between the NCM 836 and the CCM 806 are transported as an overlay on the UP, without any impact on the underlying access networks. The NCM 836 handles MAMS CP messages from the client 801 and configures distribution of data packets over the multiple available access paths 821-1 to 821-n, delivery paths 822-1 to 822-n, and/or core network paths 823-1 to 823-n, as well as UP treatment of traffic flows. The CP messages exchanged between the NCM 836 and CCM 806 are transported as an overlay on the UP, without any impact to the underlying ANs 831.

The CP path 824 may be overlaid over any access UP path. A "path" may be a flow (e.g., an IP flow, UDP flow, etc.) between two hosts. An IP flow or UDP flow may be denoted by a 4-tuple (e.g., IP source address, IP destination address, source port, destination port). Additionally or alternatively, WebSocket is used for transporting management and control messages between the NCM 836 and CCM 806, wherein MX Control Message are carried over (or encapsulated in) a WebSocket, and the WebSocket is carried over (or encapsulated in) TCP/TLS. Aspects of MX management and control messages are discussed in [RFC8743], Int'l App. No. PCT/US2021/038063 filed Jun. 18, 2021 ("['063]"), U.S. application Ser. No. 17/358,994 filed on Jun. 25, 2021 ("['994]"), and U.S. application Ser. No. 17/469,331 filed Sep. 8, 2021 ("['331]"), the contents of each of which are hereby incorporated by reference in their entireties.

A client manager (e.g., CCM 806) is a functional entity in the client device 801 (e.g. desktop, workstation, laptop, smartphone, smart appliance, IoT device, etc.) that exchanges control messages with a server manager (e.g., NCM 836) to configure multi-access operations on the client side 801. Additionally or alternatively, the CCM 806 is a functional entity in the client 801 that exchanges MAMS signaling messages with the NCM 836, and which configures the network paths at the client 801 for the transport of user data.

The CCM 806 is a peer functional element in the client 801 for handling MAMS CP procedures. The CCM 806 manages multiple network connections 821-1 to 821-n at the client 801, and configures the multiple network paths 821-1 to 821-n at the client 801 for transport of user data. The CCM 806 exchanges MAMS signaling with the NCM 836 to support such functions as the configuration of the UL and DL user network path for transporting user data packets and the adaptive selection of network path by the NCM 836 by reporting on the results of link probing. Link probing and reporting may be used to support adaptive network path selection by the NCM 836. In the DL for user data received by the client 801, the CCM 806 configures C-MADP 807 such that application data packet received over any of the accesses to reach the appropriate application on the client 801. In the UL for the data transmitted by the client 801, the CCM 806 configures the C-MADP 807 to determine the best access links 821 to be used for UL data based on a combination of local policy and network policy delivered by the NCM 836 over link 824.

The C-MADP 807 is a functional entity in the client 801 that handles user data traffic forwarding across multiple network paths. The C-MADP 807 is responsible for MAMS-specific UP functionalities in the client 801 such as encapsulation, fragmentation, concatenation, reordering, retransmissions, etc. The C-MADP 807 is configured by the CCM 806 based on signaling exchange with the NCM 836 and local policies at the client 801. The CCM 806 configures the selection of delivery connections 822-1 to 822-n and the UP protocols to be used for UL user data traffic based on the signaling exchanged with the NCM 836.

The N-MADP 837 is a functional entity in the network 802 that handles the forwarding of user data traffic across multiple network paths. The N-MADP 837 is responsible for MAMS-related UP functionalities in the network 802. Such as encapsulation, fragmentation, concatenation, reordering, retransmission, etc. The N-MADP 837 is the distribution node that routes the UL UP traffic to the appropriate anchor connection 823-1 to 823-n towards a respective core network 841-1 to 841-n, and the DL user traffic to the client 801 over the appropriate delivery connection(s) 822-1 to 822-n. The anchor connections 823-1 to 823-n are network paths from the N-MADP 837 to the UP gateway (IP anchor) that has assigned an network address to the client 801, and the delivery connections 822-1 to 822-n are network paths from the N-MADP 837 to the client 801. One or more The N-MADP 837 instances can be hosted at the Access Edge (e.g., in one or more access networks 710 and/or at individual access network nodes 711) and/or Core Gateways. The N-MADP 837 instances may be hosted with or separate from the NCM 836 instances.

In the DL, the NCM 836 configures the use of delivery connections 822-1 to 822-n, and UP protocols at the N-MADP 837 for transporting user data traffic. The N-MADP 837 may implement Equal-Cost Multi-Path routing (ECMP) support for the down link traffic. Additionally or alternatively, the N-MADP 837 may be connected to a router or other like network element (e.g., AP XE136 of Figure XE1) with ECMP functionality. The NCM 836 configures the N-MADP 837 with a load balancing algorithm based on static and/or dynamic network policies. These network policies may include assigning access and core paths for specific user data traffic type, data volume based percentage distribution, link availability and feedback information from exchange of MAMS signaling with the CCM 806 at the client 801, and/or the like. The N-MADP 837 can be configured with appropriate UP protocols to support both per-flow and per-packet traffic distribution across the delivery connections.

In the UL, the N-MADP 837 selects the appropriate anchor connection 823-1 to 823-n over which to forward the user data traffic, received from the client 801 via one or more delivery connections 822-1 to 822-n. The forwarding rules in the UL at the N-MADP 837 are configured by the NCM 836 based on application requirements (e.g., enterprise hosted application flows via a LAN or WLAN anchor 841 (e.g., WiFi, cloud, and/or Edge network), Mobile Operator hosted applications via a cellular core network 841, and/or the like).

The NCM 836 and the N-MADP 837 can be either collocated with one another or instantiated on different network nodes. The NCM 836 can setup multiple N-MADP 837 instances in the network. The NCM 836 controls the selection of an individual N-MADP 837 instance by the client and the rules for distribution of user traffic across the N-MADP 837 instances. In this way, different N-MADP 837 instances may be used to handle different sets of clients for load balancing across clients. Additionally, the different N-MADP 837 instances may be used for different address deployment topologies (e.g., N-MADP 837 hosted at the UP node at the access Edge or in the core network, while the NCM 836 hosted at the access edge node), as well as address access network technology architecture. For example, an N-MADP 837 instance at a CN node 841 may be used to manage traffic distribution across LTE and DSL networks, and another N-MADP 837 instance at a (R)AN node 831-1, 831-n may be used to manage traffic distribution across LTE and WiFi traffic. Furthermore, a single client 801 can be configured to use multiple N-MADP 837 instances, which may be used for addressing different application requirements. For example, individual N-MADP 837 instances may be used to handle TCP and UDP transport based traffic.

The CCM 806 and NCM 836 exchange signaling messages to configure the UP functions, C-MADP 807 and N-MADP 837, at the client and network respectively. The CCM 806 may obtain the CCM 836 credentials (FQDN or network address) for sending the initial discovery messages. As an example, the client 801 can obtain the NCM 836 credentials using methods like provisioning, DNS query. Once the discovery process is successful, the (initial) NCM 836 can update and assign additional NCM 836 addresses, for example, based on MCC/MNC tuple information received in the MX Discovery Message, for sending subsequent CP messages.

The CCM 806 discovers and exchanges capabilities with the NCM 836. The NCM 836 provides the credentials of the N-MADP 837 end-point and negotiates the parameters for UP with the CCM 806. CCM 806 configures C-MADP 807 to setup the UP path (e.g., MPTCP/UDP Proxy Connection) with the N-MADP 837 based on the credentials (e.g., (MPTCP/UDP) Proxy network address (e.g., IP address and port), Associated Core Network Path), and the parameters exchanged with the NCM 836. Further, NCM 836 and CCM 806 exchange link status information to adapt traffic steering and UP treatment with dynamic network conditions. The key procedures are described in details in the following subsections.

A UDP (or QUIC) connection may be configured between the C-MADP 807 and the N-MADP 837 to exchange control messages. The control messages may be or include, for example, keep-alive, MX probe request (REQ)/acknowledgement (ACK), Packet Loss Report (PLR), First Sequence Number (FSN), Coded MX SDU (CMS), MX Traffic Steering Request (REQ), MX Traffic Steering Response (RSP), Traffic Splitting Update (TSU), Traffic Splitting ACK (TSA) messages, and/or path quality estimation information. The N-MADP 837 end-point network address (e.g., IP address or the like) and port number (e.g., UDP port number of the UDP connection) is used to identify MX control PDUs.

The various elements depicted in the example of FIG. 8 may be implemented using a variety of different physical and/or virtualized components. For example, the elements within MAMS network 802 may be implemented using one or more components of an Edge node, such as one or more LTE or 5G RANs, an edge computing system/framework such as [MEC], [SA6Edge], [O-RAN], [ISEO], and/or the like. Additionally or alternatively, the MAMS system 835 may be implemented in or by an individual RAN node, such as one or more of the RAN nodes 711 in FIGS. 7A-7C. In one example, the MAMS system 835 is implemented as part of the layer 3 (L3) protocol stack (e.g., the RRC layer or the like). In another example, the MAMS system 835 is implemented as part of a layer above L3 such as the network layer (e.g., IP, UDP, QUIC, GTP-U, etc.) data plane protocol stack of the RAN nodes. In another example, the MAMS system 835 may be is implemented as a separate layer between the L3 and upper layers. In another example, the MAMS system 835 may be implemented in or by a gNB-CU of a CU/DU split architecture. In another example, the MAMS system 835 may be implemented in or by a vBBU pool, or a cloud RAN (C-RAN). Additionally or alternatively, the functional elements within MAMS network 802 may be implemented by one or more network functions (or as a VNF) of CN 750A in FIG. 7. For example, the N-MADP 837 may run on an S-GW or P-GW when CN 750A is an EPC, or the N-MADP 837 may run on a User Plane Function (UPF) when CN 750A is a 5GC.

In edge-based implementations, the MAMS system 835 may be implemented in or by an edge compute node that is located in, or co-located with, a RAN 710 or RAN node 711. The functions that are located in the network side (e.g., the NCM 836 and N-MADP 837) can be hosted either at a centralized location or at the edge cloud (see e.g., Edge cloud 1963 of FIG. 19). They can be deployed either as an edge application (e.g., MEC app(s), O-RAN xApp, etc.) or co-located with other functions (e.g., MEC platform, O-RAN RAN Intelligent Controller (RIC), etc.). Additionally or alternatively, up-to-date information from the access networks may be provided to the NCM 836 for intelligent network path selection over APIs by the edge platform the same way as it exposes RNI over RNI API, TMS over a TMS API, and/or BWMS over BWM API. Additionally or alternatively, similar levels of information may be defined for 3GPP access networks as well as for WiFi, MulteFire, DSL, etc., either by amending the existing RNI/BWM APIs or by defining new APIs specific for the new access technologies.

In additional or alternative edge-based implementations, the NCM 836 can be hosted on an edge cloud server that is located in the UP path at the edge of the multi-technology access network. The NCM 836 and CCM 806 can negotiate the network path combinations based on an application's needs and the necessary UP protocols to be used across the multiple paths. The network conditions reported by the CCM 806 to the NCM 836 can be complemented by a radio analytics application residing at the MEC cloud server to configure the UL and DL access paths according to changing radio and congestion conditions. Additionally or alternatively, the UP functional element (e.g., the N-MADP 837) can either be collocated with the NCM 836 at the MEC cloud server (e.g., MEC-hosted applications, etc.) or placed at a separate network element like a common UP gateway across the multiple networks. Also, even in scenarios where an N-MADP 837 is not deployed, the NCM 806 can be used to augment the traffic steering decisions at the client 801. These enhancements is to improve the end user's QoE by leveraging the best network path based on an application's needs and network conditions, and building on the advantages of significantly reduced latency and the dynamic and real-time exposure of radio network information available at the MEC.

As used herein a "GMA receiver" may be an N-MADP 837 instance or C-MADP 807 instance (see e.g., FIG. 8) instantiated with GMA as the convergence protocol that receives packets encapsulated or otherwise generated according to GMA procedures, and processes the received packets per the procedures discussed in Zhu et al., "Generic Multi-Access (GMA) Convergence Encapsulation Protocols," draft-zhu-intarea-gma-14, IETA, INTAREA/Network Working Group (24 Nov. 2021) ("[GMA14]"), which is hereby incorporated by reference in its entirety. Additionally, as used herein a "GMA transmitter" may be an N-MADP 837 instance or C-MADP 807 instance instantiated with GMA as the convergence protocol that processes and/or encapsulates or otherwise generates packets/PDUs according to GMA procedures discussed in [GMA14].

As mentioned previously, MAMS is a programmable framework that provides mechanisms for flexible selection of network paths in a multi-connection (access) communication environment, based on application needs. It leverages network intelligence and policies to dynamically adapt traffic distribution across selected paths and user plane treatment to changing network/link conditions. The network path selection and configuration messages are carried as user plane data between the functional elements in the network and the end-user device, and thus without any impact to the control plane signaling schemes of the individual access network. Today's MAMS solutions require deploying MAMS control and data plane network functions in the network [RFC8743]. The present disclosure extends the MAMS framework to support OTT MAMS (e.g., lossless switching, aggregation, etc.) without any change or dependency in network. The OTT MAMS can run as part of MAMS hosted on a cloud computing service/platform, an Edge computing platform/service (e.g., ETSI MEC, and/or the like), and/or using suitable Virtual Machines (VMs) and/or containers provided by such a cloud computing service/platform and/or Edge computing platform/service.

Furthermore, as the mobile and/or wireless access technologies and networks continue to evolve, it is becoming clear that no single radio technology will be able to meet the variety of requirements for human and machine communications. On the other hand, driving more data through a scarce and finite radio spectrum becomes a real challenge, and spectrum efficiency is approaching a plateau and will not deliver the needed increase in bandwidth improvement itself. For example, 3GPP 5G cellular technology is likely to utilize frequencies below 6 Gigahertz (GHz) as well as millimeter wave ("mmWave" or "MMW"), in both licensed and unlicensed bands. The present disclosure also provides a Software-Defined, Access-Agnostic, and High-Performance solution to such issues, which is referred to herein as Generic Multi-Access (GMA) to enable integration of multiple (heterogeneous or homogeneous) radio access networks and RATs at the Edge, without impacting existing RAT protocol stacks (e.g. PDCP, RRC, Ethernet, etc.) or existing network protocols (e.g., internet protocol (IP), transmission control protocol (TCP), user datagram protocol (UDP), Quick UDP Internet Connections (QUIC), etc.). GMA may be considered a Layer 2.5 protocol. The present disclosure describes various GMA e2e network architecture, protocols, procedures, algorithms, and system functionalities as well as deployment implementations.

Figure 9:
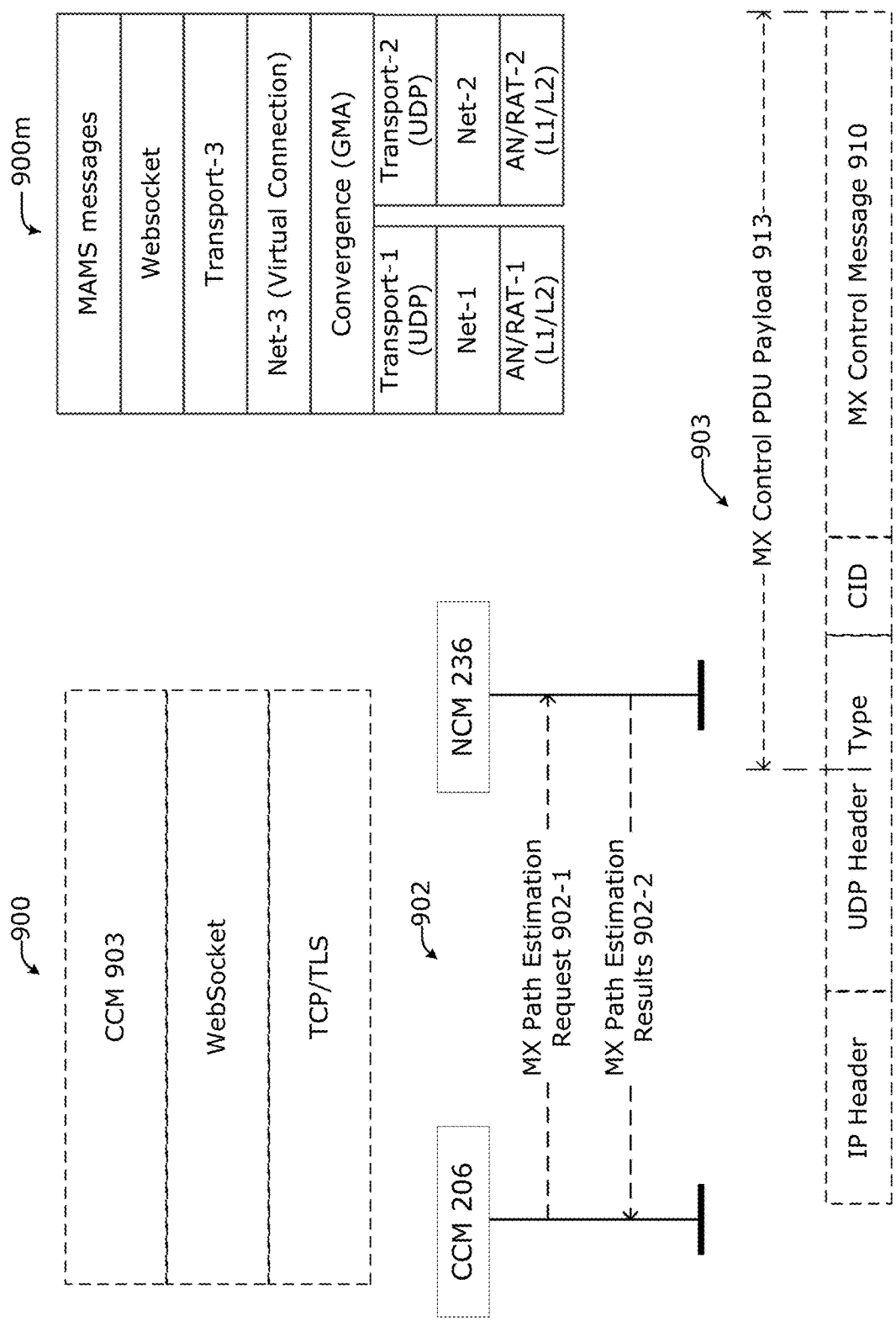
FIG. 9 illustrates an example MX control plane protocol and MX control message.

FIG. 9 depicts an example MAMS Control-Plane Protocol Stack (CPPS) 900. The CPPS 900 includes an Multi-Access (MX) Control Message layer 903, a WebSocket layer, and a Transport Control Protocol (TCP)/Transport Layer Security (TLS) layer. Here, WebSocket (see e.g., IETF RFC 6455 (December 2011) and IETF RFC 8441 (September 2018)) is used for transporting management and control messages (e.g., MX Control Messages 903) between the NCM 836 and the CCM 806. Each MAMS control message 9003 may include one or more of the following fields: Version (indicates the version of the MAMS control protocol); Message Type (indicates the type of the message, e.g., MX Discover, MX Capability Request (REQ)/Response (RSP)); and Sequence Number (SN) (Auto-incremented integer to uniquely identify a particular message exchange (e.g., MX Capability Request/Response).

FIG. 9 shows a MAMS management protocol stack 900m. Here, a secure websocket is established over a third transport layer (e.g., TCP, UDP, IP Security Protocol (IPSec), etc.) tunnel that is established over a virtual network layer (anchor) connection (e.g., IP or some other suitable network layer protocol) for sending MAMS management messages between the CCM 806 and the NCM 836. The virtual (anchor) connection is on top of a convergence layer that implements a convergence protocol (e.g., GMA or the like), which encapsulates the MAMS management messages in the virtual (anchor) connection packet(s) (e.g., IP packets). The convergence (GMA) layer resides on top of respective transport (e.g., UDP or IPSec) tunneling layers for respective access networks (ANs) 1 and 2, which is on top of respective network layers (e.g., IP or the like), which are on top of layer 2 (L2) and Layer 1 (L1) of the respective access networks/RATs 1 and 2.

In some implementations, when the virtual connection has not been set up, the CCM 806 can only establish the secure websocket over one of the delivery IP connections first (e.g., RAT-1). After the virtual IP connection is up, the CCM 806 will close it and establish a new one over the (anchor) virtual IP connection, and the corresponding (virtual) IP packets (carrying one or more MAMS messages) are encapsulated in a same or similar way as data packets (see e.g., FIG. 16).

FIG. 9 also shows a MAMS Control-Plane (CP) Procedure 902 for Path Quality Estimation. Path quality estimations can be done either passively or actively. Traffic measurements in the network can be performed passively by comparing real-time data throughput of the client 801 with the capacity available in the network. In special deployments where the NCM 836 has interfaces 822 with access nodes 831, 711, the direct interfaces can be used to gather information regarding path quality. For example, the utilization of an LTE access node (eNB), to which the client 801 is attached, could be used as data for the estimation of path quality without creating any extra traffic overhead. Active measurements by the client 801 provide an alternative way to estimate path quality.

Procedure 902 begins at operation 902-1 where the NCM 836 sends an MX Path Estimation Request to the CCM 806. At operation 902-2, the CCM 806 sends an MX Path Estimation Results message to the NCM 836. The NCM 836 may send one or more of the following configuration parameters in the MX Path Estimation Request (operation 902-1) to the CCM 806: CID (of the delivery connection 822 whose path quality needs to be estimated); Init Probe Test Duration (ms); Init Probe Test Rate (Mbps); Init Probe Size (bytes); Init Probe-ACK Required (0→No/1→Yes); Active Probe Frequency (ms); Active Probe Size (bytes); Active Probe Test Duration (ms); and Active Probe-ACK Required (0→No/1→Yes).

The CCM 826 configures the C-MADP 807 for probe receipt based on these parameters and for collection of the statistics according to the following configuration: Unique Session ID (session identifier provided to the client in an MX Capability Response); Init Probe Results Configuration (e.g., including Lost Probes (percent), and/or Probe Receiving Rate (packets per second)); Active Probe Results Configuration (e.g., including Average Throughput in the last Probe Duration).

The UP probing is divided into two phases: the Initialization phase and the Active phase. For the Initialization Phase, a network path that is not included by the N-MADP 837 for transmission of user data is deemed to be in the Initialization phase. The user data may be transmitted over other available network paths. For the Active Phase, a network path that is included by the N-MADP 837 for transmission of user data is deemed to be in the Active phase.

During the Initialization phase, the NCM 836 configures the N-MADP 837 to send an Init Probe-REQ message. The CCM 806 collects the Init Probe statistics from the C-MADP 807 and sends the MX Path Estimation Results message (operation 902-2) to the NCM 836 per the Initialization Probe Results configuration.

During the Active phase, the NCM 836 configures the N-MADP 837 to send an Active Probe-REQ message. The C-MADP 807 calculates the metrics as specified by the Active Probe Results configuration. The CCM 806 collects the Active Probe statistics from the C-MADP 807 and sends the MX Path Estimation Results message to the NCM 836 (operation 902-2) per the Active Probe Results configuration.

FIG. 9 also shows an MX Control message format 903. As shown, the MX Control message 903 includes an IP header, a UDP header, and an MX Control PDU Payload 913. The MX Control PDU Payload 913 includes a type field, a CID field, and an MX Control Message 910. The MX Control PDU 913 may include one or more of the following fields: Type (1 byte) to indicate the type of the MX Control message (a value of "0" indicates a Keep-Alive type, and a value of "1" indicates a Probe-REQ/ACK type; Others: Reserved); CID (1 byte) to indicate a CID of the delivery connection for sending the MX Control message 903; and an MX Control Message 910 (variable size/length) including the payload of the MX Control message 910. The MX Control message 903/PDU 910 is sent as a normal UP packet over the desired delivery connection whose quality and reachability need to be determined.

The control message 903/PDU 910 may be encoded as a Keep-Alive and/or Probe-REQ/ACK messages to support path quality estimation. The "Type" field is set to "0" for Keep-Alive messages. The C-MADP 807 may periodically send a Keep-Alive message over one or multiple delivery connections 822-1 to 822-*n* (e.g., ANCs 705, 706, and/or 707), especially if UDP tunneling is used as the adaptation method for the delivery connection 822 with a NAT function on the path. A Keep-Alive message is 2 bytes long and includes a Keep-Alive Sequence Number field (2 bytes) to indicate the sequence number (SN) of the Keep-Alive message. The "Type" field is set to "1" for Probe-REQ/ACK messages. The N-MADP 837 may send a probe request (Probe-REQ) message for path quality estimation. In response, the C-MADP 807 may return a probe acknowledgement (Probe-ACK) message.

A Probe-REQ message may include one or more of the following fields: Probing Sequence Number (2 bytes) to indicate an SN of the Probe REQ message; Probing Flag (1 byte) where Bit 0 is a Probe-ACK flag to indicate whether the Probe-ACK message is expected (1) or not (0), Bit 1 is a Probe Type flag to indicate whether the Probe-REQ/ACK message was sent during the Initialization phase (0) when the network path is not included for transmission of user data, or during the Active phase (1) when the network path is included for transmission of user data, Bit 2 is a bit flag to indicate the presence of the R-CID field, and Bits 3-7 are Reserved; R-CID (1 byte) to indicate the CID of the delivery connection for sending the Probe-ACK message on the reverse path; and Padding (variable). The "Padding" field is used to control the length of the Probe-REQ message. The "R-CID" field is only present if both Bit 0 and Bit 2 of the "Probing Flag" field are set to "1". Moreover, Bit 2 of the "Probing Flag" field should be set to "0" if Bit 0 is "0", indicating that the Probe-ACK message is not expected. If the "R-CID" field is not present, but Bit 0 of the "Probing Flag" field is set to "1", the Probe-ACK message should be sent over the same delivery connection as the Probe-REQ message.

The C-MADP 807 should send the Probe-ACK message in response to a Probe-REQ message with the Probe-ACK flag set to "1". A Probe-ACK message is 3 bytes long and includes a Probing Acknowledgment Number field (2 bytes) to indicate/include a sequence number of the corresponding Probe-REQ message.

The CCM 806 and NCM 836 exchange signaling messages to configure the UP functions via the C-MADP 807 and the N-MADP 837 at the client and the network, respectively. The means for the CCM 806 to obtain the NCM 836 credentials (e.g., Fully Qualified Domain Name (FQDN) or network address (e.g., IP address, or the like)) for sending the initial discovery messages are out of scope for this document. As an example, the client can obtain the NCM 836 credentials by using such methods as provisioning or DNS queries. Once the discovery process is successful, the (initial) NCM 836 can update and assign additional NCM 836 addresses (e.g., based on Mobile Country Code (MCC)/Mobile Network Code (MNC) tuple information received in the MX Discover message) for sending subsequent CP messages.

The CCM 806 discovers and exchanges capabilities with the NCM 836. The NCM 836 provides the credentials of the N-MADP 837 endpoint and negotiates the parameters for the user plane with the CCM. The CCM 806 configures the C-MADP 807 to set up the UP path (e.g., MPTCP/UDP Proxy connection) with the N-MADP, based on the credentials (e.g., (MPTCP/UDP) Proxy network address (e.g., IP address or the like) and port, associated core network path), and the parameters exchanged with the NCM 836. Further, the NCM 836 and CCM 806 exchange link status information to adapt traffic steering and UP treatment to dynamic network conditions.

After sending a MAMS control message, the MAMS CP peer (NCM 836 or CCM 806) waits for a duration of MAMS_TIMEOUT ms before timing out in cases where a response was expected. The sender of the message will retransmit the message for MAMS_RETRY times before declaring failure if no response is received. A failure implies that the MAMS peer is dead or unreachable, and the sender reverts to native non-multi-access/single-path mode. The CCM 806 may initiate the MAMS discovery procedure for re-establishing the MAMS session.

MAMS CP peers execute the keep-alive procedures to ensure that the other peers are reachable and to recover from dead-peer scenarios. Each MAMS CP endpoint maintains a Keep-Alive timer that is set for a duration of MAMS_KEEP_ALIVE_TIMEOUT. The Keep-Alive timer is reset whenever the peer receives a MAMS control message. When the Keep-Alive timer expires, an MX Keep-Alive Request is sent.

The values for MAMS_RETRY and MAMS_KEEP_ALIVE_TIMEOUT parameters used in keep-alive procedures are deployment dependent. As an example, the client 801 and network can obtain the values using provisioning. On receipt of an MX Keep-Alive Request, the receiver responds with an MX Keep-Alive Response. If the sender does not receive a MAMS control message in response to MAMS_RETRY retries of the MX Keep-Alive Request, the MAMS peer declares that the peer is dead or unreachable. The CCM 806 may initiate the MAMS discovery procedure for re-establishing the MAMS session.

Additionally, the CCM 806 immediately sends an MX Keep-Alive Request to the NCM whenever it detects a handover from one (R)AN node 711 to another (R)AN node 711. During this time, the client 801 stops using MAMS UP functionality in the UL direction until it receives an MX Keep-Alive Response from the NCM 836.

The MX Keep-Alive Request includes the following information: Reason (e.g., can be timeout or handover. Handover shall be used by the CCM 806 only on detection of a handover); Unique Session ID (Unique session identifier for the CCM 806 that set up the connection. If the session already exists, then the existing unique session identifier is returned. An NCM ID is a unique identity of the NCM 836 in the operator network, and the session ID is a unique identity assigned to the CCM 806 instance by this NCM 836 instance); CID (if the reason is handover, the inclusion of this field may be mandatory); and Delivery Node ID (identity of the node to which the client is attached. In the case of LTE, this is an E-UTRAN Cell Global Identifier (ECGI). In the case of WiFi, this is an AP ID or a Media Access Control (MAC) address. If the reason is "Handover", the inclusion of this field may be mandatory).

The present disclosure provides new mechanisms to support dynamic traffic splitting/steering at the convergence (sub)layer in MAMS. Existing solutions include various are e2e protocols, such as multi-path TCP (MPTCP), to utilize multiple path or RATs to achieve higher throughput. However, these e2e protocol solutions are managed at the server, which is far away from the data splitting point, and therefore, result in relatively high feedback delay. Moreover, the existing solutions cannot access the radio layer information.

[GMA14] specifies how to dynamically split user data traffic over multiple links at the MX convergence sublayer. The present disclosure provides dynamic traffic splitting for different optimization targets such as reducing e2e delay (e.g., "low delay") or minimizing cellular (e.g., 5G/NR, LTE, etc.) usage (e.g., "low cost"). The present disclosure includes GMA-based traffic splitting that operates in the convergence layer of the MAMS framework (see e.g., FIGS. 7-9). The GMA-based traffic splitting mechanisms are transparent to lower layers and do not require any information from those layers. Two multi-path traffic splitting options are provided including a low delay and low cost options. Various Edge computing frameworks, such as the MEC framework discussed herein, may be used to operate/implement the GMA-based traffic splitting. One example implementation includes using the Smart-Edge/MEC platform provided by Intel®.

FIG. 10 depicts a network model (protocol stack) 1000 with a convergence layer. In FIG. 10, an application layer (including one or more apps) is on top of a transport layer (which includes at least one transport protocol), which is on top of a network layer (which includes at least one network protocol), which is on top of the convergence layer (which includes at least one convergence protocol, which is GMA in this example), which is on top of a link layer (which includes 1 to N RAT protocols (where N is a number)). The transport layer protocol may implement one or more transport protocols such as, for example, TCP, UDP, QUIC, and/or any other suitable transport protocol such as those discussed herein. Additionally or alternatively, the network layer protocol may be IP and/or any other suitable network protocol such as any of those discussed herein.

Figure 11:
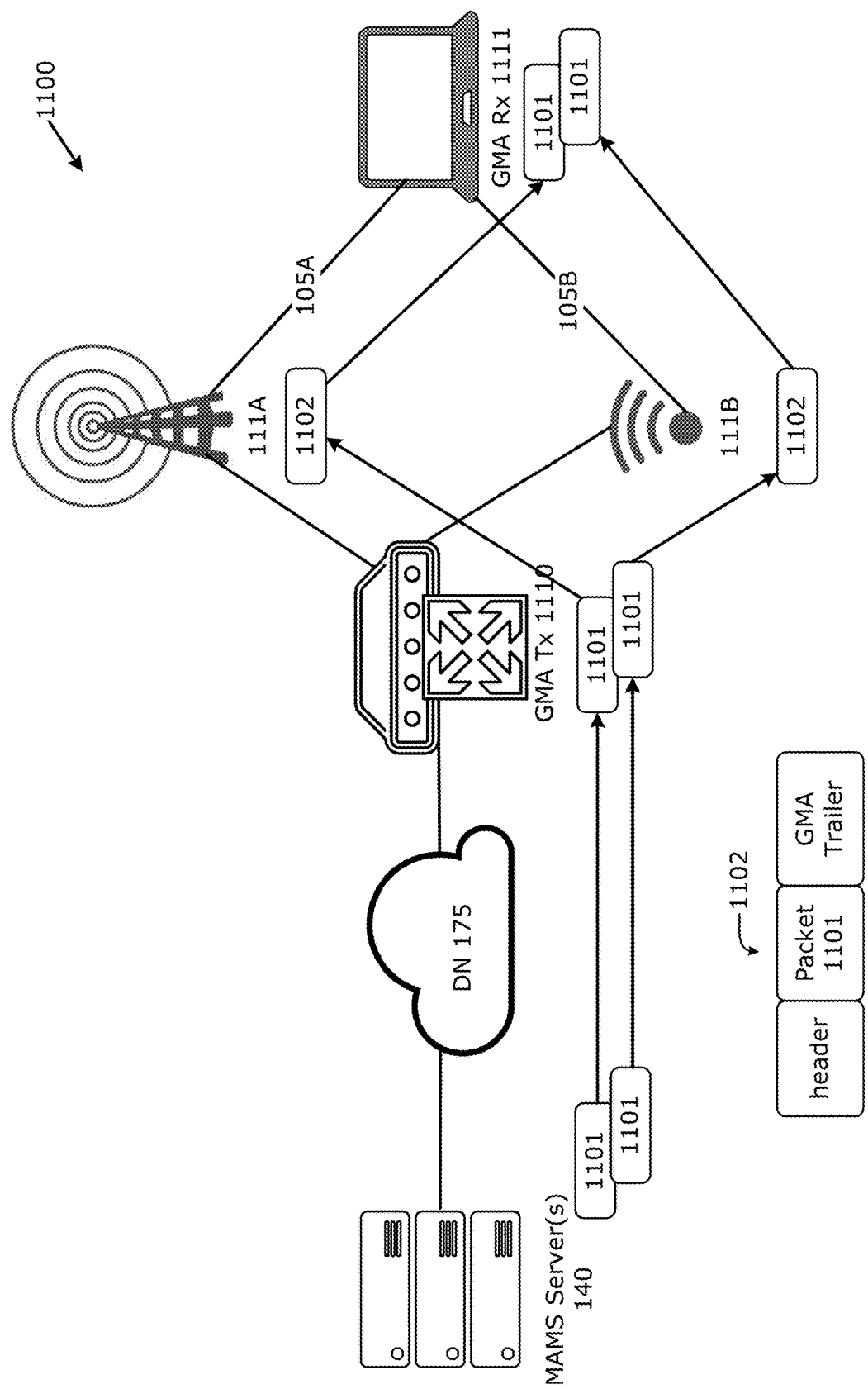
FIG. 11 depicts an example of GMA-based multi-access traffic splitting for downlink.

FIG. 11 shows a GMA multi-access traffic splitting example 1100 for a downlink direction. In the example 1100, data packets 1101 are sent by the MAMS server(s) 740 to a GMA transmitter (Tx) 1110 via the DN 775 (e.g., the Internet). The data packets 1101 may have any suitable network protocol format; for example, the data packets 1101 may be IP packets or the like. The GMA Tx 1110 sends one or more packets to NAN 711A for delivery to a GMA receiver (Rx) 1111 (e.g., client 701) and sends one or more packets to NAN 711B for delivery to the GMA Rx 1111 (e.g., client 701). The NANs 711A, 711B generate encapsulated packets 1102 from the packets 1101 by adding a header (e.g., an IP header) and a GMA trailer (discussed in more detail infra) to each packet 1101. The encapsulated packets 1102 are then sent to the client 701 over the respective access network connections 705. The methods for encapsulating the packets 1101 is discussed in [GMA14].

The main responsibilities of the convergence protocol (see e.g., FIG. 10) is based on whether the entity is acting as a GMA Tx entity 1110 or a GMA Rx entity 1111. The GMA Tx entity 1110 splits or duplicates traffic over multiple radio links 705 and retransmits packets over a different radio link 705 based on e2e measurements. The GMA Rx entity 1111 reorders packets received over different radio links 705 and forwards those packets to higher layer entities, in sequence.

2.1. Generic Multi-Access (GMA) Encapsulation Protocol

As alluded to previously, for MX devices, it is desirable to combine the multiple access network connections seamlessly to improve quality of experience. Such optimization may require additional control information, for example, Sequence Number (SN), in each data packet (e.g., IP packet). The Generic Multi-Access (GMA) Encapsulation Protocol discussed in [GMA14] is a new light-weight and flexible encapsulation protocol for this purpose.

Referring back to FIG. 7, the convergence (sub)layer in the MAMS DPPS is responsible for multi-access operations, including multi-link (path) aggregation, splitting/reordering, lossless switching/retransmission, fragmentation, concatenation, etc. It operates on top of the adaptation (sub)layer in the protocol stack 702, 742. From the Tx perspective, a User Payload (e.g., IP packet) is processed by the convergence layer first, and then by the adaptation layer before being transported over a delivery connection; from the Receiver perspective, an IP packet received over a delivery connection is processed by the adaptation layer first, and then by the convergence layer.

Today, Generic Routing Encapsulation (GRE) is used as the encapsulation protocol at the convergence layer to encode additional control information (e.g., Key, Sequence Number) (see e.g., 3GPP TS 36.361 v15.0.0 (2018 Jul. 9) ("[LWIPEP]"), Dommety, G., "Key and Sequence Number Extensions to GRE", IETF RFC 2890, (September 2000) ("[GRE1]"), and Leymann et al., "Huawei's GRE Tunnel Bonding Protocol", IETF RFC 8157 (May 2017) ("[GRE2]"). However, there are two main drawbacks with this approach including, for example, IP-over-IP tunneling (required for GRE) leads to higher overhead especially for small packets; and it is difficult to introduce new control fields. For example, the overhead of IP-over-IP/GRE tunneling with both Key and Sequence Number is 32 Bytes (20 Bytes IP header+12 Bytes GRE header), which is 80% of a 40 Bytes TCP ACK packet.

The GMA encapsulation protocol is implemented at the convergence layer. GMA supports three encapsulation methods/formats: trailer-based IP encapsulation, header-based IP encapsulation, and non-IP encapsulation. Particularly, the IP Encapsulation methods avoid IP-over-IP tunneling overhead (e.g., 20 Bytes), which is 50% of a 40 Bytes TCP ACK packet. Moreover, GMA introduces new control fields to support fragmentation and concatenation, which are not available in conventional GRE-based solutions such as in [LWIPEP], [GRE1], and [GRE2].

GMA operates between endpoints that have been configured to operate with GMA through additional control messages and procedures (see e.g., [RFC8743]). Moreover, UDP or IPSec tunneling may be used at the adaptation sublayer to protect GMA operation from intermediary nodes (e.g., access nodes, edge nodes, etc.).

As shown by FIG. 7, a client device 701 (e.g., a smartphone, laptop, IoT device, etc.) may connect to the Internet via multiple access network connections 705. One of these connections (e.g., connection 705A) may operate as an anchor connection, and the other connection (e.g., connection 705B) may operate as the delivery connection. The anchor connection provides the network address (e.g., IP address or the like) and connectivity for end-to-end (e2e) Internet access, and the delivery connection provides additional path between the client 701 and the MX gateway (e.g., MX server 740) for multi-access optimizations. In some implementations, the anchor connection when GMA is used may be a virtual IP connection similar to what is used in a VPN, and there may be up to two simultaneous delivery connections (e.g., 5G/NR, LTE, WiFi, etc.), each of which has a dedicated UDP tunnel established over for data transfer.

For example, per-packet aggregation allows a single IP flow to use the combined bandwidth of the two connections. In another example, packets lost due to temporarily link outage may be retransmitted. Moreover, packets may be duplicated over multiple connections to achieve high reliability and low latency, and duplicated packets should be eliminated by the receiving side. Such multi-access optimization requires additional control information (e.g., SN) in each IP data packet, which can be supported by the GMA encapsulation protocol described herein and/or in [GMA14].

GMA is usually used when multiple access network connections are used, but may also be used when only a single access network connection is used. In these scenarios, GMA may be used for loss detection and recovery purposes, or used to concatenate multiple small packets to reduce per packet overhead/resource consumption.

FIG. 12 shows an OTT GMA E2E Network Reference Architecture 1200. In FIG. 12, the MA client 701 includes the CCM 806, which is a control-plane functional entity in the client 701 that exchanges MAMS control messages with the NCM 836 and configures multiple network paths at the client for transport of user data. The CCM 806 is communicatively coupled with a GMA client (Gc) 1201 in the MA client 701.

The Gc 1201 is a data plane functional entity in the client 701 that handles user data forwarding across multiple network paths 705 and MA convergence operations (e.g., splitting, steering, duplication, measurement, etc.). The Gc 1201 operates its own GMA protocol stack, which include the GMA data plane layer, which is on top of respective transport layers Trns-1 and Trns-2 (e.g., TCP, UDP, etc.), which are on top of respective network layers Net-1 and Net-2 (e.g., IP or the like). The respective network layers interact with respective access layer entities RAT-1 and RAT-2. In this example RAT-A is a WiFi station (STA) and RAT-B is an LTE UE.

The MA server 740 includes the NCM 836, which is control-plane functional entity in the network that handles MAMS control messages from the client 701, 7 and configures distribution of data packets over multiple network paths, and user plane treatment of the traffic flows. The NCM 836 is communicatively coupled with a GMA server (Gs) 1240 in the MA server 740. The Gs 1240 is a data plane functional entity in the network that handles user data forwarding across multiple network paths 707 and MA convergence operations (e.g., splitting, steering, duplication, measurement, etc.). The Gs 1240 includes a GMA protocol stack that is the same or similar to the GMA protocol stack in the Gc 1201. Furthermore, the MA server 740, and in particular the Gs 1240, may be communicatively coupled with a NAT/Firewall gateway 1250. The NAT/Firewall gateway 1250 may be disposed between the MA server 740 and a DN 770, 775 (e.g., the Internet, an enterprise network, a local area DN, and/or the like).

A websocket-based (e.g., TCP, UDP, etc.) secure connection is established between the CCM 806 and NCM 836 to exchange MAMS management messages 1230, which are used for configuring the data plane functions (e.g., Gc 1201 and Gs 1240). The MAMS management messages 1230 are discussed in more detail infra.

There are two types of connections in a GMA system 1200: anchor connections and delivery connections. An anchor connection is an IP connection that is used by applications for e2edata transfer. A delivery connection is a network connection (e.g., IP connection) that is used to deliver user data between the Gc 1201 and the Gs 1240. The anchor connection in the OTA GMA system 1200 is virtual network (e.g., IP) connection, which is similar to what is used in virtual private networks (VPNs). In some implementations, there may be up to two simultaneous delivery connections (e.g., 5G/NR, LTE, WiFi, etc.) each of which has a dedicated tunnel (e.g., UDP tunnel or the like) established for data transfer.

Figure 14:
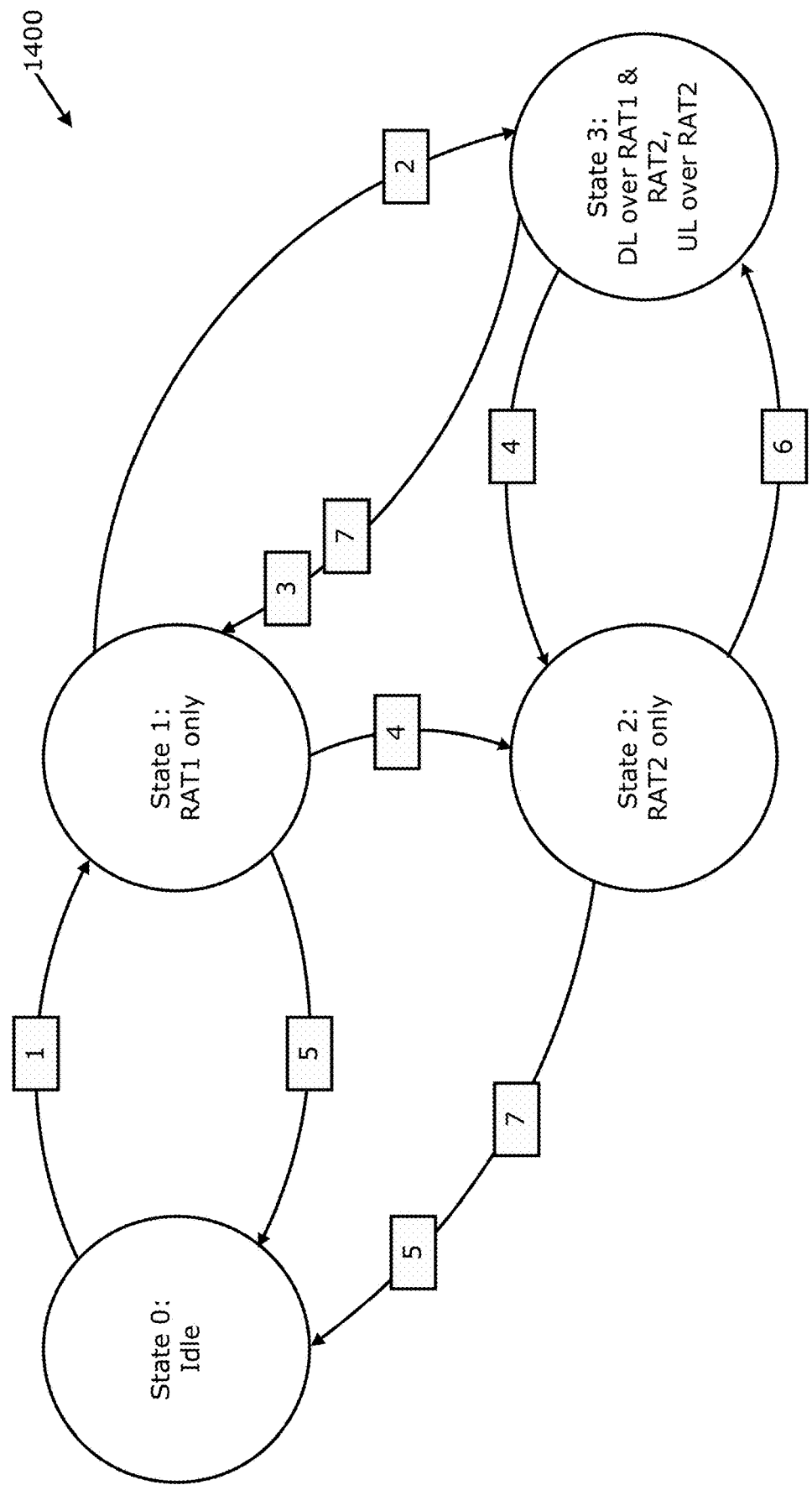
FIG. 14 illustrates a client-based GMA Data Traffic Control State Machine.

The Gc 1201 and/or the Gs 1240 select the delivery connection for MAMS messages based on a current state of the Gc 1201 and/or Gs 1240, which may include one or more of the following: send all MAMS messages over a first (preferred) delivery connection (e.g., WiFi) in state 1 or 3 (see e.g., FIG. 14); and send all MAMS message over the second delivery connection (e.g., Cellular) in state 2 or 4 (see e.g., FIG. 14).

In one example implementation, the NAN 711A is a cellular base station such as a 5G/NR gNB, an LTE eNB, and/or the like, and the GW 1220A comprises one or more servers operating as an Evolved Packet Core (EPC) for LTE implementations or a 5G system (5GS)/5G core network (5GC) for 5G/NR implementations. In this example implementation, the one or more servers operate one or more network functions (NFs) such as a UPF in 5G/NR implementations, a Serving Gateway (S-GW) and/or Packet Data Network Gateway (P-GW) in LTE implementations, or the like. In this example implementation, connection 706A is an N3 reference point/interface for 5G/NR implementations or an S1 reference point/interface for LTE implementations, and connection 707A is an N6 reference point/interface for 5G/NR implementations or an SGi reference point/interface for LTE implementations.

In another example implementation (with may be combined with the previously described example implementation), the NAN 711B is a WLAN access point (AP) such as a WiFi AP, and the GW 1220B comprises one or more servers and/or network elements operating as a WLAN (WiFi) access gateway (WAG), a broadband network gateway (BNG), and/or the like. In this example implementation, each of connection 706B and connection 707B may be a suitable tunneling interface/link such as a GRE tunnel, general packet radio service (GPRS) Tunneling Protocol (GTP) tunnel, Mobile IP (MIP), a Proxy MIP (PMIP) tunnel, VPN tunnel, and/or the like. The connection 706B and connection 707B may utilize the same or different tunneling protocols and/or communication technologies.

Figure 13:
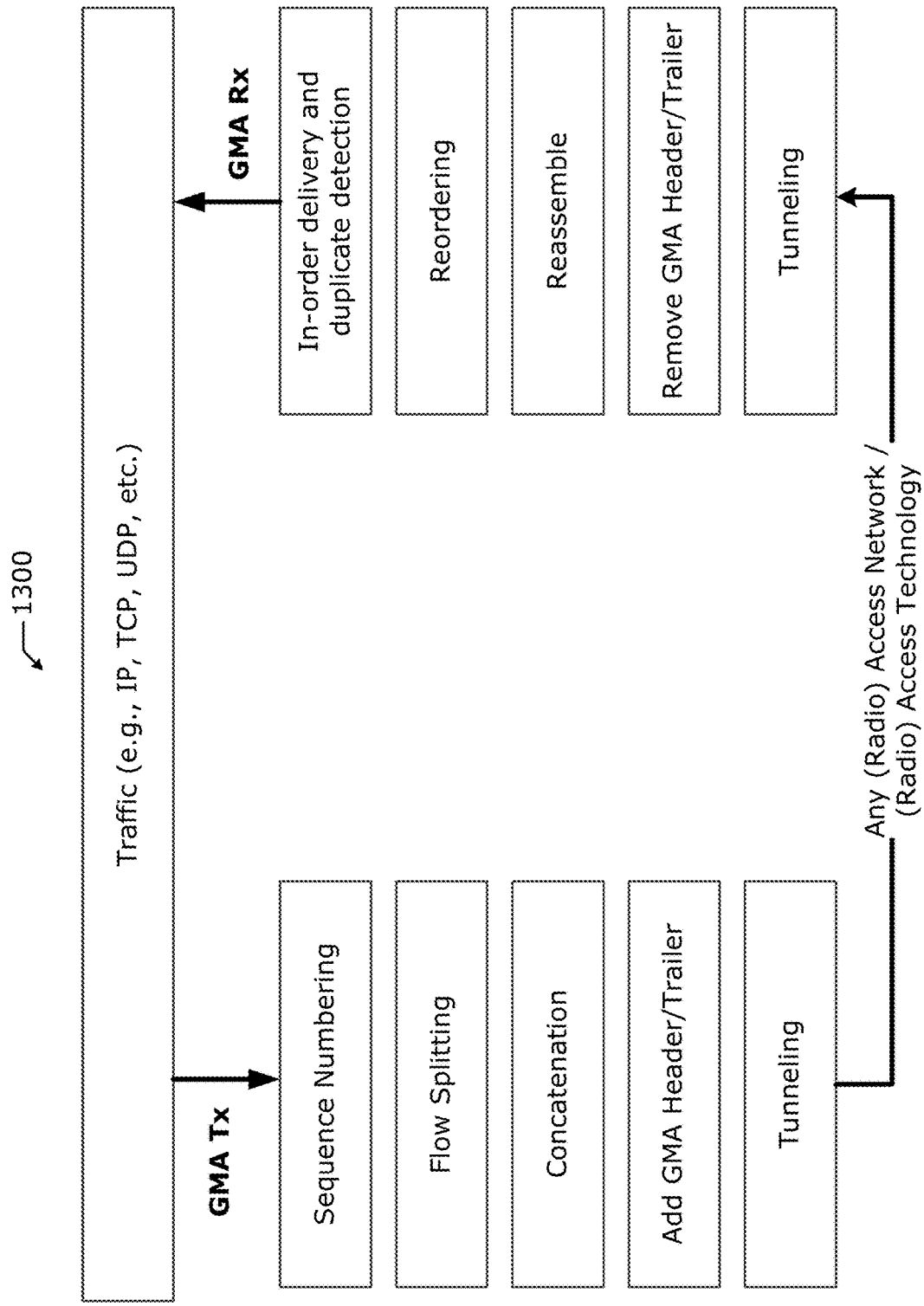
FIG. 13 depicts an example of GMA data plane functionalities.

FIG. 13 shows functionalities of a GMA data plane entity 1300. The GMA data plane entity 1300 corresponds to the Gs 1240 and/or the Gc 1201 discussed previously with respect to FIG. 12 (or corresponds to the GMA data-plane layer within the Gs 1240 and/or the Gc 1201). Here, the GMA data plane acts as a generic convergence layer for any (radio) access network and/or (radio) access technology. The GMA data plane entity 1300 performs various functions such as path quality measurements (QoS, packet loss, latency, etc.), multi-link traffic steering (e.g., traffic splitting/ steering, reordering, retransmission, duplication, coding, fragmentation, concatenation, etc.), and QoS-aware traffic shaping and queuing (e.g., priority queuing (PQ), Strict Priority (SP), Weighted Round Robin (WRR), etc.).

The GMA data plane entity 1300 at a GMA Tx prepares traffic (e.g., IP, TCP, UDP, etc.) for transmission to a GMA Rx. The GMA Tx provides sequence number to packets, performs flow (traffic) splitting wherein packets are split or distributed to different multiple access networks (or RATs), simultaneously for delivery to the GMA Rx. The GMA Tx also performs concatenation, which involves putting multiple SDUs into one PDU to reduce packet processing and tunneling overhead, thereby improving signaling and processing efficiency. The GMA Tx also adds a GMA header or trailer to the packet(s) and performs tunneling by, for example, repackaging the packet according to a suitable GMA tunneling protocol. The packet(s) is/are then transmitted over a suitable access network (e.g., one of the different (R)ANs/(R)ATs discussed herein).

The GMA Rx receives the packet(s) and unpackages the packet(s) according to the tunneling protocol being used, and removes the GMA header/trailer. The GMA Rx also reassembles and reorders the packet(s) that are delivered over multiple access networks based on the sequence numbers provided by the GMA Tx. The GMA Rx then performs duplicate detection to identify (and discard) and duplicate packets, and then delivers, in-order, the reassembled and reordered packet(s) to higher layers Additionally or alternatively, the GMA data plane entity 1300 provides lossless switching, which involves the retransmission and/or recovery of packets that may be lost when switching from one network access path to another network access path. Additionally or alternatively, the GMA data plane entity 1300 performs or provides path quality measurements, which includes passive and active measurements of QoS parameters such as, for example, packet loss rate, round trip time, among many others (such as the various measurements discussed herein). Additionally or alternatively, the GMA data plane entity 1300 performs other functions such as automatic repeat request (ARQ)-like retransmission, duplication, network coding, traffic shaping/queuing, and/or the like.

FIG. 14 illustrates a client-based GMA data traffic control state machine 1400. The data traffic control state machine 1400 includes the following states:

State 0 (Idle): the (anchor) virtual connection is down.

State 1 (RAT1 only): all data traffic (DL and UL) are delivered over the first (preferred) RAT connection (RAT1).

State 2 (RAT2 only): all data traffic are delivered over the second connection (RAT2).

State 3 (DL over RAT1 & RAT2, UL over RAT2): DL traffic are delivered over both connections, and UL traffic are delivered over the second connection (RAT2).

The data traffic control state machine 1400 includes the following state-transition triggers:

(1) The (anchor) virtual connection is established successfully. This trigger causes a transition from state 0 to state 1.

(2) Congestion is detected over the RAT1 DL and RAT2 Link Success has been declared/detected wherein the last control message over RAT2 was successful. This trigger causes a transition from state 1 to state 3. In some implementations, congestion detection (based on packet loss) is applicable only if the RAT1 Congestion Detection flag is disabled.

(3) Congestion is no longer present over the RAT1 DL (applicable only if the RAT1 Congestion Detection flag is disabled). This trigger causes a transition from state 3 to state 1.

(4) RAT1 received signal quality (or received signal strength) is relatively poor (e.g. <−75 decibel-milliwatts (dBm)) and/or RAT1 has declared or detected a link failure (or Radio Link Failure (RLF)). The particular mechanism for detecting and/or declaring a link failure (or RLF) is defined by the standards/specifications of RAT1. This trigger causes a transition from state 1 to state 2 or a transition from state 3 to state 2.

(5) The GMA/MAMS operation is terminated or suspended. Termination of the GMA/MAMS operation may include a delivery connection (RAT2 or RAT1) being lost for a predefined period (e.g., 10 minutes or some other amount of time) and/or total throughput is relatively low (e.g., <10 kilobits per second (Kbps)). Suspended GMA/MAMS operation may include a screen being off and/or total throughput is low (e.g., <10 Kbps). This trigger causes a transition from state 1 to state 0 or a transition from state 2 to state 1.

(6) RAT1 received signal quality is relatively good (e.g., >−70 dBm) and RAT1 has detected/declared a Link Success. This trigger causes a transition from state 2 to state 3.

(7) RAT2 has detected/declared a link failure (or RLF). The particular mechanism for detecting and/or declaring a link failure (or RLF) is defined by the standards/specifications of RAT2. This trigger causes a transition from state 3 to state 1 or a transition from state 2 to state 0.

If a link is declared "Link Failure", it should not be used to send any data or control packets, except "Probe/ACK", and the "Link Failure" status can only be turned off after successfully transmitting a probe message over the link.

The following three flows are defined for data traffic:

High Reliability (Flow ID=1): High Reliability traffic will be delivered by duplication over both RAT1 and RAT2 in state 1, 2 and 3. Notice that the receiver will be responsible for detecting and removing duplicated packet based on their sequence number (using the algorithm defined in 6.6.1). Notice that high reliability flow should have low data rate (e.g., <1 Mbps).

Delay Sensitive (Flow ID=2): Delay Sensitive traffic will be delivered over RAT2 only in State 1, 2 and 3.

High Throughput (Flow ID=3): High Throughput (e.g., DL) traffic will be delivered by aggregation over both RAT1 and RAT2 in State 3, and the receiver (Gc) will be responsible for reordering packets using algorithm defined in 6.6.1 or 6.6.2. UL traffic will be delivered by RAT1 in state 1 and by RAT2 in state 2. In state 3, UL traffic will be delivered by RAT2 if the "UL-over-RAT2 flag" is set to "1", and by RAT1 otherwise. The default value of "UL-over-RAT2 flag" is 0 (disabled).

In the example of FIG. 14, RAT1 may be a WLAN RAT (e.g., WiFi) and RAT2 may be a cellular RAT (e.g., 5G/NR, LTE, GSM, GPRS, WiMAX, etc.). The specific RAT protocols may define the mechanisms and/or parameters for determining Link Failures and/or Link Successes.

Figure 15:
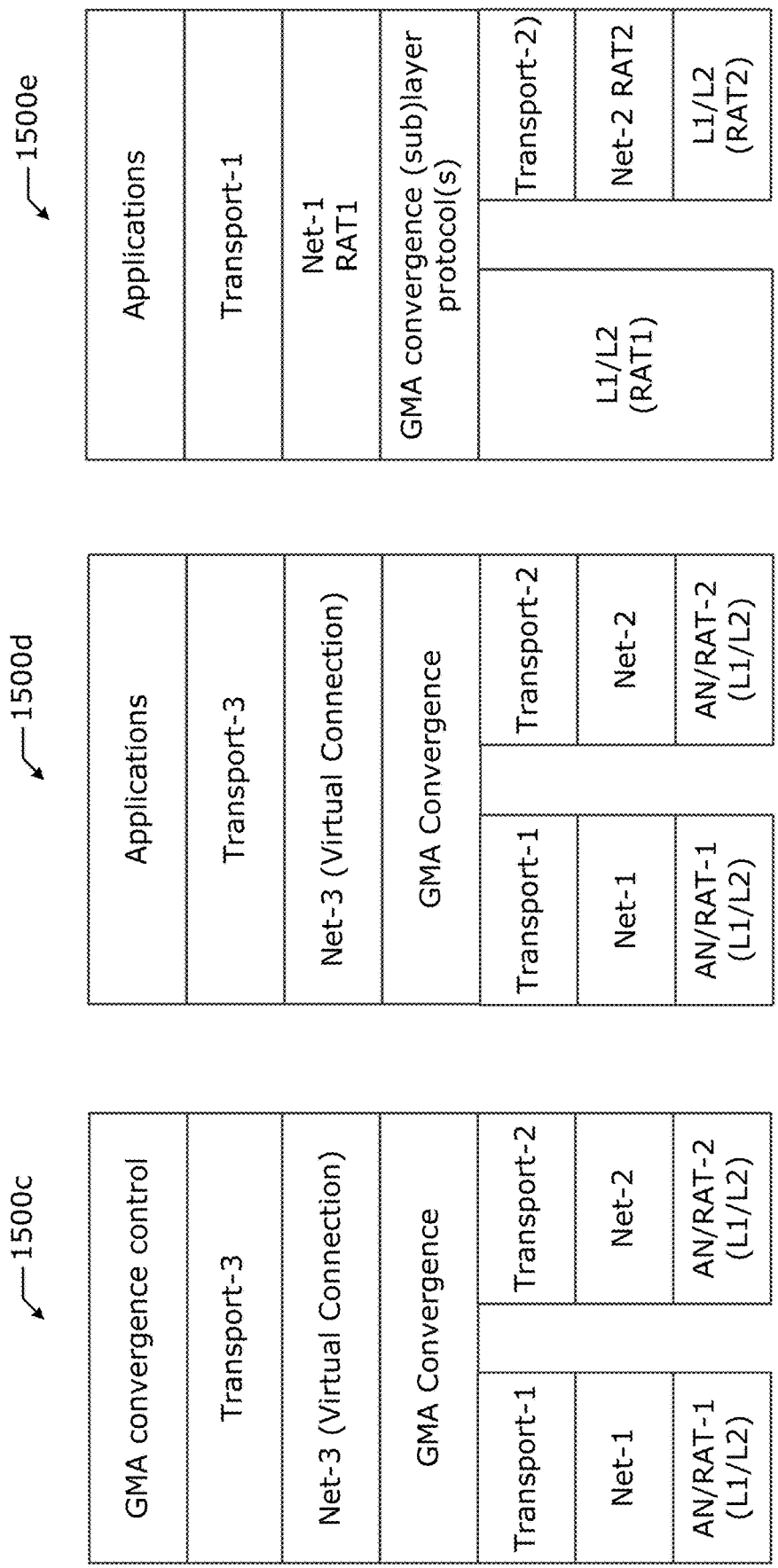
FIG. 15 depicts an example GMA-based data plane protocol stack for OTT MAMS deployments and a GMA-based MAMS data plane protocol stack.

FIG. 15 depicts an example GMA convergence control protocol stack 1500c. The GMA convergence control protocol stack 1500c includes a GMA convergence control layer which includes GMA/MAMS control messages. Additionally, a third transport layer (e.g., UDP or IP Security Protocol (IPSec)) tunnel is established over a virtual (anchor) IP connection (IP-3) for sending time-sensitive control messages (e.g., probes, traffic splitting updates, etc.).

The virtual (anchor) IP connection is on top of a GMA convergence layer (also referred to as a "GMA encapsulation layer"). This allows the (virtual) IP packets carrying a GMA control message(s) to be encapsulated with a GMA header, which only includes a 2B Flag field (discussed infra) where the Flag field is set to all "0"s. The GMA encapsulation layer resides on top of respective transport (e.g., UDP or IPSec) tunneling layers for respective access networks (ANs) 1 and 2, which is on top of respective IP layers, which are on top of layer 2 (L2) and Layer 1 (L1) of the respective ANs 1 and 2. The anchor connection is now virtual and no longer tied to any specific access network (e.g., AN1 and AN2 in the example of FIG. 15).

FIG. 15 also shows an example GMA convergence data protocol stack 1500d. The GMA convergence data protocol stack 1500d is similar to the GMA convergence control protocol stack 1500c except that the GMA convergence control layer in the stack 1500c is replaced with an applications layer.

Figure 16:
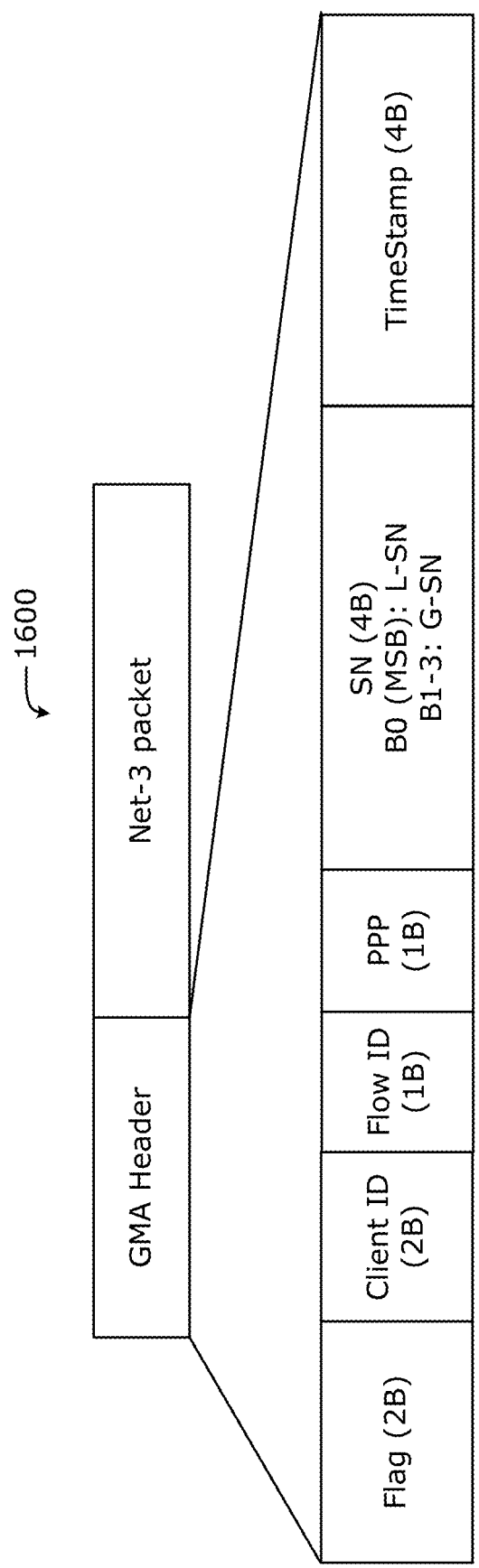
FIG. 16 depicts GMA convergence protocol data unit (PDU) format.

In both stacks stack 1500c, stack 1500d, anew protocol layer, the GMA convergence (also referred to as Trailer-based MAMS convergence [UPMAMS]) layer, is introduced to handle all multi-path (management) related operations (e.g., concatenation, splitting, reordering, duplication, elimination, measurements, etc.). In some implementations, the GMA convergence layer encapsulates the data and/or control messages using a GMA header-based encapsulation format is used as shown in FIG. 16. The GMA convergence encapsulation protocol is discussed in [GMA14]. When an access network 710 does not support any MAMS network functions, the virtual connection is established between an end-device (e.g., client device 701) and cloud server or Edge server. This virtual connection may then be used as the anchor connection for cloud applications or Edge applications. The virtual anchor connections may be an IP connection that is used by applications for e2e data transfer. The other connections (e.g., delivery connections) of AN1 and AN2 may be IP connections to deliver user data between the client and server. Additionally, the existing MAMS convergence sublayer functionalities [UPMAMS] can be reused as-is. Additionally or alternatively, the virtual (anchor) connection is established for sending time-sensitive MAMS control/management messages (e.g., probes, traffic splitting updates, etc.) The (virtual) packets carrying a GMA control/management messages are also encapsulated with the GMA header, which is also discussed in more detail infra FIG. 16 depicts GMA convergence protocol data unit (PDU) format 1600. The PDU 1600 includes a GMA header and an IP packet. The GMA header is discussed in more detail infra. In this example, the PDU 1600 includes a flag field (2 bits (B), a client ID field (2B), a flow ID field (1B), a Per-Packet Priority (PPP) field 1B), a sequence number (SN) field (4B), and a timestamp field (4B) as follows where Bit 0 is the most significant bit (MSB) and Bit 15 is the least significant bit (LSB): Bit #0 (MSB): Client ID; Bit #1; Flow ID; Bit #2: Per-Packet Priority (PPP); Bit #3: Sequence Number (B0: L-SN, B1-B3: G-SN); Bit #4: Timestamp; and Bit #13-15: GMA protocol (e.g., "0x07").

The B0 of the SN field includes is an L-SN (sub)field and B1-B3 of the SN field is a G-SN (sub)field. The G-SN is for reordering and the L-SN is for packet loss measurement. The (2B) flag field indicates what additional fields are included in the GMA header. The following bits in the flag field may include a first value if the packet 1600 carries downlink data (e.g., "0xF807"), a second value if the packet carries uplink data (e.g., "0x7807"), a third value if the packet 1600 carries an encrypted control message (e.g., "0x800F"), or a fourth value if the packet 1600 carries an un encrypted control message (e.g., "0x0000"). Additionally or alternatively, if the packet 1600 carries uplink data, the "Client ID" field is not be included in the GMA header. Additionally or alternatively, if the packet 1600 carries an encrypted control message, it may include the following fields: Bit #0 (MSB): Client ID; Bit #12: Encryption Enabled; and Bit #13-15: GMA protocol (e.g., "0x07").

As shown in FIGS. 9, 15, and 16, there are three different network addresses (e.g., IP addresses) and three transport connections (e.g., UDP, TCP, etc.) for each client in a GMA system. The network address (e.g., IP address) of each delivery connection on the client is configured by a respective access network. All other network addresses (e.g., IP address) and transport ports (e.g., UDP, TCP ports, or the like) are configured in the GMA system through either client configuration or MAMS messages.

2.1.1. GMA Encapsulation Methods and Formats

The GMA encapsulation protocol supports the following three methods: trailer-based IP encapsulation; header-based IP encapsulation; and (header-based) non-IP encapsulation. Trailer-based IP encapsulation should be used as long as implementation allows. Header-based encapsulation should be used if trailered-based encapsulation is not feasible due to any reason (e.g., implementation constraints). In this case, if the adaptation layer (e.g., UDP tunneling) supports non-IP packet format, header-based non-IP encapsulation should be used; otherwise, header-based IP encapsulation should be used.

If non-IP encapsulation is configured, GMA header should always be present in every packet. In comparison, if IP encapsulation is configured, GMA header or trailer may be added dynamically on per-packet basis, and it indicates the presence of GMA header (or trailer) to set the protocol type of the GMA PDU to "114".

The GMA endpoints may configure the encapsulation method through control signaling (see e.g., FIG. 8) or pre-configuration. For example, an "MX UP Setup Configuration Request" message as discussed in [RFC8743] includes the "MX Convergence Method Parameters," which provides the list of parameters to configure the convergence layer, and can be extended to indicate the GMA encapsulation method. A "GMA encapsulation format" parameter may be included to indicate one of the three GMA encapsulation methods.

Figure 17:
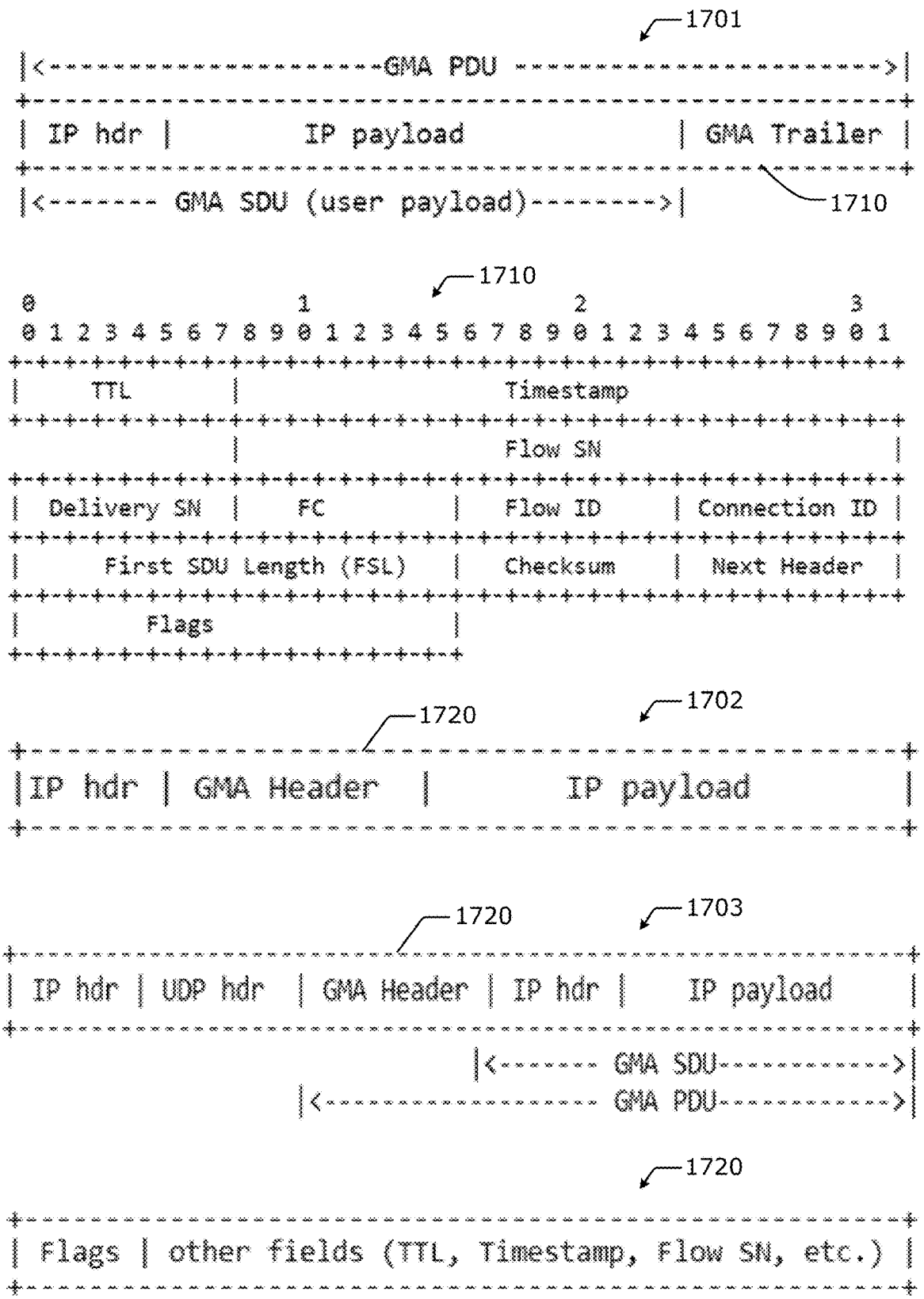
FIG. 17 illustrates various GMA packet formats.

FIG. 17 shows various GMA Protocol Data Unit (PDU) formats including a GMA PDU Format with Trailer-based IP Encapsulation 1701, a GMA PDU Format with Header-based IP Encapsulation 1702, and a GMA PDU Format with Non-IP Encapsulation 1703. Each GMA PDU (regardless of the particular format used) may carry one or more IP packets (also referred to as (GMA) service data units (SDUs)), or a fragment of an IP packet (or (GMA) SDU fragment), in the payload section of the PDU.

The GMA PDU 1701 includes an IP header, IP payload, and a GMA trailer 1710. The other GMA PDUs 1702 and 1703 include a GMA header 420 instead of the GMA trailer 1710. The GMA trailer 1710 and GMA header 1720 include various GMA control fields. Usually, the trailer-based IP encapsulation GMA PDU 1701 is used as long as implementation allows/permits. However, the header-based encapsulation PDUs 1702 and 1703 may be used if the GMA control fields cannot be added at the end of the packets.

2.1.1.1. Trailer-Based IP Encapsulation

For the trailer-based GMA PDU 1701, the Protocol Type field in the IP header is changed to "114" (any 0-hop protocol) to indicate the presence of the GMA trailer 1710. If the original IP packet is IPv4, the following three IP header fields may be changed: IP length field: add the length of the "GMA Trailer" to the length of the original IP packet); Time to Live (TTL): set the TTL field to "1"; and IP checksum field: recalculate IP checksum after changing the "Protocol Type" field, "TTL", and "IP Length".

If the original IP packet is Ipv6, the following two IP header fields may be changed: IP length field: add the length of the "GMA Trailer" to the length of the original IP packet; Hop Limit (HL) field: set the HL field to "0".

If UDP tunneling is used at the adaptation layer to carry the GMA PDU 1701, 1702 or 1703, these three IP header fields may remain unchanged, and the Rx will determine the GMA PDU length based on the UDP packet length.

FIG. 17 also shows an example format of the GMA trailer 1710, which shows various control fields present. The GMA trailer 1710 includes one or more mandatory fields and zero or more optional fields. The mandatory fields include the "flags" field and "next header" field, which are the last 3 bytes of the GMA trailer 1710. The Next Header field (1 Byte) indicates the IP protocol type of the (first) SDU in a PDU, and it stores the value before it was overwritten to '114.' For the Flags field (2 Bytes), Bit 0 is the most significant bit (MSB), and Bit 15 is the least significant bit (LSB). The Flags field includes the following fields: Checksum Present (bit 0): If the Checksum Present bit is set to 1, then the Checksum field is present; Concatenation Present (bit 1): If the Concatenation Present bit is set to 1, then the PDU carries multiple SDUs, and the First SDU Length field is present; Connection ID Present (bit 2): If the Connection ID Present bit is set to 1, then the Connection ID field is present; Flow ID Present (bit 3): If the Flow ID Present bit is set to 1, then the Flow ID field is present; Fragmentation Present (bit 4): If the Fragmentation Present bit is set to 1, then the PDU carry a fragment of the SDU and the Fragmentation Control field is present; Delivery SN Present (bit 5): If the Delivery Sequence Number (SN) Present bit is set to 1, then the Delivery SN field is present and contains the valid information; Flow SN Present (bit 6): If the Flow SN Present bit is set to 1, then the Sequence Number field is present; Timestamp Present (bit 7): If the Timestamp Present bit is set to 1, then the Timestamp field is present; TTL Present (bit 8): If the TTL Present bit is set to 1, then the TTL field is present; Reserved (bit 9-12): set to "0" and ignored on receipt; Version (bit 13~15): GMA version number, set to 0 for the GMA encapsulation protocol specified in [GMA14]. The Flags field is at the end of the PDU and the Next Header field is the second to last field. The GMA Rx may decode the Flags field first to determine the length of the GMA trailer, and then decodes the one or more optional fields included in the GMA PDU (discussed infra).

The GMA trailer 1710 may also include zero or more of the following optional fields: Checksum (1 Byte) to contain the (one's complement) checksum sum of all the 8 bits in the trailer 1710 (for purposes of computing the checksum, the value of the checksum field is Zero; this field is present only if the Checksum Present bit is set to one); First SDU Length (2 Bytes) indicates the length of the first IP packet in the PDU, only included if a PDU contains multiple IP packets (e.g., this field is present only if the Concatenation Present bit is set to one); Connection ID (1 Byte) includes an unsigned integer to identify the anchor and/or delivery connection of the GMA PDU (e.g., this field is present only if the Connection ID Present bit is set to one): the Anchor Connection ID data element/field (MSB 4 Bits of the Connection ID field) is an unsigned integer to identify the anchor connection, and the Delivery Connection ID data element/field (LSB 4 Bits of the Connection ID field) is an unsigned integer to identify the delivery connection; Flow ID (1 Byte) includes an unsigned integer to identify the IP flow that a PDU belongs to, for example, Data Radio Bearer (DRB) ID [LWIPEP] for a cellular (e.g. LTE, 5G/NR, etc.) connection (e.g., this field is present only if the Flow ID Present bit is set to one); Fragmentation Control (FC) (e.g. 1 Byte) to provide necessary information for re-assembly, only needed if a PDU carries fragments (e.g., this field is present only if the Fragmentation Present bit is set to one; see e.g., section 5 in [GMA14]); Delivery SN (1 Byte) includes an auto-incremented integer to indicate the GMA PDU transmission order on a delivery connection (e.g., the Delivery SN may be needed to measure packet loss of each delivery connection and therefore generated per delivery connection per flow; e.g., this field is present only if the Delivery SN Present bit is set to one); Flow SN (3 Bytes) includes an auto-incremented integer to indicate the GMA SDU (e.g., IP packet) order of a flow (e.g., the flow SN may be needed for retransmission, reordering, and fragmentation; the flow SN may be generated per flow; e.g., this field is present only if the Flow SN Present bit is set to one; Timestamp (4 Bytes) to contain the current value of the timestamp clock of the Tx in the unit of 1 millisecond. This field is present only if the Timestamp Present bit is set to one; and TTL (1 Byte) to contain the TTL value of the original IP header if the GMA SDU is IPv4, or the Hop-Limit value of the IP header if the GMA SDU is IPv6 (e.g., field is present only if the TTL Present bit is set to one). The GMA control fields follow the bit order in the flags field (e.g., Bit 0 (MSB) of the flags field is the checksum present bit, and the checksum field is the last in the trailer 1710 except for the two mandatory fields; Bit 1 is the concatenation present bit and the FSL field is the second to last, and so forth).

2.1.1.2. Header-Based IP Encapsulation

FIG. 17 also shows the header-based IP encapsulation format 1702. Here, the GMA header 1720 is inserted right after the IP header of the GMA SDU.

FIG. 17 also shows an example GMA header (hdr) format 1720, which includes the Flags field and the GMA control fields. In comparison to GMA trailer 1710, the only difference is that the Flags field is now in the front so that the Rx can first decode the Flags field to determine the GMA header length. Moreover, the IP header fields of the GMA PDU should be changed in the same way as trailered-based IP encapsulation (as discussed previously). Additionally or alternatively, the TTL, FSL, and Next Header fields are removed from the GMA control fields since the IP header fields of the GMA SDU remain unchanged during encapsulation. The order of the other GMA control fields is/are the same as discussed previously.

In some implementations, if the adaptation layer (e.g., UDP tunneling or the like) supports a non-IP packet format, the GMA PDU 1702 may be used without modification. If the adaptation layer (see e.g., FIG. 7B) only supports the IP packet format, the header-based IP encapsulation GMA PDU 1703 may be used. In the header-based IP encapsulation PDU 1703, the IP header of the GMA SDU (e.g., IP payload) is moved to the front of the packet so that the GMA PDU 1703 becomes an IP packet, and the IP header fields of the GMA PDU 1703 may be changed in the same manner as the trailer-based IP encapsulation PDU 1701.

The header or trailer based IP encapsulation PDUs 1702, 1701 may be used dynamically on a per-packet basis, and setting the protocol type of the GMA PDU to "114" indicates the presence of the GMA header 1720 in an IP packet.

2.1.1.3. (Header-Based) Non-IP Encapsulation

FIG. 17 also shows the header-based non-IP encapsulation format 1703. Here, "UDP Tunnelling" is configured at the MX adaptation layer. Additionally, the "TTL", "FSL", and "Next Header" are no longer needed. Moreover, the IP header fields of the GMA SDU remain unchanged. If non-IP encapsulation is configured, the GMA header 1720 is also present.

2.1.2. Fragmentation

The convergence layer MAY support fragmentation if a delivery connection has a smaller maximum transmission unit (MTU) than the original IP packet (SDU). The fragmentation procedure at the convergence sublayer is similar to IP fragmentation (see e.g., "DARPA Internet Program Protocol Specification" IETF RFC 791 (September 1981)) in principle, but with the following two differences for less overhead: the fragment offset field is expressed in number of fragments; and the maximum number of fragments per SDU is $2^7$ (=128).

The Fragmentation Control (FC) field in the GMA trailer (or header) contains the following bits: Bit #7: a More Fragment (MF) flag to indicate if the fragment is the last one (0) or not (1); and Bit #0~#6: Fragment Offset (in units of fragments) to specify the offset of a particular fragment relative to the beginning of the SDU.

A PDU carries a whole SDU without fragmentation if the FC field is set to all "0"s or the FC field is not present in the trailer. Otherwise, the PDU contains a fragment of the SDU.

The Flow SN field in the trailer is used to distinguish the fragments of one SDU from those of another. The Fragment Offset (FO) field tells the receiver the position of a fragment in the original SDU. The More Fragment (MF) flag indicates the last fragment.

To fragment a long SDU, the Tx creates n PDUs and copies the content of the IP header fields from the long PDU into the IP header of all the PDUs. The length field in the IP header of PDU should be changed to the length of the PDU, and the protocol type should be changed to 114.

The data of the long SDU is divided into n portions based on the MTU size of the delivery connection. The first portion of the data is placed in the first PDU. The MF flag is set to "1", and the FO field is set to "0". The i-th portion of the data is placed in the i-th PDU. The MF flag is set to "0" if it is the last fragment and set to "1" otherwise. The FO field is set to i−1.

To assemble the fragments of a SDU, the receiver combines PDUs that all have the same Flow SN. The combination is done by placing the data portion of each fragment in the relative order indicated by the Fragment Offset in that fragment's GMA trailer (or header). The first fragment will have the Fragment Offset set to "0", and the last fragment will have the More-Fragments flag set to "0".

GMA fragmentation operates above the IP layer of individual access connection (e.g., RAT1, RAT2, etc.) and between the two end points of convergence layer. The convergence layer end points (client, multi-access gateway) should obtain the MTU of individual connection through either manual configuration or implementing Path MTU Discovery (PMTUD) as suggested in Bonica et al., "IP Fragmentation Considered Fragile", IETF RFC 8900 (September 2020).

2.1.3. Concatenation

The convergence sublayer may support concatenation if a delivery connection has a larger maximum transmission unit (MTU) than the original IP packet (SDU). Only the SDUs with the same client network address (e.g., IP address or the like), and the same Flow ID may be concatenated. If the (trailer or header based) IP encapsulation method is used, the First SDU Length (FSL) field should be included in the GMA trailer (or header) to indicate the length of the first SDU. Otherwise, the FSL field should not be included.

To concatenate two or more SDUs, the Tx creates one PDU and copies the content of the IP header field from the first SDU into the IP header of the PDU. The data of the first SDU is placed in the first portion of the data of the PDU. The whole second SDU is then placed in the second portion of the data of the PDU. The procedure continues till the PDU size reaches the MTU of the delivery connection. If the FSL field is present, the IP length field of the PDU should be updated to include all concatenated SDUs and the trailer (or header), and the IP checksum field should be recalculated if the packet is IPv4.

To disaggregate a PDU, if the (header or trailer based) IP encapsulation method is used, the receiver first obtains the length of the first SDU from the FSL field and decodes the first SDU. The receiver then obtains the length of the second SDU based on the length field in the second SDU IP header and decodes the second SDU. The procedure continues till no byte is left in the PDU. If the non-IP encapsulation method is used, the IP header of the first SDU will not change during the encapsulation process, and the receiver SHOULD obtain the length of the first SDU directly from its IP header.

If a PDU contains multiple SDUs, the Flow SN field is for the last SDU, and the Flow SN of other SDU carried by the same PDU can be obtained according to its order in the PDU. For example, if the SN field is 6 and a PDU contains 3 SDUs (IP packets), the SN is 4, 5, and 6 for the first, second, and last SDU respectively. GMA concatenation can be used for packing small packets of a single application, e.g. TCP ACKs, or from multiple applications. Notice that a single GMA flow may carry multiple application flows (TCP, UDP, etc.).

2.1.4. GMA Protocol Stack

FIG. 15 also shows an (anchored) integrated GMA convergence protocol stack 1500e. As alluded to previously, GMA data plane functions (e.g., Gc and Gs) may be integrated into one or more existing network functions (e.g., a Gateway (GW), MEC, etc.) to avoid using virtual network interface (e.g., IP #3). The integrated GMA data plane protocol stack 1500e uses the RAT1 connection as the anchor connection. As a result, only one UDP tunnel is needed for delivering traffic over the non-anchor connection, which is the RAT2 connection.

In one example, the RAT1 anchor connection is a cellular connection (e.g., 5G/NR, LTE, etc.) and the RAT2 non-anchor connection is a WiFi connection. If using the 5G/LTE connection as the anchor for applications, and the WiFi connection as the delivery connection, UDP tunneling (or IPSec) may be used for delivering 5G/LTE IP traffic over a WiFi network. The GMA convergence sublayer (see also e.g., FIGS. 7A, 7B, 7C) is responsible for multi-path management operations (e.g., lossless switching, aggregation/splitting, etc.). In another example, a virtual IP connection may be used as the anchor, and the server 740 will provide all necessary information through MAMS signaling to configure the virtual IP connection on the client side 701. In the example GMA-MAMS DPPS 1500e, the GMA data plane functions (Gc 1201 and Gs 1240) may be integrated into an existing network function (e.g., Gateway, Edge server/host such as a MEC server/host, etc.) to avoid using a virtual network interface.

2.1.5. GMA Configuration Parameters

Some example GMA configuration parameters are as follows: RAT1 probing interval: 30 seconds; RAT2 probing interval in state 1 and 2: 30 seconds; RAT2 probing interval in state 3: 10 second; RAT2 reconnecting interval: 60 seconds; Low throughput threshold: 10 kBps; Link disconnect timer: 10 minutes; RAT1 signal quality low threshold: −75 dBm; RAT1 signal quality high threshold: −70 dBm; RAT1 packet loss low threshold: 1%; RAT1 packet loss high threshold: 10%; Reordering queue size for High Throughput Flow (Flow ID=3): 1000 packets; Reordering timer for High Throughput Flow (Flow ID=3): 100 ms; Reordering queue size for High Reliability Flow (Flow ID=1): 20 packets; Reordering timer for High Reliability Flow (Flow ID=1): 10 ms; Measurement Interval (MI): 30 seconds; Reporting Interval (RI): 50 (MIs); Default Flow ID (DFI): 3; Control message retransmission limit: 3; Virtual NIC MTU size: 1400 (bytes); Idle Timer: 1 minute; Timestamp unit: 1000 (us); UL-over-LTE flag: 0 (disabled, default)/1 (enabled); Wi-Fi Congestion Detection flag: 0 (disabled, default)/1 (enabled); and Power Save flag: 0 (disabled, default)/1 (enabled).

Both Gc and Gs maintain the following (per-client) parameter(s): Start_Time: the duration between now and next "time zero" when Start_Time is reset (in the unit of 1 ms); tx_timeStamp: a timestamp of when a packet is transmitted; rx_timeStamp: a timestamp of when a packet is received; and Sync_Guard_Time: configurable parameter that controls how long Gc or Gs should wait before starting measurements (based on timestamp info in received packet(s)).

Gc and Gs reset their respective "Start_Time" immediately after the successful exchange of mx_session_resume_req/rsp, and the (tx) timestamp parameter in a control message indicates the duration between transmitting the message and resetting Start_Time.

In the above example(s), RAT1 is a WLAN connection/RAT (e.g., WiFi or the like) and RAT2 is a cellular connection/RAT (e.g., LTE, 5G/NR, GSM, WiMAX, or the like).

2.1.6. GMA Deployment Scenarios

Some example GMA based deployments may be as follows:

In a first GMA deployment, GMA client modules (e.g., GMA Gc and/or CCM 806) may be implemented as a "multi-home VPN" application and run on a UE (e.g., smartphone, tablet, PC, etc.) without any impact to platform or operation system.

In a second GMA deployment, the GMA server modules (e.g., GMA Gs and/or NCM 836) may be implemented as an "Edge/cloud server" application (e.g., MEC app or the like) and run in the Edge or cloud server without any impact to platform or operation system. If running GMA server on the Edge, the traffic routing policy may be configured on the Edge platform such that the following three flows are routed locally to the edge platform: TCP flow (for MAMS management messages): IP #1 (or IP #2)+TCP #1; UDP flow (for tunneling traffic over the $1^{st}$ delivery connection): IP #1+UDP #1; UDP flow (for tunneling traffic over the second delivery connection): IP #2+UDP #2.

Moreover, a DNS configuration may be added to the Edge platform such that "gmaserver.mec.com" is mapped to IP #1 and IP #2 over the two delivery connections, respectively.

3. Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services. Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include Multi-access Edge Computing (MEC); Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

Figure 18:
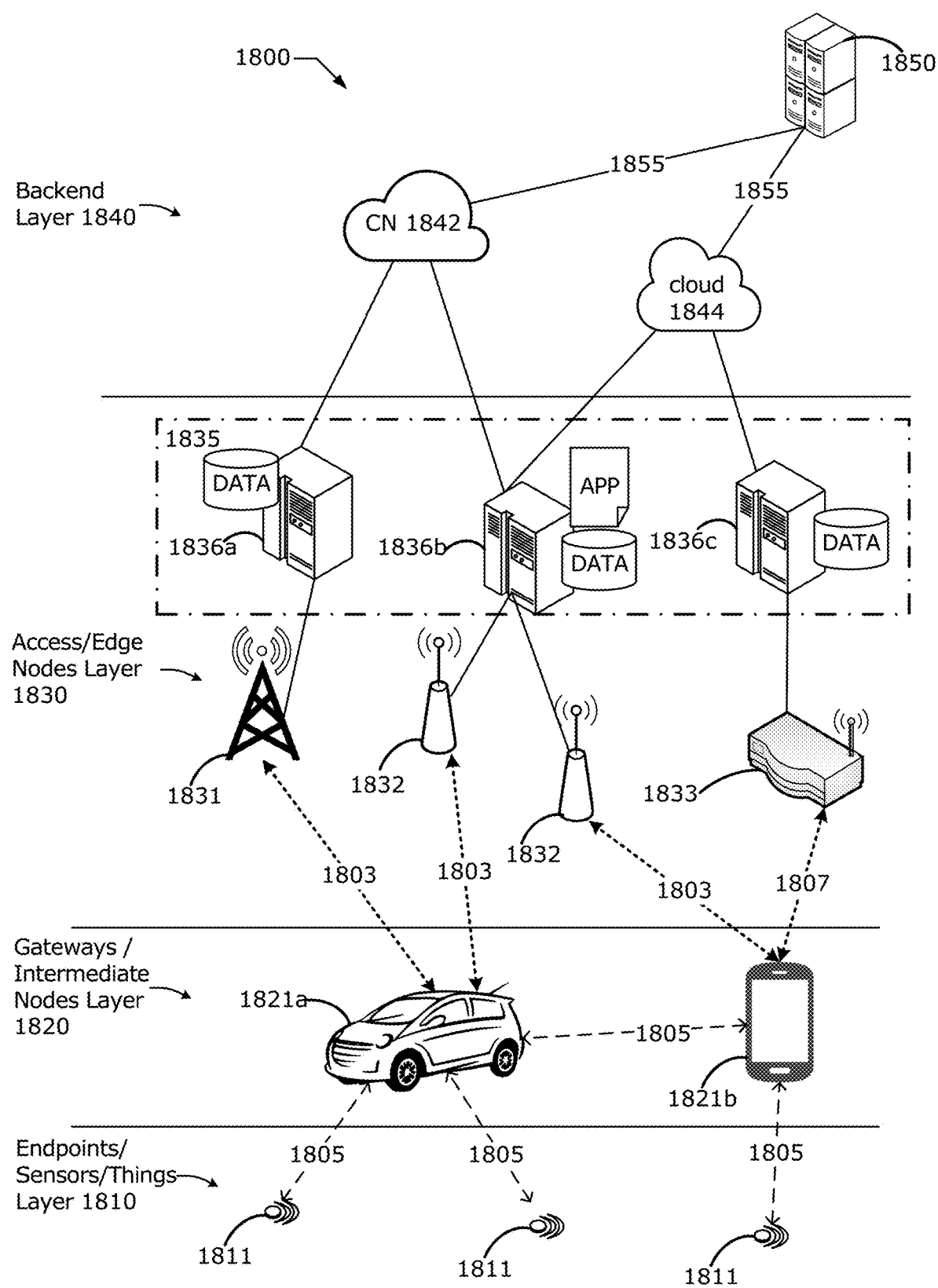
FIG. 18 illustrates an example edge computing environment.

FIG. 18 illustrates an example edge computing environment 1800. FIG. 18 specifically illustrates the different layers of communication occurring within the environment 1800, starting from endpoint sensors or things layer 1810 (e.g., operating in an Internet of Things (IoT) network topology) comprising one or more IoT devices 1811 (also referred to as edge endpoints 1810 or the like); increasing in sophistication to gateways or intermediate node layer 1820 comprising one or more user equipment (UEs) 1821a and 1821b (also referred to as intermediate nodes 1820 or the like), which facilitate the collection and processing of data from endpoints 1810; increasing in processing and connectivity sophistication to access node layer 1830 (or "edge node layer 1830") comprising a plurality of network access nodes (NANs) 1831, 1832, and 1833 (collectively referred to as "NANs 1831-1833" or the like) and a plurality of edge compute nodes 1836*a-c* (collectively referred to as "edge compute nodes 1836" or the like) within an edge computing system 1835; and increasing in connectivity and processing sophistication to a backend layer 1810 comprising core network (CN) 1842 and cloud 1844. The processing at the backend layer 1810 may be enhanced by network services as performed by one or more remote application (app) servers 1850 and/or other cloud services. Some or all of these elements may be equipped with or otherwise implement some or all features and/or functionality discussed herein.

The environment 1800 is shown to include end-user devices, such as intermediate nodes 1820 and endpoints 1810, which are configured to connect to (or communicatively couple with) one or more multiple communication networks (also referred to as "access networks," "radio access networks," or the like) based on different access technologies (or "radio access technologies") for accessing application services. These access networks may include one or more of NANs 1831, 1832, and/or 1833. The NANs 1831-1833 are arranged to provide network connectivity to the end-user devices via respective links 1803, 1807 between the individual NANs and the one or more UEs 1811, 1821.

As examples, the communication networks and/or access technologies may include cellular technology such as LTE, MuLTEfire, and/or NR/5G (e.g., as provided by Radio Access Network (RAN) node 1831 and/or RAN nodes 1832), WiFi or wireless local area network (WLAN) technologies (e.g., as provided by access point (AP) 1833 and/or RAN nodes 1832), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.). In some implementations, some or all of the NANs 1831-1833 may implement the same RAT (or sub-RAT) and/or otherwise be the same to provide redundancy. Additionally or alternatively, the number and types of NANs 1831-1833 and the RATs that they implement is scalable and may be dependent on use case, service level agreement, and/or other aspects.

The intermediate nodes 1820 include UE 1821*a* and UE 1821*b* (collectively referred to as "UE 1821" or "UEs 1821"). In this example, the UE 1821*a* is illustrated as a vehicle UE, and UE 1821*b* is illustrated as a smartphone (e.g., handheld touchscreen mobile computing device connectable to one or more cellular networks). However, these UEs 1821 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 1810 include UEs 1811, which may be IoT devices (also referred to as "IoT devices 1811"), which are uniquely identifiable embedded computing devices (e.g., within the Internet infrastructure) that comprise a network access layer designed for low-power IoT applications utilizing short-lived UE connections. The IoT devices 1811 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 1811 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1811 can utilize technologies such as M2M or MTC for exchanging data with an MTC server (e.g., a server 1850), an edge server 1836 and/or edge computing system 1835, or device via a PLMN, ProSe or D2D communication, sensor networks, or IoT networks. The M2M or MTC exchange of data may be a machine-initiated exchange of data.

The IoT devices 1811 may execute background applications (e.g., keep-alive messages, status updates, etc.) to facilitate the connections of the IoT network. Where the IoT devices 1811 are, or are embedded in, sensor devices, the IoT network may be a WSN. An IoT network describes an interconnecting IoT UEs, such as the IoT devices 1811 being connected to one another over respective direct links 1805. The IoT devices may include any number of different types of devices, grouped in various combinations (referred to as an "IoT group") that may include IoT devices that provide one or more services for a particular user, customer, organizations, etc. A service provider (e.g., an owner/operator of server 1850, CN 1842, and/or cloud 1844) may deploy the IoT devices in the IoT group to a particular area (e.g., a geolocation, building, etc.) in order to provide the one or more services. In some implementations, the IoT network may be a mesh network of IoT devices 1811, which may be termed a fog device, fog system, or fog, operating at the edge of the cloud 1844. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1844 to Things (e.g., IoT devices 1811). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 1830) and/or a central cloud computing service (e.g., cloud 1844) for performing heavy computations or computationally burdensome tasks. On the other hand, edge cloud computing consolidates human-operated, voluntary resources, as a cloud. These voluntary resource may include, inter-alia, intermediate nodes 1820 and/or endpoints 1810, desktop PCs, tablets, smartphones, nano data centers, and the like. In various implementations, resources in the edge cloud may be in one to two-hop proximity to the IoT devices 1811, which may result in reducing overhead related to processing data and may reduce network delay.

Additionally or alternatively, the fog may be a consolidation of IoT devices 1811 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 1844. The fog operating at the edge of the cloud 1844 may overlap or be subsumed into an edge network 1830 of the cloud 1844. The edge network of the cloud 1844 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1836 or edge devices). The Fog layer resides on top of the edge layer and is a consolidation of networking devices such as the intermediate nodes 1820 and/or endpoints 1810 of FIG. 18.

Data may be captured, stored/recorded, and communicated among the IoT devices 1811 or, for example, among the intermediate nodes 1820 and/or endpoints 1810 that have direct links 1805 with one another as shown by FIG. 18. Analysis of the traffic flow and control schemes may be implemented by aggregators that are in communication with the IoT devices 1811 and each other through a mesh network. The aggregators may be a type of IoT device 1811 and/or network appliance. In the example of FIG. 18, the aggregators may be edge nodes 1830, or one or more designated intermediate nodes 1820 and/or endpoints 1810. Data may be uploaded to the cloud 1844 via the aggregator, and commands can be received from the cloud 1844 through gateway devices that are in communication with the IoT devices 1811 and the aggregators through the mesh network. Unlike the traditional cloud computing model, in some implementations, the cloud 1844 may have little or no computational capabilities and only serves as a repository for archiving data recorded and processed by the fog. In these implementations, the cloud 1844 centralized data storage system and provides reliability and access to data by the computing resources in the fog and/or edge devices. Being at the core of the architecture, the Data Store of the cloud 1844 is accessible by both Edge and Fog layers of the aforementioned edge-fog network.

As mentioned previously, the access networks provide network connectivity to the end-user devices 1820, 1810 via respective NANs 1831-1833. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 1831, 1832. This virtualized framework allows the freed-up processor cores of the NANs 1831, 1832 to perform other virtualized applications, such as virtualized applications for various elements discussed herein.

The UEs 1821, 1811 may utilize respective connections (or channels) 1803, each of which comprises a physical communications interface or layer. The connections 1803 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 1811, 1821 and the NANs 1831-1833 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1811, 1821 and NANs 1831-1833 may operate using LAA, enhanced LAA (eLAA), and/or further eLAA (feLAA) mechanisms. The UEs 1821, 1811 may further directly exchange communication data via respective direct links 1805, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual UEs 1821, 1811 provide radio information to one or more NANs 1831-1833 and/or one or more edge compute nodes 1836 (e.g., edge servers/hosts, etc.). The radio information may be in the form of one or more measurement reports, and/or may include, for example, signal strength measurements, signal quality measurements, and/or the like. Each measurement report is tagged with a timestamp and the location of the measurement (e.g., the UEs 1821, 1811 current location). As examples, the measurements collected by the UEs 1821, 1811 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio ($E_b/N_0$), energy per chip to interference power density ratio ($E_c/I_0$), energy per chip to noise power density ratio ($E_c/N_0$), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the $i^{th}$ GNSS satellite signal), GNSS carrier phase measurements (e.g., the number of carrier-phase cycles (integer and fractional parts) of the $i^{th}$ GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v16.2.0 (2021 Mar. 31) ("[TS36214]"), 3GPP TS 38.215 v16.4.0 (2021 Jan. 8) ("[TS38215]"), 3GPP TS 38.314 v16.4.0 (2021 Sep. 30) ("[TS38314]"), IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021 Feb. 26) ("[IEEE80211]"), and/or the like. Additionally or alternatively, any of the aforementioned measurements (or combination of measurements) may be collected by one or more NANs 1831-1833 and provided to the edge compute node(s) 1836.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, etc.); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, etc.); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, etc.); measurements related to Registration Management (RM); measurements related to Session Management (SM) (e.g., number of PDU sessions requested to setup; number of PDU sessions successfully setup; number of PDU sessions failed to setup, etc.); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, etc.); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 1811, 1821, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, etc.); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements such as those discussed in 3GPP TS 28.552 v17.3.1 (2021 Jun. 24) ("[TS28552]"), 3GPP TS 32.425 v17.1.0 (2021 Jun. 24) ("[TS32425]"), and/or the like.

The radio information may be reported in response to a trigger event and/or on a periodic basis. Additionally or alternatively, individual UEs 1821, 1811 report radio information either at a low periodicity or a high periodicity depending on a data transfer that is to take place, and/or other information about the data transfer. Additionally or alternatively, the edge compute node(s) 1836 may request the measurements from the NANs 1831-1833 at low or high periodicity, or the NANs 1831-1833 may provide the measurements to the edge compute node(s) 1836 at low or high periodicity. Additionally or alternatively, the edge compute node(s) 1836 may obtain other relevant data from other edge compute node(s) 1836, core network functions (NFs), application functions (AFs), and/or other UEs 1811, 1821 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, etc.) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, etc.), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a hardware (HW) configuration/implementation or non-HW-specific, or may be based on various software parameters (e.g., OS type and version, etc.). Various configurations may be used to define any of the aforementioned data collection parameters. Such configurations may be defined by suitable specifications/standards, such as 3GPP, ETSI, O-RAN, Intel® Smart Edge Open (formerly OpenNESS), and/or any other like standards such as those discussed herein.

The UE 1821b is shown to be configured to access an access point (AP) 1833 via a connection 1807. In this example, the AP 1833 is shown to be connected to the Internet without connecting to the CN 1842 of the wireless system. The connection 1807 can comprise a local wireless connection, such as a connection consistent with any IEEE 802.11 protocol, wherein the AP 1833 would comprise a wireless fidelity (WiFi®) router. Additionally or alternatively, the UEs 1821 and IoT devices 1811 can be configured to communicate using suitable communication signals with each other or with any of the AP 1833 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1831 and 1832 that enable the connections 1803 may be referred to as "RAN nodes" or the like. The RAN nodes 1831, 1832 may comprise ground stations (e.g., terrestrial access points) or satellite stations providing coverage within a geographic area (e.g., a cell). The RAN nodes 1831, 1832 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1831 is embodied as a NodeB, evolved NodeB (eNB), or a next generation NodeB (gNB), and the RAN nodes 1832 are embodied as relay nodes, distributed units, or Road Side Unites (RSUs). Any other type of NANs can be used.

Any of the RAN nodes 1831, 1832 can terminate the air interface protocol and can be the first point of contact for the UEs 1821 and IoT devices XE111. Additionally or alternatively, any of the RAN nodes 1831, 1832 can fulfill various logical functions for the RAN including, but not limited to, RAN function(s) (e.g., radio network controller (RNC) functions and/or NG-RAN functions) for radio resource management, admission control, UL and DL dynamic resource allocation, radio bearer management, data packet scheduling, etc. Additionally or alternatively, the UEs 1811, 1821 can be configured to communicate using OFDM communication signals with each other or with any of the NANs 1831, 1832 over a multicarrier communication channel in accordance with various communication techniques, such as, but not limited to, an OFDMA communication technique (e.g., for DL communications) and/or an SC-FDMA communication technique (e.g., for UL and ProSe or sidelink communications), although the scope of the present disclosure is not limited in this respect.

For most cellular communication systems, the RAN function(s) operated by the RAN or individual NANs 1831-1832 organize DL transmissions (e.g., from any of the RAN nodes 1831, 1832 to the UEs 1811, 1821) and UL transmissions (e.g., from the UEs 1811, 1821 to RAN nodes 1831, 1832) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1811, 1821 at each transmission time interval (TTI). A TTI is the duration of a transmission on a radio link 1803, 1805, and is related to the size of the data blocks passed to the radio link layer from higher network layers.

The NANs 1831/1832 may be configured to communicate with one another via respective interfaces or links (not shown), such as an X2 interface for LTE implementations (e.g., when CN 1842 is an Evolved Packet Core (EPC)), an Xn interface for 5G or NR implementations (e.g., when CN 1842 is an Fifth Generation Core (5GC)), or the like. The NANs 1831 and 1832 are also communicatively coupled to CN 1842. Additionally or alternatively, the CN 1842 may be an evolved packet core (EPC) network, a NextGen Packet Core (NPC) network, a 5G core (5GC), or some other type of CN.

The CN 1842 is a network of network elements and/or network functions (NFs) relating to a part of a communications network that is independent of the connection technology used by a terminal or user device. The CN 1842 comprises a plurality of network elements/NFs configured to offer various data and telecommunications services to customers/subscribers (e.g., users of UEs 1821 and IoT devices 1811) who are connected to the CN 1842 via a RAN. The components of the CN 1842 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 1842 may be referred to as a network slice, and a logical instantiation of a portion of the CN 1842 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1842 components/functions.

The CN 1842 is shown to be communicatively coupled to an application server 1850 and a network 1850 via an IP communications interface 1855. the one or more server(s) 1850 comprise one or more physical and/or virtualized systems for providing functionality (or services) to one or more clients (e.g., UEs 1821 and IoT devices 1811) over a network. The server(s) 1850 may include various computer devices with rack computing architecture component(s), tower computing architecture component(s), blade computing architecture component(s), and/or the like. The server(s) 1850 may represent a cluster of servers, a server farm, a cloud computing service, or other grouping or pool of servers, which may be located in one or more datacenters. The server(s) 1850 may also be connected to, or otherwise associated with one or more data storage devices (not shown). Moreover, the server(s) 1850 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1850 offer applications or services that use IP/network resources. As examples, the server(s) 1850 may provide traffic management services, cloud analytics, content streaming services, immersive gaming experiences, social networking and/or microblogging services, and/or other like services. In addition, the various services provided by the server(s) 1850 may include initiating and controlling software and/or firmware updates for applications or individual components implemented by the UEs 1821 and IoT devices 1811. The server(s) 1850 can also be configured to support one or more communication services (e.g., Voice-over-Internet Protocol (VoIP) sessions, PTT sessions, group communication sessions, social networking services, etc.) for the UEs 1821 and IoT devices 1811 via the CN 1842.

The Radio Access Technologies (RATs) employed by the NANs 1831-1833, the UEs 1821, 1811, and the other elements in FIG. 18 may include, for example, any of the communication protocols and/or RATs discussed herein. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.). These RATs may include one or more V2X RATs, which allow these elements to communicate directly with one another, with infrastructure equipment (e.g., NANs 1831-1833), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, IEEE 1609.0-2019, "IEEE Guide for Wireless Access in Vehicular Environments (WAVE) Architecture" (2019 Apr. 10) ("[IEEE16090]"), SAE Int'l, "V2X Communications Message Set Dictionary" (formerly "Dedicated Short Range Communication (DSRC) Message Set Dictionary") (2020 Jul. 23) ("[J2735_202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018 Mar. 2) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020 January) (hereinafter "[EN302663]") and describes the access layer of the ITS-S reference architecture. The ITS-G5 access layer comprises [IEEE80211] (which now incorporates IEEE 802.11p) and IEEE 802.2 Logical Link Control (LLC) ("[IEEE8022]") and/or IEEE/ISO/IEC 8802-2-1998 protocols, as well as features for Decentralized Congestion Control (DCC) methods discussed in ETSI TS 102 687 V1.2.1 (2018 April) ("[TS102687]"). The access layer for 3GPP LTE-V2X based interface(s) is outlined in, inter alia, ETSI EN 303 613 V1.1.1 (2020 January), 3GPP TS 23.285 v16.2.0 (2019 December); and 3GPP 5G/NR-V2X is outlined in, inter alia, 3GPP TR 23.786 v16.1.0 (2019 June) and 3GPP TS 23.287 v16.2.0 (2020 March).

The cloud 1844 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1844 include application capabilities type, infrastructure capabilities type, and platform capabilities type. A cloud capabilities type is a classification of the functionality provided by a cloud service to a cloud service customer (e.g., a user of cloud 1844), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1844 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 1844 may represent one or more cloud servers, application servers, web servers, and/or some other remote infrastructure. The remote/cloud servers may include any one of a number of services and capabilities such as, for example, any of those discussed herein.

Additionally or alternatively, the cloud 1844 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 1844 may be a network that comprises computers, network connections among the computers, and software routines to enable communication between the computers over network connections. In this regard, the cloud 1844 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1844 may be via a wired or a wireless connection using the various communication protocols discussed infra. More than one network may be involved in a communication session between the illustrated devices. Connection to the cloud 1844 may require that the computers execute software routines which enable, for example, the seven layers of the OSI model of computer networking or equivalent in a wireless (cellular) phone network. Cloud 1844 may be used to enable relatively long-range communication such as, for example, between the one or more server(s) 1850 and one or more UEs 1821 and IoT devices 1811. Additionally or alternatively, the cloud 1844 may represent the Internet, one or more cellular networks, local area networks, or wide area networks including proprietary and/or enterprise networks, TCP/Internet Protocol (IP)-based network, or combinations thereof. In these implementations, the cloud 1844 may be associated with network operator who owns or controls equipment and other elements necessary to provide network-related services, such as one or more base stations or access points, one or more servers for routing digital data or telephone calls (e.g., a core network or backbone network), etc. The backbone links 1855 may include any number of wired or wireless technologies, and may be part of a LAN, a WAN, or the Internet. In one example, the backbone links 1855 are fiber backbone links that couple lower levels of service providers to the Internet, such as the CN 1812 and cloud 1844.

The edge compute nodes 1836 may include or be part of an edge system 1835 (or edge network 1835). The edge compute nodes 1836 may also be referred to as "edge hosts 1836" or "edge servers 1836." The edge system 1835 includes a collection of edge servers 1836 and edge management systems (not shown by FIG. 18) necessary to run edge computing applications within an operator network or a subset of an operator network. The edge servers 1836 are physical computer systems that may include an edge platform and/or virtualization infrastructure, and provide compute, storage, and network resources to edge computing applications. Each of the edge servers 1836 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 1820 and/or endpoints 1810. The VI of the edge servers 1836 provide virtualized environments and virtualized resources for the edge hosts, and the edge computing applications may run as VMs and/or application containers on top of the VI.

In one example implementation, the edge system 1835 may operate according to the MEC framework, as discussed in ETSI GS MEC 003 v2.1.1 (2019 January), ETSI GS MEC 009 V2.1.1 (2019 January), ETSI GS MEC 010-1 v1.1.1 (2017 October), ETSI GS MEC 010-2 v2.1.1 (2019 November), ETSI GS MEC 011 V1.1.1 (2017 July); ETSI GS MEC 012 V2.1.1 (2019 December), ETSI GS MEC 013 v2.1.1 (2019 September); ETSI GS MEC 014 V1.1.1 (2018 February); ETSI GS MEC 015 v2.1.1 (2020 June), ETSI GS MEC 016 V2.2.1 (2020 April), ETSI GS MEC 021 V2.1.1 (2020 January), ETSI GS MEC 028 v2.1.1 (2020 June), ETSI GS MEC 029 v2.1.1 (2019 July), ETSI MEC GS 030 v2.1.1 (2020 April), ETSI GS NFV-MAN 001 v1.1.1 (2014 December), U.S. Provisional App. No. 63/003,834 filed Apr. 1, 2020 ("['834]"), and Int'l App. No. PCT/US2020/066969 filed on Dec. 23, 2020 ("['969]") (collectively referred to herein as "[MEC]"), the contents of each of which are hereby incorporated by reference in their entireties.

In another example implementation, the edge system 1835 operates according to the O-RAN framework. Typically, front-end and back-end device vendors and carriers have worked closely to ensure compatibility. The flip-side of such a working model is that it becomes quite difficult to plug-and-play with other devices and this can hamper innovation. To combat this, and to promote openness and interoperability at every level, several key players interested in the wireless domain (e.g., carriers, device manufacturers, academic institutions, etc.) formed the Open RAN alliance ("O-RAN") in 2018. The O-RAN network architecture is a building block for designing virtualized RAN on programmable hardware with radio access control powered by AI. Various aspects of the O-RAN architecture are described in O-RAN Alliance Working Group (WG) 1, "O-RAN Architecture Description" v04.00 (March 2021), O-RAN Alliance WG1, "O-RAN Operations and Maintenance Interface Specification" v04.00 (November 2020), O-RAN Alliance WG1, "O-RAN Operations and Maintenance Architecture Specification" v04.00 (November 2020), O-RAN Alliance WG1, "Near-Real-time RAN Intelligent Controller, E2 Application Protocol (E2AP)" v01.01 (July 2020), O-RAN Alliance WG2, "O-RAN A1 interface: General Aspects and Principles 2.02" v02.02 (March 2021), O-RAN Alliance WG3, "O-RAN Near-Real-time RAN Intelligent Controller Architecture & E2 General Aspects and Principles" v01.01 (July 2020), O-RAN Near-Real-time RAN Intelligent Controller E2 Service Model 1.0 (February 2020), O-RAN WG3, "Near-Real-time RAN Intelligent Controller E2 Service Model (E2SM) KPM v01.00 (February 2020), O-RAN WG3, "O-RAN Near-Real-time RAN Intelligent Controller E2 Service Model (E2SM), RAN Function Network Interface (NI)" v1.0 (February 2020), E2SM RAN Control (E2SM-RC), O-RAN Alliance WG4, O-RAN Fronthaul Management Plane Specification, version 2.0 (July 2019), O-RAN Alliance WG4, "O-RAN Fronthaul Control, User and Synchronization Plane Specification 6.0" v06.00 (March 2021), O-RAN Alliance WG6, "Cloud Architecture and Deployment Scenarios for O-RAN Virtualized RAN" v02.01 (July 2020), and U.S. application Ser. No. 17/484, 743 filed on 24 Sep. 2021 ("['743]") (collectively referred to as "[O-RAN]"), the contents of each of which are hereby incorporated by reference in their entireties.

In another example implementation, the edge system 1835 operates according to the $3^{rd}$ Generation Partnership Project (3GPP) System Aspects Working Group 6 (SA6) Architecture for enabling Edge Applications (referred to as "3GPP edge computing") as discussed in 3GPP TS 23.558 v17.1.0 (2021 Sep. 24) ("[TS23558]"), 3GPP TS 23.501 v17.2.0 (2021 Sep. 24) ("[TS23501]"), and U.S. application Ser. No. 17/484,719 filed on 24 Sep. 2021 ("['719]") (collectively referred to as "[SA6Edge]"), the contents of each of which is hereby incorporated by reference in their entireties.

In another example implementation, the edge system 1835 operates according to the Intel® Smart Edge Open framework (formerly known as OpenNESS) as discussed in Intel® Smart Edge Open Developer Guide, version 21.09 (30 Sep. 2021), available at: <https://smart-edge-open.github.io/> ("[ISEO]"), the contents of which are hereby incorporated by reference in its entirety.

It should be understood that the aforementioned edge computing frameworks and services deployment examples are only one illustrative example of edge computing systems/networks 1835, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

As shown by FIG. 18, each of the NANs 1831, 1832, and 1833 are co-located with edge compute nodes (or "edge servers") 1836a, 1836b, and 1836c, respectively. These implementations may be small-cell clouds (SCCs) where an edge compute node 1836 is co-located with a small cell (e.g., pico-cell, femto-cell, etc.), or may be mobile micro clouds (MCCs) where an edge compute node 1836 is co-located with a macro-cell (e.g., an eNB, gNB, etc.). The edge compute node 1836 may be deployed in a multitude of arrangements other than as shown by FIG. 18. In a first example, multiple NANs 1831-1833 are co-located or otherwise communicatively coupled with one edge compute node 1836. In a second example, the edge servers 1836 may be co-located or operated by RNCs, which may be the case for legacy network deployments, such as 3G networks. In a third example, the edge servers 1836 may be deployed at cell aggregation sites or at multi-RAT aggregation points that can be located either within an enterprise or used in public coverage areas. In a fourth example, the edge servers 1836 may be deployed at the edge of CN 1842. These implementations may be used in follow-me clouds (FMC), where cloud services running at distributed data centers follow the UEs 1821 as they roam throughout the network.

In any of the implementations discussed herein, the edge servers 1836 provide a distributed computing environment for application and service hosting, and also provide storage and processing resources so that data and/or content can be processed in close proximity to subscribers (e.g., users of UEs 1821, 1811) for faster response times The edge servers 1836 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1836 from the UEs 1811/1821, CN 1842, cloud 1844, and/or server(s) 1850, or vice versa. For example, a device application or client application operating in a UE 1821/1811 may offload application tasks or workloads to one or more edge servers 1836. In another example, an edge server 1836 may offload application tasks or workloads to one or more UE 1821/1811 (e.g., for distributed ML computation or the like).

4. Hardware Components, Configurations, and Arrangements

Figure 19:
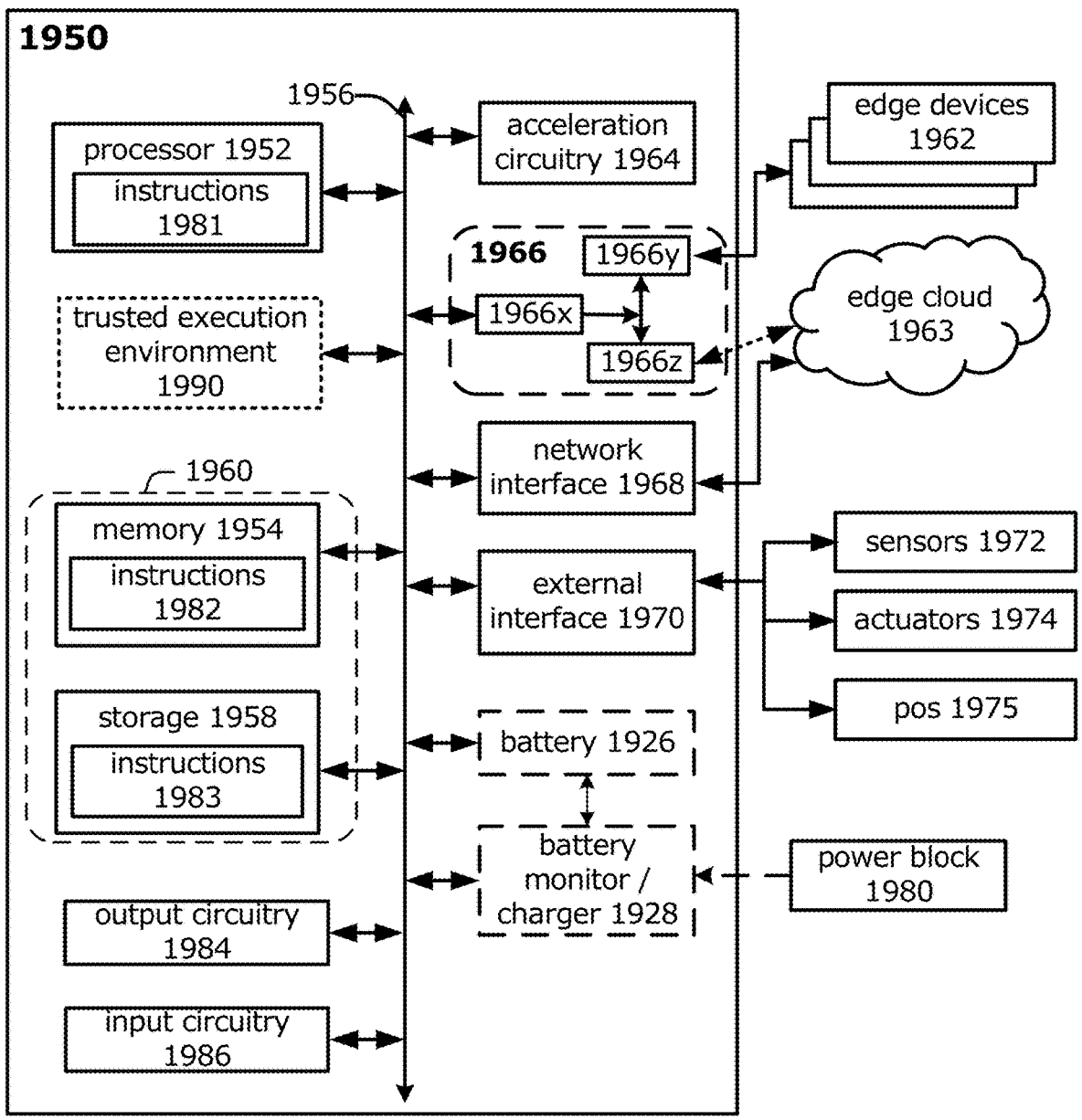
FIG. 19 depicts example components of a compute node, which may be used in edge computing system(s).

FIG. 19 illustrates an example of components that may be present in a computing node 1950 for implementing the techniques (e.g., operations, processes, methods, and methodologies) described herein. The compute node 1950 provides a closer view of the respective components of node 1900 when implemented as or as part of a computing device (e.g., as a mobile device, a base station, server, gateway, etc.). The compute node 1950 may include any combinations of the hardware or logical components referenced herein, and it may include or couple with any device usable with an edge communication network or a combination of such networks. The components may be implemented as integrated circuitry (ICs), a System on Chip (SoC), portions thereof, discrete electronic devices, or other modules, instruction sets, programmable logic or algorithms, hardware, hardware accelerators, software, firmware, or a combination thereof adapted in the compute node 1950, or as components otherwise incorporated within a chassis of a larger system.

In some embodiments, compute node 1950 may correspond to the compute nodes 436, NANs 431, 433, and/or UEs 401 of FIG. 4; client 701, NAN 710A-B, server 740, network functions (NFs) in CN 750A, FA-GW 750B, network elements and/or devices in DN 770 and/or DN 775 of FIG. 7; client 801, access network 831, MAMS system 835, core network 841; GWs 1220A, 1220B, 1250 of FIG. 12; UEs 1811, 1821a, NANs 1831-1833, edge compute node(s) 1836, CN 1842 (or compute node(s) therein), and/or cloud 1844 (or compute node(s) therein) of FIG. 18; software distribution platform 2005 and/or processor platform(s) 2000 of FIG. 20; and/or any other component, device, and/or system discussed herein. The compute node 1950 may be embodied as a type of device, appliance, computer, or other "thing" capable of communicating with other edge, networking, or endpoint components. For example, compute node 1950 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 1950 includes processing circuitry in the form of one or more processors 1952. The processor circuitry 1952 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1952 may include one or more hardware accelerators (e.g., same or similar to acceleration circuitry 1964), which may be microprocessors, programmable processing devices (e.g., FPGA, ASIC, etc.), or the like. The one or more accelerators may include, for example, computer vision and/or deep learning accelerators. In some implementations, the processor circuitry 1952 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor circuitry 1952 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, a special purpose processing unit and/or specialized processing unit, or any other known processing elements, or any suitable combination thereof. In some implementations, the processor circuitry 1952 may be embodied as a specialized x-processing unit (xPU) also known as a data processing unit (DPU), infrastructure processing unit (IPU), or network processing unit (NPU). An xPU may be embodied as a standalone circuit or circuit package, integrated within an SoC, or integrated with networking circuitry (e.g., in a SmartNIC, or enhanced SmartNIC), acceleration circuitry, storage devices, storage disks, and/or AI hardware (e.g., GPUs or programmed FPGAs). The xPU may be designed to receive programming to process one or more data streams and perform specific tasks and actions for the data streams (e.g., hosting microservices, performing service management or orchestration, organizing or managing server or data center hardware, managing service meshes, or collecting and distributing telemetry), outside of a CPU or general purpose processing hardware. However, an xPU, a SoC, a CPU, and other variations of the processor circuitry 1952 may work in coordination with each other to execute many types of operations and instructions within and on behalf of the compute node 1950.

The processors (or cores) 1952 may be coupled with or may include memory/storage and may be configured to execute instructions stored in the memory/storage to enable various applications or operating systems to run on the platform 1950. The processors (or cores) 1952 is configured to operate application software to provide a specific service to a user of the platform 1950. Additionally or alternatively, the processor(s) 1952 may be a special-purpose processor(s)/controller(s) configured (or configurable) to operate according to the elements, features, and implementations discussed herein.

As examples, the processor(s) 1952 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1952 may be a part of a system on a chip (SoC), System-in-Package (SiP), a multi-chip package (MCP), and/or the like, in which the processor(s) 1952 and other components are formed into a single integrated circuit, or a single package, such as the Edison™ or Galileo™ SoC boards from Intel® Corporation. Other examples of the processor(s) 1952 are mentioned elsewhere in the present disclosure.

The processor(s) 1952 may communicate with system memory 1954 over an interconnect (IX) 1956. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1958 may also couple to the processor 1952 via the IX 1956. In an example, the storage 1958 may be implemented via a solid-state disk drive (SSDD) and/or high-speed electrically erasable memory (commonly referred to as "flash memory"). Other devices that may be used for the storage 1958 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1954 and/or storage circuitry 1958 may also incorporate three-dimensional (3D) cross-point (XPOINT) memories from Intel® and Micron®.

In low power implementations, the storage 1958 may be on-die memory or registers associated with the processor 1952. However, in some examples, the storage 1958 may be implemented using a micro hard disk drive (HDD). Further, any number of new technologies may be used for the storage 1958 in addition to, or instead of, the technologies described, such resistance change memories, phase change memories, holographic memories, or chemical memories, among others.

The components of edge computing device 1950 may communicate over an interconnect (IX) 1956. The IX 1956 may represent any suitable type of connection or interface such as, for example, metal or metal alloys (e.g., copper, aluminum, etc.), fiber, and/or the like. The IX 1956 may include any number of IX, fabric, and/or interface technologies, including instruction set architecture (ISA), extended ISA (eISA), Inter-Integrated Circuit (I²C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, Hyper-Transport IXs, NVLink provided by NVIDIA®, a Time-Trigger Protocol (TTP) system, a FlexRay system, PROFI-BUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 1956 may be a proprietary bus, for example, used in a SoC based system.

The IX 1956 couples the processor 1952 to communication circuitry 1966 for communications with other devices, such as a remote server (not shown) and/or the connected edge devices 1962. The communication circuitry 1966 is a hardware element, or collection of hardware elements, used to communicate over one or more networks (e.g., cloud 1963) and/or with other devices (e.g., edge devices 1962).

The transceiver 1966 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1962. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1966 (or multiple transceivers) may communicate using multiple standards or radios for communications at a different range. For example, the compute node 1950 may communicate with close devices, e.g., within about 10 meters, using a local transceiver based on BLE, or another low power radio, to save power. More distant connected edge devices 1962, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1966 (e.g., a radio transceiver) may be included to communicate with devices or services in the edge cloud 1963 via local or wide area network protocols. The wireless network transceiver 1966 may be an LPWA transceiver that follows the IEEE 802.15.4, or IEEE 802.15.4g standards, among others. The compute node 1963 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1966, as described herein. For example, the transceiver 1966 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1966 may include radios that are compatible with any number of 3GPP specifications, such as LTE and 5G/NR communication systems, discussed in further detail at the end of the present disclosure. A network interface controller (NIC) 1968 may be included to provide a wired communication to nodes of the edge cloud 1963 or to other devices, such as the connected edge devices 1962 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 1968 may be included to enable connecting to a second network, for example, a first NIC 1968 providing communications to the cloud over Ethernet, and a second NIC 1968 providing communications to other devices over another type of network.

Given the variety of types of applicable communications from the device to another component or network, applicable communications circuitry used by the device may include or be embodied by any one or more of components 1964, 1966, 1968, or 1970. Accordingly, in various examples, applicable means for communicating (e.g., receiving, transmitting, etc.) may be embodied by such communications circuitry.

The compute node 1950 may include or be coupled to acceleration circuitry 1964, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1964 may comprise logic blocks or logic fabric and other interconnected resources that may be programmed (configured) to perform various functions, such as the procedures, methods, functions, etc. discussed herein. In such implementations, the acceleration circuitry 1964 may also include memory cells (e.g., EPROM, EEPROM, flash memory, static memory (e.g., SRAM, anti-fuses, etc.) used to store logic blocks, logic fabric, data, etc. in LUTs and the like.

The IX 1956 also couples the processor 1952 to a sensor hub or external interface 1970 that is used to connect additional devices or subsystems. The additional/external devices may include sensors 1972, actuators 1974, and positioning circuitry 1975.

The sensor circuitry 1972 includes devices, modules, or subsystems whose purpose is to detect events or changes in its environment and send the information (sensor data) about the detected events to some other a device, module, subsystem, etc. Examples of such sensors 1972 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1950); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1974, allow platform 1950 to change its state, position, and/or orientation, or move or control a mechanism or system. The actuators 1974 comprise electrical and/or mechanical devices for moving or controlling a mechanism or system, and converts energy (e.g., electric current or moving air and/or liquid) into some kind of motion. The actuators 1974 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1974 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 1950 may be configured to operate one or more actuators 1974 based on one or more captured events and/or instructions or control signals received from a service provider and/or various client systems.

The positioning circuitry 1975 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1975 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 1975 may include a Micro-Technology for Positioning, Navigation, and Timing (Micro-PNT) IC that uses a master timing clock to perform position tracking/estimation without GNSS assistance. The positioning circuitry 1975 may also be part of, or interact with, the communication circuitry 1966 to communicate with the nodes and components of the positioning network. The positioning circuitry 1975 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1975 is, or includes an INS, which is a system or device that uses sensor circuitry 1972 (e.g., motion sensors such as accelerometers, rotation sensors such as gyroscopes, and altimimeters, magnetic sensors, and/or the like to continuously calculate (e.g., using dead by dead reckoning, triangulation, or the like) a position, orientation, and/or velocity (including direction and speed of movement) of the platform 1950 without the need for external references.

In some optional examples, various input/output (I/O) devices may be present within or connected to, the compute node 1950, which are referred to as input circuitry 1986 and output circuitry 1984 in FIG. 19. The input circuitry 1986 and output circuitry 1984 include one or more user interfaces designed to enable user interaction with the platform 1950 and/or peripheral component interfaces designed to enable peripheral component interaction with the platform 1950. Input circuitry 1986 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1984 may be included to show information or otherwise convey information, such as sensor readings, actuator position(s), or other like information. Data and/or graphics may be displayed on one or more user interface components of the output circuitry 1984. Output circuitry 1984 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1950. The output circuitry 1984 may also include speakers or other audio emitting devices, printer(s), and/or the like. Additionally or alternatively, the sensor circuitry 1972 may be used as the input circuitry 1984 (e.g., an image capture device, motion capture device, or the like) and one or more actuators 1974 may be used as the output device circuitry 1984 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1976 may power the compute node 1950, although, in examples in which the compute node 1950 is mounted in a fixed location, it may have a power supply coupled to an electrical grid, or the battery may be used as a backup or for temporary capabilities. The battery 1976 may be a lithium ion battery, or a metal-air battery, such as a zinc-air battery, an aluminum-air battery, a lithium-air battery, and the like.

A battery monitor/charger 1978 may be included in the compute node 1950 to track the state of charge (SoCh) of the battery 1976, if included. The battery monitor/charger 1978 may be used to monitor other parameters of the battery 1976 to provide failure predictions, such as the state of health (SoH) and the state of function (SoF) of the battery 1976. The battery monitor/charger 1978 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1978 may communicate the information on the battery 1976 to the processor 1952 over the IX 1956. The battery monitor/charger 1978 may also include an analog-to-digital (ADC) converter that enables the processor 1952 to directly monitor the voltage of the battery 1976 or the current flow from the battery 1976. The battery parameters may be used to determine actions that the compute node 1950 may perform, such as transmission frequency, mesh network operation, sensing frequency, and the like.

A power block 1980, or other power supply coupled to a grid, may be coupled with the battery monitor/charger 1978 to charge the battery 1976. In some examples, the power block 1980 may be replaced with a wireless power receiver to obtain the power wirelessly, for example, through a loop antenna in the compute node 1950. A wireless battery charging circuit, such as an LTC4020 chip from Linear Technologies of Milpitas, California, among others, may be included in the battery monitor/charger 1978. The specific charging circuits may be selected based on the size of the battery 1976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1958 may include instructions 1983 in the form of software, firmware, or hardware commands to implement the techniques described herein. Although such instructions 1982, 1983 are shown as code blocks included in the memory 1954 and the storage 1958, any of the code blocks 1982, 1983 may be replaced with hardwired circuits, for example, built into an application specific integrated circuit (ASIC) or programmed into an FPGA, or the like.

In an example, the instructions 1981, 1982, 1983 provided via the memory 1954, the storage 1958, or the processor 1952 may be embodied as a non-transitory machine-readable medium (NTMRM) 1960 including code to direct the processor 1952 to perform electronic operations in the compute node 1950. The processor 1952 may access the NTMRM 1960 over the IX 1956. For instance, the NTMRM 1960 may be embodied by devices described for the storage 1958 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTMRM 1960 may include instructions to direct the processor 1952 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Computer program code for carrying out operations of the present disclosure (e.g., computational logic and/or instructions 1981, 1982, 1983) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 1981, 1982, 1983 for carrying out operations of the present disclosure may also be written in any combination of the programming languages discussed herein. The program code may execute entirely on the system 1950, partly on the system 1950, as a stand-alone software package, partly on the system 1950 and partly on a remote computer or entirely on the remote computer or server. In the latter scenario, the remote computer may be connected to the system 1950 through any type of network, including a LAN or WAN, or the connection may be made to an external computer (e.g., through the Internet using an Internet Service Provider).

In an example, the instructions 1981, 1982, 1983 on the processor circuitry 1952 (separately, or in combination with the instructions 1981, 1982, 1983) may configure execution or operation of a trusted execution environment (TEE) 1990. The TEE 1990 operates as a protected area accessible to the processor circuitry 1902 to enable secure access to data and secure execution of instructions. In some embodiments, the TEE 1990 may be a physical hardware device that is separate from other components of the system 1950 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1990 may be implemented as secure enclaves, which are isolated regions of code and/or data within the processor and/or memory/storage circuitry of the system 1950. Only code executed within a secure enclave may access data within the same secure enclave, and the secure enclave may only be accessible using the secure application (which may be implemented by an application processor or a tamper-resistant microcontroller). Various implementations of the TEE 1990, and an accompanying secure area in the processor circuitry 1952 or the memory circuitry 1954 and/or storage circuitry 1958 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1900 through the TEE 1990 and the processor circuitry 1952. Additionally or alternatively, the memory circuitry 1954 and/or storage circuitry 1958 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1904 and/or storage circuitry 1908 may be divided into one or more trusted memory regions for storing applications or software modules of the TEE 1990.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

FIG. 19 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed herein (e.g., a mobile UE in industrial compute for smart city or smart factory, among many other examples).

The compute node 1950 may be implemented as user/client devices, servers, appliances, network infrastructure, machines, robots, drones, edge devices, Internet of Things (IoT) devices, and/or any other type of computing device such as those discussed herein. For example, the compute node 1950 may be a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, the compute node 1950 is presented in the network for a specific purpose (e.g., a traffic light), but may have processing and/or other capacities that may be utilized for other purposes. Additionally or alternatively, the compute node 1950 may be independent from other networked devices and may be provided with a housing having a form factor suitable for its primary purpose; yet be available for other compute tasks that do not interfere with its primary task. Additionally or alternatively, the appliance computing device may include hardware and software components to manage local issues such as device temperature, vibration, resource utilization, updates, power issues, physical and network security, etc. Additionally or alternatively, the compute node 1950 may be implemented as one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 20:
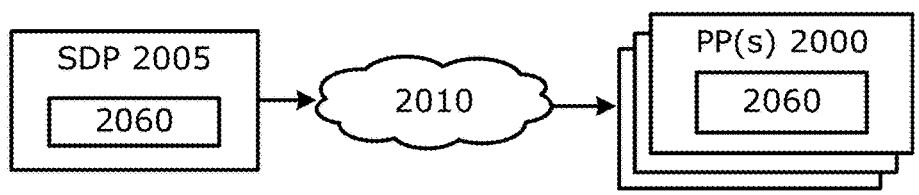
FIG. 20 illustrates an example software distribution platform.

FIG. 20 illustrates an example software (SW) distribution platform (SDP) 2005 to distribute software 2060, such as the example computer readable instructions 1981, 1982, 1983 of FIG. 19, to one or more devices, such as example processor platform(s) (pp) 2000, connected edge devices 1962 (see e.g., FIG. 19), and/or any of the other computing systems/devices discussed herein. The SDP 2005 (or components thereof) may be implemented by any computer server, data facility, cloud service, CDN, edge computing framework, etc., capable of storing and transmitting software (e.g., code, scripts, executable binaries, containers, packages, compressed files, and/or derivatives thereof) to other computing devices (e.g., third parties, the example connected edge devices 1962 of FIG. 19). The SDP 2005 (or components thereof) may be located in a cloud (e.g., data center, etc.), a local area network, an edge network, a wide area network, on the Internet, and/or any other location communicatively coupled with the pp 2000.

The pp 2000 and/or connected edge devices 1962 connected edge devices 1962 may include customers, clients, managing devices (e.g., servers), third parties (e.g., customers of an entity owning and/or operating the SDP 2005), IoT devices, and the like. The pp 2000/connected edge devices 1962 may operate in commercial and/or home automation environments. In some examples, a third party is a developer, a seller, and/or a licensor of software such as the example computer readable media 1981, 1982, 1983 of FIG. 19. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.). In some examples, the pp 2000/connected edge devices 1962 can be physically located in different geographic locations, legal jurisdictions, etc.

In FIG. 20, the SDP 2005 includes one or more servers (referred to as "servers 2005") and one or more storage devices (referred to as "storage 2005"). The storage 2005 store the computer readable instructions 2060, which may correspond to the instructions 1981, 1982, 1983 of FIG. 19. The servers 2005 are in communication with a network 2010, which may correspond to any one or more of the Internet and/or any of the example networks as described herein. The servers 2005 are responsive to requests to transmit the software to a requesting party as part of a commercial transaction. Payment for the delivery, sale and/or license of the software may be handled by the servers 2005 and/or via a third-party payment entity. The servers 2005 enable purchasers and/or licensors to download the computer readable instructions 2060 from the SDP 2005.

The servers 2005 are communicatively connected to one or more security domains and/or security devices through which requests and transmissions of the example computer readable instructions 2060 must pass. Additionally or alternatively, the servers 2005 periodically offer, transmit, and/or force updates to the software 2060 to ensure improvements, patches, updates, etc. are distributed and applied to the software at the end user devices. The computer readable instructions 2060 are stored on storage 2005 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.), and/or any other format such as those discussed herein. In some examples, the computer readable instructions 2060 stored in the SDP 2005 are in a first format when transmitted to the pp 2000. Additionally or alternatively, the first format is an executable binary in which particular types of the pp 2000 can execute. Additionally or alternatively, the first format is uncompiled code that requires one or more preparation tasks to transform the first format to a second format to enable execution on the pp 2000. For example, the receiving pp 2000 may need to compile the computer readable instructions 2060 in the first format to generate executable code in a second format that is capable of being executed on the pp 2000. Additionally or alternatively, the first format is interpreted code that, upon reaching the pp 2000, is interpreted by an interpreter to facilitate execution of instructions. Additionally or alternatively, different components of the computer readable instructions 1982 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

5. Example Implementations

Figure 21A:
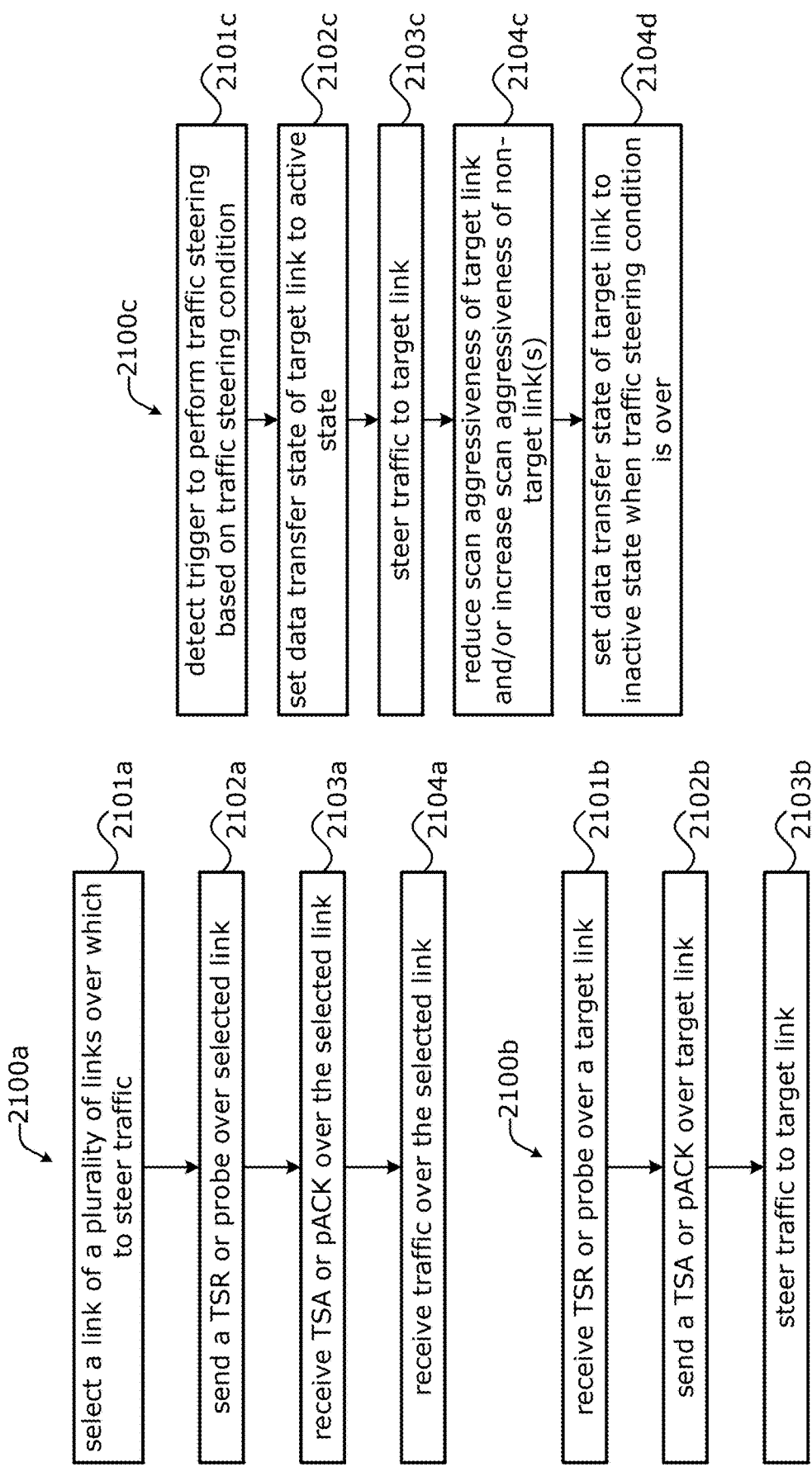
FIGS. 21A and 21B (collectively referred to as FIG. 21) depict various processes for practicing the various embodiments discussed herein.
Figure 21B:
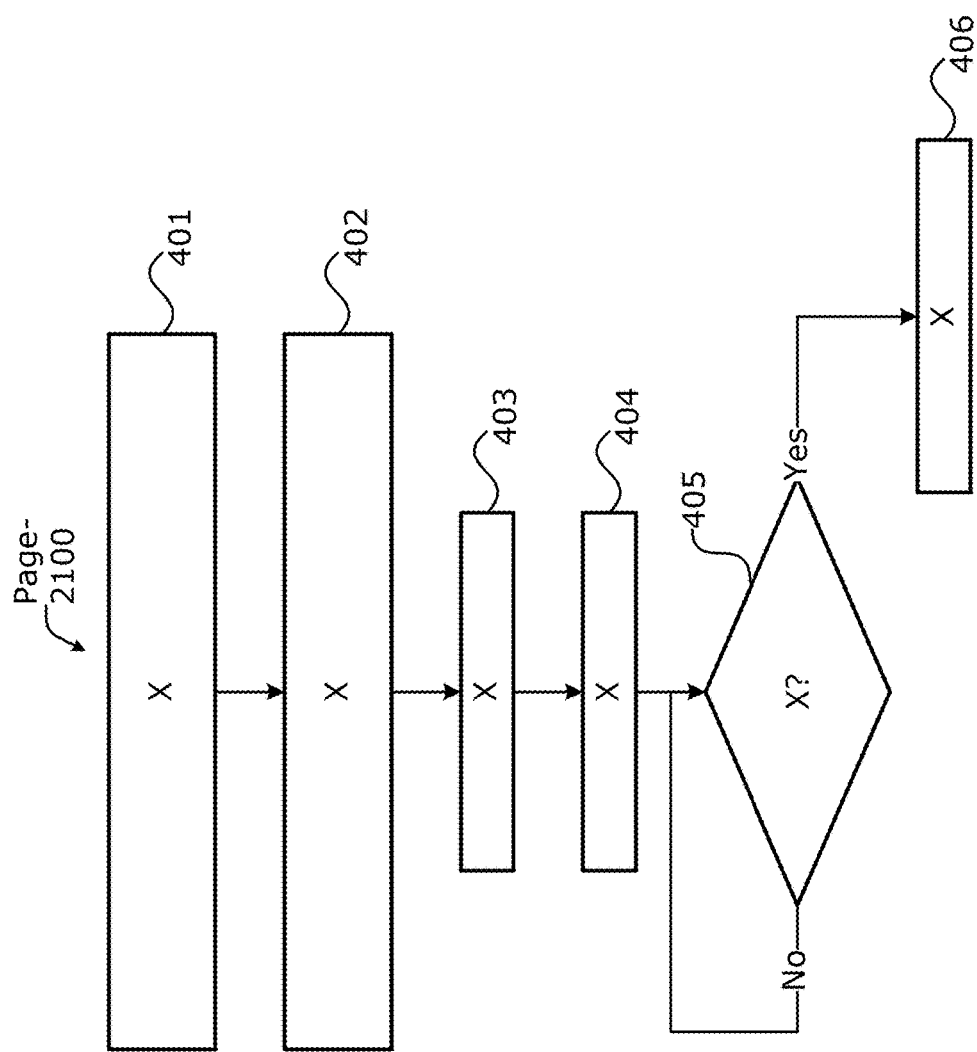

FIG. 21 shows example traffic steering processes 2100a, 2100b, and 2100c for practicing various embodiments herein. Process 2100a is a method for traffic steering among a plurality of links in a multi-access (MX) communication environment. Process 2100a begins at operation 2101a where a first MX compute node selects a link of the plurality of links over which to steer traffic. At operation 2102a, the first MX compute node sends a traffic steering message (TSM) or a probe message to a second MX compute node over the selected link. At operation 2103a, the first MX compute node receives a traffic steering acknowledgement (TSA) or a probe acknowledgement (pACK) from the second MX compute node over the selected. At operation 2104a, the first MX compute node receives traffic from the second MX compute node over the selected link.

Process 2100b is another method for traffic steering among a plurality of links in a multi-access (MX) communication environment. Process 2100b begins at operation 2101b where a first MX compute node receives a TSM or probe from the second MX compute node over a target link of the plurality of links. At operation 2102b, the first MX compute node sends a TSA or pACK to the second MX compute node over the second link. At operation 2103b, the first MX compute node steers traffic to be sent to the second MX compute node over the second link and from being sent to the second MX compute node over the first link.

Process 2100c is a method for performing cross-layer and/or cross-link traffic steering and/or handovers. Process 2100c begins at operation 2101c where an MX compute node detects a trigger to perform traffic steering to steer traffic from a first link to be sent over a second link based on a traffic steering condition. At operation 2102c, the MX compute node sets a data transfer state of a target link to an active state. At operation 2103c, the MX compute node steers traffic to the target link. At operation 2104c, the MX compute node reduces a scanning aggressiveness of the target link and/or increases a scanning aggressiveness of one or more non-target links (e.g., the second link). At operation 2105c, the MX compute node sets the data transfer state of the target link to an inactive state when the traffic steering condition is over or the traffic steering is completed.

Additional examples of the presently described systems, devices, and methods include the following, non-limiting example implementations. Each of the following non-limiting examples may stand on its own or may be combined in any permutation or combination with any one or more of the other examples provided below or throughout the present disclosure.

Example A01 includes a method for performing traffic steering in a multi-access (MX) communication environment, the method comprising initiating establishment, by the first MX compute node, of a set of logical links with a second MX compute node, wherein each logical link of the set of logical links includes a respective set of physical links; selecting, by the first MX compute node, a physical link of the set of physical links belonging to the selected logical link over which to steer the traffic; selecting, by the first MX compute node, a physical link of a set of physical links belonging to the selected logical link; sending, by the first MX compute node, a traffic steering message (TSM) to a second MX compute node over the selected physical link; receiving, by the first MX compute node, a traffic steering acknowledgement (TSA) from the second MX compute node over the selected physical link; and receiving, by the first MX compute node, traffic from the second MX compute node over the selected logical link.

Example A02 includes the method of example A01, wherein the selected link is a first physical link, the TSM is a first TSM, the TSA is a first TSA, and the method further comprises: receiving, by the first MX compute node, a second TSM from the second MX compute node over a second physical link of the set of physical links; sending, by the first MX compute node, a second TSA to the second MX compute node over the second physical link; and steering, by the first MX compute node, traffic to be sent to the second MX compute node over the second physical link and from being sent to the second MX compute node over the first physical link.

Example A03 includes the method of example A02, further comprising: steering, by the first MX compute node, traffic to be sent over the second physical link instead of being sent over the first physical link and one or more other links of the set of physical links.

Example A04 includes the method of example A01, further comprising: steering, by the first MX compute node, traffic to be sent over the selected link instead of being sent over one or more other links of the set of physical links.

Example A05 includes the method of examples A03-A04, further comprising: receiving, by the first MX compute node, traffic from the second MX compute node over the selected link regardless of a link over which traffic is sent by the first MX compute node to second MX compute node.

Example A06 includes the method of examples A04-A05, wherein the selected link is a first physical link, the TSM is a first TSM, the TSA is a first TSA, and the method further comprises: steering, by the first MX compute node without sending a second TSM to the second MX compute node, traffic to be sent over a second physical link of the set of physical links instead of being sent over the first physical link or one or more other links of the set of physical links.

Example A07 includes the method of example A02-A06, further comprising: detecting, by the first MX compute node, link quality degradation of the first physical link; selecting, by the first MX compute node, a third link of the set of physical links over which to steer traffic based on the detected link quality degradation; sending, by the first MX compute node, a third TSM to the second MX compute node over the third link; receiving, by the first MX compute node, a third TSA from the second MX compute node over the third link; and receiving, by the first MX compute node, data traffic from the second MX compute node over the third link.

Example A08 includes the method of example A01-A07, further comprising: periodically sending, by the first MX compute node, a probe message over non-active links of the set of physical links to maintain the non-active links.

Example A09 includes the method of example A01-A08, further comprising: retransmitting, by the first MX compute node, the TSM to the second MX compute node when the TSA is not received before a TSM timeout (TO) timer expires.

Example A10 includes the method of examples A01-A09, wherein the first physical link a link of a first radio access technology (RAT) and the second physical link is a link of a second RAT, wherein the second RAT is different than the first RAT.

Example A11 includes the method of example A01, further comprising: sending, by the first MX compute node, a probe message to the second MX compute node over the selected link; receiving, by the first MX compute node, a probe acknowledgement (pACK) from the second MX compute node over the selected link; receiving, by the first MX compute node, data traffic from the second MX compute node over the selected link based on the probe message; and steering, by the first MX compute node, traffic to be sent to the second MX compute node over the selected link and from being sent to the second MX compute node over the one or more other links of the set of physical links.

Example A12 includes the method of example A11, wherein the selected is a first physical link, the probe message is a first probe message, the pACK is a first pACK, and the method further comprises: receiving, by the first MX compute node, a second probe message from the second MX compute node over a second physical link of the set of physical links; sending, by the first MX compute node, a second pACK to the second MX compute node over the second physical link; and steering, by the first MX compute node, traffic to be sent to the second MX compute node over the second physical link and from being sent to the second MX compute node over the first physical link or one or more other links.

Example A13 includes the method of example A12, further comprising: updating, by the first MX compute node, connection information associated with the second MX compute node based on the second probe message.

Example A14 includes the method of example A13, wherein updating the connection information comprises: updating, by the first MX compute node, a destination network address for outgoing packets based on a source network address in the second probe message; and updating, by the first MX compute node, a destination port number for outgoing packets based on a source port number in the second probe message.

Example A15 includes the method of examples A12-A14, further comprising: receiving, by the first MX compute node, a test probe message over the second physical link before receiving the second probe message over the second physical link; sending, by the first MX compute node, a test probe acknowledgement (tACK) to indicate that a data plane configuration for the second physical link has been successfully setup.

Example A16 includes the method of examples A11-A15, further comprising: sending, by the first MX compute node, a test probe message over the selected link before sending the probe message over the selected link, wherein the test probe message is configured to test whether a data plane configuration for the selected link has been successfully setup.

Example A17 includes the method of example A16, wherein the probe message includes a test probe indicator field, wherein a first value in the test probe indicator field indicates that the probe message is the test probe message, and a second value in the test probe indicator field indicates that the probe message is not the test probe message.

Example A18 includes the method of examples A11-A17, wherein the first physical link and the second physical link are links of a same radio access technology (RAT).

Example A19 includes the method of examples A01-A18, further comprising: selecting the selected link among the set of physical links based on one or more quality of service (QoS) measurements of individual links of the set of physical links.

Example A20 includes the method of examples A01-A19, wherein each logical link of the set of logical links has a connection identifier (ID), and each physical link of the respective set of physical links have same connection ID as a corresponding one of the set of logical links.

Example A21 includes the method of examples A01-A20, wherein at least one logical link of the set of logical links operates according to a radio access technology (RAT) different than RATs of other logical links of the plurality of links.

Example A22 includes the method of examples A01-A21, wherein at least one physical link of at least one set physical links belonging to at least one logical link of the set of logical links belongs to a RAT different a RAT of other physical links in the at least one set physical links.

Example B01 includes the method of examples A02-A22, further comprising: detecting, by the first MX compute node, a trigger to perform traffic steering to steer traffic from the first physical link to be sent over the second physical link; setting, by the first MX compute node, a first data transfer state of the first physical link to an active state based on the detected trigger; steering, by the first MX compute node, traffic to be sent over the second physical link instead of being sent over the first physical link; and setting, by the first MX compute node, the first data transfer state to an inactive state when the traffic steering is complete.

Example B02 includes the method of example B01, wherein the first physical link is maintained by a first transceiver of the first MX compute node and the second physical link is maintained by a second transceiver of the first MX compute.

Example B03 includes the method of example B02, wherein detecting the trigger comprises: receiving a cross-layer signal from the first transceiver indicating that a traffic steering condition has been triggered.

Example B04 includes the method of example B03, wherein the traffic steering condition is a handover from the first physical link to the second physical link.

Example B05 includes the method of example B04, further comprising: determining that the traffic steering is complete based on receipt of another cross-layer signal from the first transceiver indicating completion or termination of the handover.

Example B06 includes the method of example B03, wherein the traffic steering condition is link quality degradation of the first physical link in comparison to a link quality of the second physical link.

Example B07 includes the method of example B06, further comprising: setting, by the first MX compute node, a second data transfer state of the second physical link to an inactive state to cause traffic to be communicated over the second physical link.

Example B08 includes the method of examples B06-B07, further comprising: sending a cross-layer signal to the first transceiver to cause the first transceiver to increase a scanning aggressiveness of the first transceiver to scan for a new link with better link quality than the first physical link.

Example B09 includes the method of example B08, further comprising: sending a cross-layer signal to the second transceiver to cause the second transceiver to decrease a scanning aggressiveness of the second transceiver to avoid interference with the scan performed by the first transceiver.

Example B10 includes the method of examples B01-B09, wherein the first transceiver and the second transceiver implement a same radio access technology (RAT).

Example X01 includes a method comprising: performing traffic steering between connections with different radio access technologies (RATs) using a traffic steering update (TSU) message.

Example X02 includes the method of example X01 and/or some other examples herein, wherein the traffic steering is one-direction or bi-direction.

Example X03 includes a method comprising: performing traffic steering between connections of the same RAT using a Probe message.

Example X04 includes the method of example X03, wherein a one-bit field in the Probe message to indicate Probe update connection info (e.g. source IP and Port number).

Example X05 includes a method comprising: sharing a same Connection ID for multiple connections, so that the convergence layer (e.g., GMA) treats them as a single logical connection to reduce complexity.

Example X06 includes a Probe message including a one-bit field to indicate Probe update connection info (e.g. source IP and Port number).

Example X07 includes a method to exchange information between link layer and convergence layer to support lossless handover.

Example X08 includes the method of example X07 and/or some other example(s) herein wherein the link layer provides the following information to the convergence layer: link quality indicator (e.g., RSSI, latency performance, traffic load, resource utilization level) and handover status.

Example X09 includes the method of examples X07-X08 and/or some other example(s) herein wherein the convergence layer may dynamically configure the handover and scanning operation of a radio link through the "roaming aggressiveness" setting based on its current usage.

Example X10 includes the method of example X09 and/or some other example(s) herein wherein the roaming aggressiveness setting is the Wi-Fi Roaming Aggressiveness Setting discussed in "Wi-Fi Roaming Aggressiveness Setting", Intel.com, Article no. 000005546 (28 Oct. 2021) ("[546]").

Example X11 includes the method of examples X07-X10 and/or some other example(s) herein wherein the convergence layer may dynamically steer data traffic based on the handover state of the individual radio link to avoid data loss due to handover Example X12 includes the method of examples X07-X11 and/or some other example(s) herein wherein the convergence layer is a GMA convergence layer.

Example M01 includes the method of examples A01-X12, wherein the MX communication environment is a Multi-Access Management Services (MAMS) framework.

Example M02 includes the method of example M01, wherein the TSM is a MX Traffic Steering Request message.

Example M03 includes the method of examples M01-M02, wherein the TSA is an MX Traffic Steering Response message.

Example M04 includes the method of example M01, wherein the TSM is an MX probe request message.

Example M05 includes the method of examples M01 and M04, wherein the TSA is an MX probe acknowledgement message.

Example M06 includes the method of example M01, wherein the TSM is a Traffic Splitting Update message (TSU)

Example M07 includes the method of examples M01 and M06, wherein the TSA is a Traffic Splitting acknowledgement message (TSA).

Example M08 includes the method of examples M01-M07, wherein the TSM and the TSA are Generic Multi-Access (GMA) protocol data units (PDUs) including a GMA header or a GMA trailer.

Example M09 includes the method of examples M01-M08, wherein the method is performed by a convergence layer operated by the first MX compute node.

Example M10 includes the method of example M09, wherein the convergence layer is a multi-access (MX) convergence layer part of a MAMS protocol stack or a Generic Multi-Access (GMA) convergence layer part of a GMA protocol stack.

Example M11 includes the method of example M10, wherein the MX convergence layer implements an MX convergence method, wherein the MX convergence method includes one of GMA, MultiPath Transmission Control Protocol (MPTCP) Proxy, Generic Routing Encapsulation (GRE) Aggregation Proxy, or MultiPath QUIC (MPQUIC).

Example M12 includes the method of examples M10-M11, wherein the MX convergence layer implements a GMA entity when the MX convergence method is the GMA convergence method.

Example M13 includes the method of example M12, wherein the first MX compute node is a client device, the GMA entity of the first MX compute node is a GMA client (Gc) entity, and the client device further comprises a Client Connection Manager (CCM) communicatively coupled with the Gc entity.

Example M14 includes the method of example M13, wherein the second MX compute node is a server or another client device.

Example M15 includes the method of example M12, wherein the first MX compute node is a server, the GMA entity is a GMA server (Gs) entity, and the server further comprises a Network Connection Manager (NCM) communicatively coupled with the Gc entity.

Example M16 includes the method of example M13, wherein the second MX compute node is a client device or another server.

Example M17 includes the method of examples M13-M16, wherein the client device is a desktop computer, a workstation, a smartphone, a tablet computer, a wearable device, an Internet of Things (IoT) device, or a smart appliance.

Example M18 includes the method of examples M13-M17, wherein the server is a gateway device, a radio access network node, a network appliance, a network function within a core network, an application server, an edge server of an edge computing network, or a server of a cloud computing service.

Example Z01 includes one or more computer readable media comprising instructions, wherein execution of the instructions by processor circuitry is to cause the processor circuitry to perform the method of examples A01-M18.

Example Z02 includes a computer program comprising the instructions of example Z01.

Example Z03 includes an Application Programming Interface defining functions, methods, variables, data structures, and/or protocols for the computer program of example Z01.

Example Z04 includes an apparatus comprising circuitry loaded with the instructions of example Z01.

Example Z05 includes an apparatus comprising circuitry operable to run the instructions of example Z01.

Example Z06 includes an integrated circuit comprising one or more of the processor circuitry of example Z01 and the one or more computer readable media of example Z01.

Example Z07 includes a computing system comprising the one or more computer readable media and the processor circuitry of example Z01.

Example Z08 includes an apparatus comprising means for executing the instructions of example Z01.

Example Z09 includes a signal generated as a result of executing the instructions of example Z01.

Example Z10 includes a data unit generated as a result of executing the instructions of example Z01.

Example Z11 includes the data unit of example Z10, wherein the data unit is a datagram, network packet, data frame, data segment, a PDU, a service data unit (SDU), a message, or a database object.

Example Z12 includes a signal encoded with the data unit of examples Z09-Z10.

Example Z13 includes an electromagnetic signal carrying the instructions of example Z01.

Example Z14 includes an apparatus comprising means for performing the method of examples A01-M18.

6. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive the stream of packets (or the following parameters and templates or template values).

The term "receipt" at least in some embodiments refers to any action (or set of actions) involved with receiving or obtaining an object, data, data unit, etc., and/or the fact of the object, data, data unit, etc. being received. The term "receipt" at least in some embodiments refers to an object, data, data unit, etc., being pushed to a device, system, element, etc. (e.g., often referred to as a push model), pulled by a device, system, element, etc. (e.g., often referred to as a pull model), and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof.

The term "measurement" at least in some embodiments refers to the observation and/or quantification of attributes of an object, event, or phenomenon.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The terms "ego" (as in, e.g., "ego device") and "subject" (as in, e.g., "data subject") at least in some embodiments refers to an entity, element, device, system, etc., that is under consideration or being considered. The terms "neighbor" and "proximate" (as in, e.g., "proximate device") at least in some embodiments refers to an entity, element, device, system, etc., other than an ego device or subject device.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "terminal" at least in some embodiments refers to point at which a conductor from a component, device, or network comes to an end. Additionally or alternatively, the term "terminal" at least in some embodiments refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "computer architecture" is a physical and logical design or arrangement of software and/or hardware elements in a computing system or platform including technology standards for interacts therebetween. A "network architecture" is a physical and logical design or arrangement of software and/or hardware elements in a network including communication protocols, interfaces, and media transmission.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "station" or "STA" at least in some embodiments refers to a logical entity that is a singly addressable instance of a medium access control (MAC) and physical layer (PHY) interface to the wireless medium (WM). The term "wireless medium" or WM" at least in some embodiments refers to the medium used to implement the transfer of protocol data units (PDUs) between peer physical layer (PHY) entities of a wireless local area network (LAN).

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "access point" or "AP" at least in some embodiments refers to an entity that contains one station (STA) and provides access to the distribution services, via the wireless medium (WM) for associated STAs. An AP comprises a STA and a distribution system access function (DSAF).

The term "base station" at least in some embodiments refers to a network element in a radio access network (RAN), such as a fourth-generation (4G) or fifth-generation (5G) mobile communications network which is responsible for the transmission and reception of radio signals in one or more cells to or from a UE. A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved Node B (eNB) or a next generation Node B (gNB). In some examples, the base station may operate or include compute hardware to operate as a compute node. However, in many of the scenarios discussed herein, a RAN node may be substituted with an access point (e.g., wireless network access point) or other network access hardware.

The term "E-UTEAN NodeB", "eNodeB", or "eNB" at least in some embodiments refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface.

The term "next generation eNB" or "ng-eNB" at least in some embodiments refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some embodiments refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some embodiments refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.6.0 (2021 Jul. 9)). Two or more en-gNBs are interconnected with each other (and/or with one or more eNBs) by means of an X2 interface.

The term "Next Generation RAN node" or "NG-RAN node" at least in some embodiments refers to either a gNB or an ng-eNB.

The term "Central Unit" or "CU" at least in some embodiments refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs.

The term "Distributed Unit" or "DU" at least in some embodiments refers to a logical node hosting radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU.

The term "Residential Gateway" or "RG" at least in some embodiments refers to a device providing, for example, voice, data, broadcast video, video on demand, to other devices in customer premises. The term "Wireline 5G Access Network" or "W-5GAN" at least in some embodiments refers to a wireline AN that connects to a 5GC via N2 and N3 reference points. The W-5GAN can be either a W-5GBAN or W-5GCAN. The term "Wireline 5G Cable Access Network" or "W-5GCAN" at least in some embodiments refers to an Access Network defined in/by CableLabs. The term "Wireline BBF Access Network" or "W-5GBAN" at least in some embodiments refers to an Access Network defined in/by the Broadband Forum (BBF). The term "Wireline Access Gateway Function" or "W-AGF" at least in some embodiments refers to a Network function in W-5GAN that provides connectivity to a 3GPP 5G Core network (5GC) to 5G-RG and/or FN-RG. The term "5G-RG" at least in some embodiments refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" at least in some embodiments refers to compute, storage, and/or network resources provided by physical hardware element(s). A "virtualized resource" at least in some embodiments refers to compute, storage, and/or network resources provided by virtualization infrastructure to an application, device, system, etc. The term "network resource" or "communication resource" at least in some embodiments refers to resources that are accessible by computer devices/systems via a communications network. The term "system resources" at least in some embodiments refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "core" at least in some embodiments refers to a functional element that anchors a client network address (e.g., IP address) used for communication with applications via the network. The term "anchor connection" at least in some embodiments refers to the network path from a network element (e.g., an N-MADP) to a UP gateway (e.g., IP anchor) that has assigned a network address (e.g., IP address) to a client. The term "delivery connection" as used herein refers a network path from a network element (e.g., an N-MADP) to a client.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "access edge layer" indicates the sub-layer of infrastructure edge closest to the end user or device. For example, such layer may be fulfilled by an edge data center deployed at a cellular network site. The access edge layer functions as the front line of the infrastructure Edge and may connect to an aggregation Edge layer higher in the hierarchy.

The term "aggregation edge layer" indicates the layer of infrastructure edge one hop away from the access edge layer. This layer can exist as either a medium-scale data center in a single location or may be formed from multiple interconnected micro data centers to form a hierarchical topology with the access Edge to allow for greater collaboration, workload failover, and scalability than access Edge alone.

The term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge.

The term "virtualized NF" (or VNF) indicates a software-based NF operating on multi-function, multi-purpose compute resources (e.g., x86, ARM processing architecture) which are used by NFV in place of dedicated physical equipment. Additionally or alternatively, several VNFs will operate on an Edge data center at the infrastructure Edge.

The term "edge compute node" or "edge compute device" at least in some embodiments refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Data Network" or "DN" at least in some embodiments refers to a network hosting data-centric services such as, for example, operator services, the internet, third-party services, or enterprise networks. Additionally or alternatively, a DN at least in some embodiments refers to service networks that belong to an operator or third party, which are offered as a service to a client or user equipment (UE). DNs are sometimes referred to as "Packet Data Networks" or "PDNs". The term "Local Area Data Network" or "LADN" at least in some embodiments refers to a DN that is accessible by the UE only in specific locations, that provides connectivity to a specific DNN, and whose availability is provided to the UE.

The term "Internet of Things" or "IoT" at least in some embodiments refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. The term "Edge IoT devices" at least in some embodiments refers to any kind of IoT devices deployed at a network's edge.

The term "radio technology" at least in some embodiments refers to technology for wireless transmission and/or reception of electromagnetic radiation for information transfer.

The term "radio access technology" or "RAT" at least in some embodiments refers to the technology used for the underlying physical connection to a radio based communication network. Examples of RATs include the technologies mentioned infra with respect to the term "communication protocol". At least in some embodiments, the term "radio access technology" or "RAT" different implementations of the same communication protocol such as, for example, two cellular networks operating in different frequency ranges or frequency bands (sometimes referred to herein as "sub-RATs" or the like).

The term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of communications protocols include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, Zig-Bee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Digital Enhanced Cordless Telecommunications (DECT), DECT Ultra Low Energy (DECT ULE), DECT-2020, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.1 lad, IEEE 802.1 lay, etc.), V2X communication technologies (including C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "RAT type" at least in some embodiments refers to a transmission technology and/or communication protocol used in a (radio) access network such as, for example, new radio (NR), Long Term Evolution (LTE), narrowband IoT (NB-IOT), untrusted non-3GPP, trusted non-3GPP, trusted IEEE 802.11, non-3GPP access, MuLTEfire, WiMAX, wireline, wireline-cable, wireline broadband forum (wireline-BBF), and/or any of the other communication protocols discussed previously.

The term "channel" at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information.

The term "reliability" at least in some embodiments refers to the ability of a computer-related component (e.g., software, hardware, or network element/entity) to consistently perform a desired function and/or operate according to a specification. Reliability in the context of network communications (e.g., "network reliability") at least in some embodiments refers to the ability of a network to carry out communication. The term "network reliability" at least in some embodiments refers to a probability or measure of delivering a specified amount of data from a source to a destination (or sink).

The term "flow" at least in some embodiments refers to a sequence of data and/or data units (e.g., datagrams, packets, or the like) from a source entity/element to a destination entity/element. Additionally or alternatively, the terms "flow" or "traffic flow" at least in some embodiments refer to an artificial and/or logical equivalent to a call, connection, or link. Additionally or alternatively, the terms "flow" or "traffic flow" at least in some embodiments refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some embodiments refer to a set of data and/or data units (e.g., datagrams, packets, or the like) passing an observation point in a network during a certain time interval. Additionally or alternatively, the term "flow" at least in some embodiments refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms "traffic flow", "data flow", "dataflow", "packet flow", "network flow", and/or "flow" may be used interchangeably even though these terms at least in some embodiments refers to different concepts.

The term "stream" at least in some embodiments refers to a sequence of data elements made available over time. At least in some embodiments, functions that operate on a stream, which may produce another stream, are referred to as "filters," and can be connected in pipelines, analogously to function composition. Filters may operate on one item of a stream at a time, or may base an item of output on multiple items of input, such as a moving average.

The term "distributed computing" at least in some embodiments refers to computation resources that are geographically distributed within the vicinity of one or more localized networks' terminations.

The term "distributed computations" at least in some embodiments refers to a model in which components located on networked computers communicate and coordinate their actions by passing messages interacting with each other in order to achieve a common goal.

The term "service" at least in some embodiments refers to the provision of a discrete function within a system and/or environment. Additionally or alternatively, the term "service" at least in some embodiments refers to a functionality or a set of functionalities that can be reused.

The term "microservice" at least in some embodiments refers to one or more processes that communicate over a network to fulfil a goal using technology-agnostic protocols (e.g., HTTP or the like). Additionally or alternatively, the term "microservice" at least in some embodiments refers to services that are relatively small in size, messaging-enabled, bounded by contexts, autonomously developed, independently deployable, decentralized, and/or built and released with automated processes. Additionally or alternatively, the term "microservice" at least in some embodiments refers to a self-contained piece of functionality with clear interfaces, and may implement a layered architecture through its own internal components. Additionally or alternatively, the term "microservice architecture" at least in some embodiments refers to a variant of the service-oriented architecture (SOA) structural style wherein applications are arranged as a collection of loosely-coupled services (e.g., fine-grained services) and may use lightweight protocols.

The term "session" at least in some embodiments refers to a temporary and interactive information interchange between two or more communicating devices, two or more application instances, between a computer and user, and/or between any two or more entities or elements. Additionally or alternatively, the term "session" at least in some embodiments refers to a connectivity service or other service that provides or enables the exchange of data between two entities or elements. The term "network session" at least in some embodiments refers to a session between two or more communicating devices over a network. The term "web session" at least in some embodiments refers to session between two or more communicating devices over the Internet or some other network. The term "session identifier," "session ID," or "session token" at least in some embodiments refers to a piece of data that is used in network communications to identify a session and/or a series of message exchanges.

The term "quality" at least in some embodiments refers to a property, character, attribute, or feature of something as being affirmative or negative, and/or a degree of excellence of something. Additionally or alternatively, the term "quality" at least in some embodiments, in the context of data processing, refers to a state of qualitative and/or quantitative aspects of data, processes, and/or some other aspects of data processing systems.

The term "Quality of Service" or "QoS' at least in some embodiments refers to a description or measurement of the overall performance of a service (e.g., telephony and/or cellular service, network service, wireless communication/ connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS' at least in some embodiments refers to mechanisms that provide traffic-forwarding treatment based on flow-specific traffic classification. In some implementations, the term "Quality of Service" or "QoS" can be used interchangeably with the term "Class of Service" or "CoS".

The term "Class of Service" or "CoS' at least in some embodiments refers to mechanisms that provide traffic-forwarding treatment based on non-flow-specific traffic classification. In some implementations, the term "Class of Service" or "CoS" can be used interchangeably with the term "Quality of Service" or "QoS".

The term "QoS flow" at least in some embodiments refers to the finest granularity for QoS forwarding treatment in a network. The term "5G QoS flow' at least in some embodiments refers to the finest granularity for QoS forwarding treatment in a 5G System (5GS). Traffic mapped to the same QoS flow (or 5G QoS flow) receive the same forwarding treatment.

The term "reliability flow" at least in some embodiments refers to the finest granularity for reliability forwarding treatment in a network, where traffic mapped to the same reliability flow receive the same reliability treatment. Additionally or alternatively, the term "reliability flow" at least in some embodiments refers to the a reliability treatment assigned to packets of a data flow The term "reliability forwarding treatment" or "reliability treatment" refers to the manner in which packets belonging to a data flow are handled to provide a certain level of reliability to that data flow including, for example, a probability of success of packet delivery, QoS or Quality of Experience (QoE) over a period of time (or unit of time), admission control capabilities, a particular coding scheme, and/or coding rate for arrival data bursts.

The term "forwarding treatment" at least in some embodiments refers to the precedence, preferences, and/or prioritization a packet belonging to a particular data flow receives in relation to other traffic of other data flows. Additionally or alternatively, the term "forwarding treatment" at least in some embodiments refers to one or more parameters, characteristics, and/or configurations to be applied to packets belonging to a data flow when processing the packets for forwarding. Examples of such characteristics may include resource type (e.g., non-guaranteed bit rate (GBR), GBR, delay-critical GBR, etc.); priority level; class or classification; packet delay budget; packet error rate; averaging window; maximum data burst volume; minimum data burst volume; scheduling policy/weights; queue management policy; rate shaping policy; link layer protocol and/or RLC configuration; admission thresholds; etc. In some implementations, the term "forwarding treatment" may be referred to as "Per-Hop Behavior" or "PHB".

The term "admission control" at least in some embodiments refers to a function or process that decides if new packets, messages, work, tasks, etc., entering a system should be admitted to enter the system or not. Additionally or alternatively, the term "admission control" at least in some embodiments refers to a validation process where a check is performed before a connection is established to see if current resources are sufficient for the proposed connection.

The term "QoS Identifier" at least in some embodiments refers to a scalar that is used as a reference to a specific QoS forwarding behavior (e.g., packet loss rate, packet delay budget, etc.) to be provided to a QoS flow. This may be implemented in an access network by referencing node specific parameters that control the QoS forwarding treatment (e.g., scheduling weights, admission thresholds, queue management thresholds, link layer protocol configuration, etc.).

The term "time to live" (or "TTL") or "hop limit" at least in some embodiments refers to a mechanism which limits the lifespan or lifetime of data in a computer or network. TTL may be implemented as a counter or timestamp attached to or embedded in the data. Once the prescribed event count or timespan has elapsed, data is discarded or revalidated.

The term "data buffer" or "buffer" at least in some embodiments refers to a region of a physical or virtual memory used to temporarily store data, for example, when data is being moved from one storage location or memory space to another storage location or memory space, data being moved between processes within a computer, allowing for timing corrections made to a data stream, reordering received data packets, delaying the transmission of data packets, and the like. At least in some embodiments, a "data buffer" or "buffer" may implement a queue.

The term "circular buffer", "circular queue", "cyclic buffer", or "ring buffer" at least in some embodiments refers to a data structure that uses a single fixed-size buffer or other area of memory as if it were connected end-to-end or as if it has a circular or elliptical shape.

The term "queue" at least in some embodiments refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some embodiments refers to one or more operations of adding an element to the rear of a queue. The term "dequeue" at least in some embodiments refers to one or more operations of removing an element from the front of a queue.

The term "queue management" at least in some embodiments refers to a system, mechanism, policy, process, algorithm, or technique used to control one or more queues. The term "Active Queue Management" or "AQM" at least in some embodiments refers to a system, mechanism, policy, process, algorithm, or technique of dropping packets in a queue or buffer before the queue or buffer becomes full. The term "AQM entity" as used herein may refer to a network scheduler, a convergence layer entity, a network appliance, network function, and/or some other like entity that performs/executes AQM tasks.

The term "queue management technique" at least in some embodiments refers to a particular queue management system, mechanism, policy, process, and/or algorithm, which may include a "drop policy". The term "active queue management technique" or "AQM technique" at least in some embodiments refers to a particular AQM system, mechanism, policy, process, and/or algorithm.

The term "drop policy" at least in some embodiments refers to a set of guidelines or rules used by a queue management technique or ARM technique to determine when to discard, remove, delete, or otherwise drop data or packets from a queue or buffer or data or packets arriving for storage in a queue or buffer.

The term "stack" at least in some embodiments refers to an abstract data type that serves as a collection of elements and may include a push operation or function, a pop operation or function, and sometimes a peek operation or function.

The term "push", in the context of data structures such as stacks, buffers, and queues, at least in some embodiments refers an operation or function that adds one or more elements to a collection or set of elements.

The term "pop", in the context of data structures such as stacks, buffers, and queues, at least in some embodiments refers an operation or function that removes or otherwise obtains one or more elements from a collection or set of elements.

The term "peek", in the context of data structures such as stacks, buffers, and queues, at least in some embodiments refers an operation or function that provides access to one or more elements from a collection or set of elements.

The term "network scheduler" at least in some embodiments refers to a node, element, or entity that manages network packets in transmit and/or receive queues of one or more protocol stacks of network access circuitry (e.g., a network interface controller (NIC), baseband processor, and the like). The term "network scheduler" at least in some embodiments can be used interchangeably with the terms "packet scheduler", "queueing discipline" or "qdisc", or "queueing algorithm"

The term "network coding" at least in some embodiments refers to processes and/or techniques in which transmitted data is encoded and decoded to improve network performance.

The term "code rate" at least in some embodiments refers to the proportion of a data stream or flow that is useful or non-redundant (e.g., for a code rate of k/n, for every k bits of useful information, the (en)coder generates a total of n bits of data, of which n-k are redundant).

The term "systematic code" at least in some embodiments refers to any error correction code in which the input data is embedded in the encoded output. The term "non-systematic code" at least in some embodiments refers to any error correction code in which the input data is not embedded in the encoded output.

The term "interleaving" at least in some embodiments refers to a process to rearrange code symbols so as to spread bursts of errors over multiple codewords that can be corrected by ECCs.

The term "code word" or "codeword" at least in some embodiments refers to an element of a code or protocol, which is assembled in accordance with specific rules of the code or protocol.

The term "piggyback" or "piggybacking", in the context of computer communications and/or networking, refers to attaching, appending, or hooking a first data unit to a second data unit that is to be transmitted next or sometime before the first data unit; in this way, the first data unit gets a "free ride" in the data packet or frame carrying the second data unit.

The term "PDU Connectivity Service" at least in some embodiments refers to a service that provides exchange of protocol data units (PDUs) between a UE and a data network (DN). The term "PDU Session" at least in some embodiments refers to an association between a UE and a DN that provides a PDU connectivity service. A PDU Session type can be IPv4, IPv6, IPv4v6, Ethernet, Unstructured, or any other network/connection type, such as those discussed herein. The term "MA PDU Session" at least in some embodiments refers to a PDU Session that provides a PDU connectivity service, which can use one access network at a time or multiple access networks simultaneously.

The term "traffic shaping" at least in some embodiments refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some embodiments refers to the regulation of flows into or out of a network, or into or out of a specific device or element.

The term "access traffic steering" or "traffic steering" at least in some embodiments refers to a procedure that selects an access network for a new data flow and transfers the traffic of one or more data flows over the selected access network. Access traffic steering is applicable between one 3GPP access and one non-3GPP access.

The term "access traffic switching" or "traffic switching" at least in some embodiments refers to a procedure that moves some or all traffic of an ongoing data flow from at least one access network to at least one other access network in a way that maintains the continuity of the data flow.

The term "access traffic splitting" or "traffic splitting" at least in some embodiments refers to a procedure that splits the traffic of at least one data flow across multiple access networks. When traffic splitting is applied to a data flow, some traffic of the data flow is transferred via at least one access channel, link, or path, and some other traffic of the same data flow is transferred via another access channel, link, or path.

The term "network address" at least in some embodiments refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, International Mobile Equipment Identity (IMEI), IMEI Type Allocation Code (IMEA/TAC), International Mobile Subscriber Identity (IMSI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof.

The term "application identifier", "application ID", or "app ID" at least in some embodiments refers to an identifier that can be mapped to a specific application or application instance; in the context of 3GPP 5G/NR systems, an "application identifier" at least in some embodiments refers to an identifier that can be mapped to a specific application traffic detection rule.

The term "endpoint address" at least in some embodiments refers to an address used to determine the host/authority part of a target URI, where the target URI is used to access an NF service (e.g., to invoke service operations) of an NF service producer or for notifications to an NF service consumer.

The term "closed access group" or "CAG" at least in some embodiments refers to a group of list of users permitted to connect and/or access a specific network, a specific access network, and/or attach to a specific cell or network access node. Closed access groups (CAGs) are sometimes referred to as Access Control Lists (ACLs), Closed Subscriber Groups (CSGs), Closed User Groups (CUGs), and the like. The term "CAG-ID" at least in some embodiments refers to an identifier of a CAG.

The term "port" in the context of computer networks, at least in some embodiments refers to a communication endpoint, a virtual data connection between two or more entities, and/or a virtual point where network connections start and end. Additionally or alternatively, a "port" at least in some embodiments is associated with a specific process or service.

The term "subnetwork" or "subnet" at least in some embodiments refers to a logical subdivision of a network, such as an IP network. The practice of dividing a network into two or more networks is called "subnetting."

The term "netmask" or "subnet mask" at least in some embodiments refers to a bitmask applied by bitwise AND operations to a network address (e.g., an IP address in an IP network) to yield a routing prefix, and/or is a 32-bit "mask" used to divide an IP address into subnets and specify the network's available hosts.

The term "localized network" at least in some embodiments refers to a local network that covers a limited number of connected vehicles in a certain area or region.

The term "local data integration platform" at least in some embodiments refers to a platform, device, system, network, or element(s) that integrate local data by utilizing a combination of localized network(s) and distributed computation.

The term "clear channel assessment (CCA) function" at least in some embodiments refers to a logical function in the physical layer (PHY) that determines the current state of use of a wireless medium.

The term "bandwidth" at least in some embodiments refers to the maximum rate of data transfer across a given path. Additionally or alternatively, the term "bandwidth" at least in some embodiments refers to data carrying capacity of a network or transmission medium.

The term "bit rate" at least in some embodiments refers to the number of bits that are conveyed or processed per unit of time.

The term "channel capacity" at least in some embodiments refers to an upper bound on the rate at which data can be reliably transmitted over a communication channel and/or given noise on a channel.

The term "data rate" at least in some embodiments refers to a transmission speed of a network. Additionally or alternatively, the term "data rate" at least in some embodiments refers to the amount of data transmitted during a specified time period and/or the speed at which data is transferred from one entity or element to another entity or element. Additionally or alternatively, the term "data rate" at least in some embodiments can be used interchangeably with the "bit rate", "data signaling rate", "symbol rate", "throughput", and/or "data transfer rate".

The term "delay" at least in some embodiments refers to a time interval between two events. Additionally or alternatively, the term "delay" at least in some embodiments refers to a time interval between the propagation of a signal and its reception.

The term "delay bound" at least in some embodiments refers to a predetermined or configured amount of acceptable delay. The term "per-packet delay bound" at least in some embodiments refers to a predetermined or configured amount of acceptable packet delay where packets that are not processed and/or transmitted within the delay bound are considered to be delivery failures and are discarded or dropped.

The term "goodput" at least in some embodiments refers to a number of useful information bits delivered by the network to a certain destination per unit of time.

The term "latency" at least in some embodiments refers to the amount of time it takes to transfer a first/initial data unit in a data burst from one point to another.

The term "network delay" at least in some embodiments refers to the delay of an a data unit within a network (e.g., an IP packet within an IP network).

The term "packet delay" at least in some embodiments refers to the time it takes to transfer any packet from one point to another. Additionally or alternatively, the term "packet delay" or "per packet delay" at least in some embodiments refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized.

The term "packet drop rate" at least in some embodiments refers to a share of packets that were not sent to the target due to high traffic load or traffic management and should be seen as a part of the packet loss rate.

The term "packet loss rate" at least in some embodiments refers to a share of packets that could not be received by the target, including packets dropped, packets lost in transmission and packets received in wrong format.

The term "performance indicator" at least in some embodiments refers to performance data aggregated over a group of network functions (NFs), which is derived from performance measurements collected at the NFs that belong to the group, according to the aggregation method identified in a Performance Indicator definition.

The term "physical rate" or "PHY rate" at least in some embodiments refers to a speed at which one or more bits are actually sent over a transmission medium. Additionally or alternatively, the term "physical rate" or "PHY rate" at least in some embodiments refers to a speed at which data can move across a wired or wireless link between a transmitter and a receiver.

The term "processing delay" at least in some embodiments refers to an amount of time taken to process a packet in a network node.

The term "propagation delay" at least in some embodiments refers to amount of time it takes a signal's header to travel from a sender to a receiver.

The term "queuing delay" at least in some embodiments refers to an amount of time a job waits in a queue until that job can be executed. Additionally or alternatively, the term "queuing delay" at least in some embodiments refers to an amount of time a packet waits in a queue until it can be processed and/or transmitted.

The term "transmission delay" at least in some embodiments refers to an amount of time needed (or necessary) to push a packet (or all bits of a packet) into a transmission medium.

The term "throughput" or "network throughput" at least in some embodiments refers to a rate of production or the rate at which something is processed. Additionally or alternatively, the term "throughput" or "network throughput" at least in some embodiments refers to a rate of successful data delivery over a communication channel.

The term "application" at least in some embodiments refers to a computer program designed to carry out a specific task other than one relating to the operation of the computer itself. Additionally or alternatively, term "application" at least in some embodiments refers to a complete and deployable package, environment to achieve a certain function in an operational environment.

The term "algorithm" at least in some embodiments refers to an unambiguous specification of how to solve a problem or a class of problems by performing calculations, input/output operations, data processing, automated reasoning tasks, and/or the like.

The term "instance" at least in some embodiments refers to a concrete occurrence of an object, which may occur, for example, during execution of program code. Additionally or alternatively, the term "instance" at least in some embodiments refers to any running process or to an object as an instance of a class. Additionally or alternatively, the term "instance" at least in some embodiments refers to an object or the creation of an object, where the "object" at least in some embodiments refers to a location in memory having a value and possibly referenced by an identifier. Additionally or alternatively, the term "instance" at least in some embodiments refers to an individual virtual machine (VM) or container in a virtualized environment (e.g., cloud computing or edge computing system/service) that provides user-level and/or operating-system-level virtualization. Additionally or alternatively, the term "application instance" at least in some embodiments refers to a collection of services and/or service groups. The terms "instantiate," "instantiation," and the like at least in some embodiments refers to the creation of an instance.

The term "data processing" or "processing" at least in some embodiments refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "software agent" at least in some embodiments refers to a computer program that acts for a user or other program in a relationship of agency.

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "analytics" at least in some embodiments refers to the discovery, interpretation, and communication of meaningful patterns in data.

The term "application programming interface" or "API" at least in some embodiments refers to a set of subroutine definitions, communication protocols, and tools for building software. Additionally or alternatively, the term "application programming interface" or "API" at least in some embodiments refers to a set of clearly defined methods of communication among various components. An API may be for a web-based system, operating system, database system, computer hardware, or software library.

The term "database" at least in some embodiments refers to an organized collection of data that is stored and accessed electronically using a computing device. A database (DB) may include one or more DB objects that are managed by a DB management system (DBMS). Each DB object includes a number of records, and each record may include a set of fields. A record may take different forms based on the DB model being used and/or the specific DB object to which it belongs; for example, a record may be a row in a table of a relational DB; a JavaScript Object Notation (JSON) object; a data element in an XML document; a key-value pair; an entry in a hash table; and/or the like.

The term "index" at least in some embodiments refers to an object that maps a value to a stored object or data item. Additionally or alternatively, the term "index" at least in some embodiments refers to any data structure that assists in the access or retrieval of data in a data structure. Additionally or alternatively, the term "index" at least in some embodiments refers to a data structure that references or refers to data elements or records in a database.

The term "datagram" at least in some embodiments at least in some embodiments refers to a basic transfer unit associated with a packet-switched network; a datagram may be structured to have header and payload sections. The term "datagram" at least in some embodiments may be referred to as a "data unit", a "protocol data unit" or "PDU", a "service data unit" or "SDU", a frame, a packet, and/or the like.

The term "information element" at least in some embodiments refers to a structural element containing one or more fields.

The term "field" at least in some embodiments refers to individual contents of an information element, or a data element that contains content.

The term "data element" or "DE" at least in some embodiments refers to a data type that contains one single data.

The term "data frame" or "DF" at least in some embodiments refers to a data type that contains more than one data element in a predefined order.

The term "reference" at least in some embodiments refers to data useable to locate other data and may be implemented a variety of ways (e.g., a pointer, an index, a handle, a key, an identifier, a hyperlink, a memory address, etc.).

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. A multi-access (MX) compute node to operate in an MX computing environment, the MX compute node comprising:
    memory circuitry; and
    processor circuitry connected to the memory circuitry, the processor circuitry to execute instructions for traffic steering, which, when executed are to cause the processor circuitry to:
        initiate establishment of a set of logical links with another MX compute node, wherein each logical link of the set of logical links includes a respective set of physical links,
        select a logical link of the set of logical links over which to steer traffic,
        select a physical link of a set of physical links belonging to the selected logical link over which to steer traffic,
        cause a traffic-steering message (TSM) to be sent to the other MX compute node over the selected physical link,
        receive a traffic-steering acknowledgement (TSA) from the other MX compute node over the selected physical link,
        receive traffic from the other MX compute node over the selected physical link, and
        steer second traffic to be sent to the other MX compute node over the second physical link and from being sent to the other MX compute node over the selected physical link or one or more other links of the set of physical links.

2. The MX compute node of claim 1, wherein the selected physical link is a first physical link, the TSM is a first TSM, the TSA is a first TSA, the received traffic is first traffic, and execution of the instructions is to cause the processor circuitry to:
    receive a second TSM from the other MX compute node over a second physical link of the plurality of physical links; and
    send a second TSA to the other MX compute node over the second physical link.

3. The MX compute node of claim 2, wherein execution of the instructions is to cause the processor circuitry to:
    detect link quality degradation of the first physical link;
    select a third link of the plurality of physical links over which to steer traffic based on the detected link quality degradation;
    send a third TSM to the other MX compute node over the third link;
    receive a third TSA from the other MX compute node over the third link; and
    receive third traffic from the other MX compute node over the third link.

4. The MX compute node of claim 2, further comprising:
    first transceiver (TRx) circuitry connected to the processor circuitry, the first TRx circuitry configured to operate according to a first radio access technology (RAT), and the first TRx to:
        transmit the first TSM over the first physical link,
        receive the first TSA over the first physical link, and
        receive the first traffic from the other MX compute node over the selected; and
    second TRx circuitry connected to the processor circuitry, the second TRx circuitry configured to operate according to a second RAT, and the second TRx circuitry to:
        receive the second TRS over the second physical link,
        send the second TSA over the second physical link, and
        send the second traffic over the second physical link.

5. The MX compute node of claim 2, wherein the first RAT is different than the second RAT.

6. The MX compute node of claim 1, wherein execution of the instructions is to cause the processor circuitry to:
    cause, on a periodic basis, a probe message to be sent over non-active links of the plurality of physical links to maintain the non-active links.

7. The MX compute node of claim 1, wherein execution of the instructions is to cause the processor circuitry to:
    cause retransmission of the TSM to the other MX compute node when the TSA is not received before a TSM timeout (TO) timer expires.

8. The MX compute node of claim 1, wherein execution of the instructions is to cause the processor circuitry to:
    select the selected physical link among the plurality of physical links based on one or more quality of service (QOS) measurements of individual links of the plurality of physical links.

9. The MX compute node of claim 1, wherein each logical link of the set of logical links has a connection identifier (ID), and each physical link of the respective set of physical links has a same connection ID as a corresponding one of the set of logical links.

10. The MX compute node of claim 9, wherein at least one logical link of the set of logical links operates according to a radio access technology (RAT) different than RATs of other logical links of the plurality of links.

11. The MX compute node of claim 9, wherein at least one physical link of at least one set of physical links belonging to at least one logical link of the set of logical links belongs to a RAT different from a RAT of other physical links in the at least one set of physical links.

12. The MX compute node of claim 1, wherein:

the TSM is a Multi-Access Management Services (MAMS) traffic-steering request message, a MAMS traffic-steering response message, a MAMS probe request message, or a MAMS traffic-splitting update (TSU) message; and the TSA is a MAMS traffic-steering request message, a MAMS traffic-steering response message, a MAMS probe acknowledgement message, or a MAMS traffic-splitting acknowledgement (TSA) message.

\* \* \* \* \*